(12) United States Patent
Pung

(10) Patent No.: US 11,761,750 B1
(45) Date of Patent: Sep. 19, 2023

(54) MULTI-ENVIRONMENT RAYLEIGH INTERFEROMETER

(71) Applicant: Utah State University Space Dynamics Laboratory, North Logan, UT (US)

(72) Inventor: Aaron Pung, Albuquerque, NM (US)

(*) Notice: Subject to any disclaimer, the term of this patent is extended or adjusted under 35 U.S.C. 154(b) by 0 days.

(21) Appl. No.: 17/675,179

(22) Filed: Feb. 25, 2022

(51) Int. Cl.
| | |
|---|---|
| *G01B 9/02015* | (2022.01) |
| *G01J 3/02* | (2006.01) |
| *G01B 9/02* | (2022.01) |
| *G02B 6/293* | (2006.01) |

(52) U.S. Cl.
CPC ....... *G01B 9/02028* (2013.01); *G01B 9/0203* (2013.01); *G01B 9/02051* (2013.01); *G01J 3/0259* (2013.01); *G01B 2290/70* (2013.01); *G02B 6/29349* (2013.01)

(58) Field of Classification Search
CPC .... G01B 9/02028; G01B 9/0203; G01B 9/02; G01B 9/02057; G01B 9/02027; G01B 9/02051; G01B 2290/70; G01J 3/0259; G02B 6/29349
USPC ......................................................... 356/479
See application file for complete search history.

(56) References Cited

U.S. PATENT DOCUMENTS

| | | | |
|---|---|---|---|
| 3,767,307 A | 10/1973 | Bowker | |
| 3,828,126 A | 8/1974 | Ramsey, Jr. | |
| 4,428,444 A | 1/1984 | Whittaker et al. | |
| 4,624,569 A | 11/1986 | Kwon | |
| 5,148,235 A | 9/1992 | Tank et al. | |
| 6,178,000 B1 | 1/2001 | Hoffnagle | |
| 6,694,066 B2* | 2/2004 | Xie ..................... | G02B 6/12007 385/11 |
| 6,882,433 B2 | 4/2005 | Marron et al. | |
| 6,930,781 B2 | 8/2005 | Agladze et al. | |

(Continued)

FOREIGN PATENT DOCUMENTS

| | | | |
|---|---|---|---|
| CN | 106949969 B | 3/2017 | |
| DE | 102010024266 A1 * | 12/2011 | ......... G01B 9/02051 |

OTHER PUBLICATIONS

Weigel et al., A monolithic micro-optical interferometer deep etched into fused silica, Microelectronic Engineering, 174, p. 40-45 (Year: 2017).*

(Continued)

*Primary Examiner* — Michelle M Iacoletti
*Assistant Examiner* — Noah J. Haney

(57) ABSTRACT

An interferometer includes a coherent light source and an array of electrically coupled light-sensitive pixel elements. The interferometer is configured to direct an internal optical path of the coherent light source and an external optical path of the coherent light source into a monolithic unit cell. In addition, the monolithic unit cell is configured to direct the internal optical path first through the monolithic unit cell and then onto the array and also configured to direct the external optical path back outside the monolithic unit cell through an external environment and then back into the monolithic unit cell and finally onto the array. In addition, interferometer is further configured to combine the internal optical path and the external optical path at the array and produce a first interferogram on the array, the interferogram characterizing an optical property of the external environment.

20 Claims, 43 Drawing Sheets

(56) References Cited

U.S. PATENT DOCUMENTS

| | | | | |
|---|---|---|---|---|
| 7,372,577 | B1* | 5/2008 | Sullivan | G01B 9/02057 356/498 |
| 7,995,208 | B2 | 8/2011 | Jacobsen et al. | |
| 8,422,026 | B2 | 4/2013 | Olszak | |
| 8,441,649 | B2 | 5/2013 | Wang et al. | |
| 8,570,524 | B2* | 10/2013 | Wan | G01B 9/02051 356/451 |
| 9,046,412 | B2 | 6/2015 | Mortimer | |
| 9,062,957 | B2 | 6/2015 | Yamada | |
| 9,551,563 | B2 | 1/2017 | Couweleers et al. | |
| 10,323,981 | B2 | 6/2019 | Claes | |
| 10,488,175 | B2 | 11/2019 | Shaked et al. | |
| 2001/0007502 | A1* | 7/2001 | Kanda | G01B 9/02059 356/512 |
| 2009/0316158 | A1* | 12/2009 | Ash, III | G01B 9/02051 356/450 |
| 2017/0277043 | A1 | 9/2017 | de Boer et al. | |

OTHER PUBLICATIONS

Pfleegor et al., Interference of Independent Photon Beams, Physical Review, Jul. 25, 1967, vol. 159 No. 5.

Long et al., Analysis and Design of an Effective Light Interference Methane Sensor Based on Three-Dimensional Optical Path Model, Hindawi Journal of Sensors, Jul. 10, 2018, vol. 2018, Article ID 1342593.

Harlander et al., Robust monolithic ultraviolet interferometer for the Shimmer instrument on STPSat-1, Applied Optics, May 20, 2003, vol. 42, No. 15.

Cabib et al., New airborne pushbroom spectral imager for the 3-5 and 7-12 μ wavelength ranges, ResearchGate, Jan. 2005.

Herbst et al., Design of a monolithic Michelson interferometer for fringe imaging in a near-field, UV, direct-detection Doppler wind lidar, Applied Optics, Sep. 1, 2016, vol. 55, No. 25.

Yi et al., Laboratory fabrication of monolithic interferometers for one and two-dimensional spatial heterodyne spectrometers, Optics Express, Nov. 13, 2017, vol. 25, No. 23.

Porter, J., Tilt Measurements using a Monolithic Cyclic Interferometer (pp. 1-42), Rose-Hulman Institute of Technology, Graduate Thesis—Physical and Optical Engineering, Jan. 4, 2019, https://scholar.rose-hulman.edu/dept_optics/7.

Porter, J., Tilt Measurements using a Monolithic Cyclic Interferometer (pp. 43-94), Rose-Hulman Institute of Technology, Graduate Thesis—Physical and Optical Engineering, Jan. 4, 2019, https://scholar.rose-hulman.edu/dept_optics/7.

* cited by examiner

MULTI-ENVIRONMENT RAYLEIGH INTERFEROMETER

TECHNICAL FIELD

The present disclosure relates to measuring properties of an environment through interference, and more particularly, to novel systems and methods for measuring multiple properties of an environment from a single interferometric sensor.

BACKGROUND

Interferometers are used to measure different properties of an environment using one or more wavelengths of light. A single-wavelength interferometer is capable of measuring physical properties of an object (including shape, refractive index, optical density, and mechanical deformation) or an environment (including molarity, concentration, temperature, pressure, humidity, or impurities). Additionally, multiple wavelengths of light can be used for comparative interferometry or molecular absorption measurements.

The ability to quickly characterize real-world environments is crucial to preserving the health and safety of individuals in domestic and industrial environments. In the past, gas chemistry characterization has been performed using classical Rayleigh and Mach-Zehnder interferometers. For example, FIG. 1 is a prior-art figure illustrating a conventional Mach-Zehnder interferometer. The interferometer includes a coherent light source 10, a sample container 16 containing a specimen (e.g., a gas or liquid), beam splitters 12, mirrors 14, and a detector 18. Light from the coherent light source 10 is split into two light paths at beam splitter 12A and recombined at beam splitter 12B. An interferogram is produced at the detector 18 as different light paths between the coherent light source 10 and the detector 18 have different optical path lengths. The difference in optical path lengths is determined by the characteristics of the material or specimen contained inside sample container 16. The mirrors 14 and beam splitters 12 are each separate components that must be carefully aligned to produce the interferogram.

Similarly, using the method of Lord Rayleigh, a gas specimen is captured and placed in one arm of a two-arm interferometer system. Based on the difference in optical path length between the reference and probe beams, the refractive index of the sample is determined for different wavelengths. This configuration is limited, because the sealed sample does not experience variation seen in the real world. In the case where a neutral environment turns hazardous, the limitations presented by classical systems become undesirable and dangerous.

To overcome these limitations, fiber-optic interferometer systems have gained popularity based on their small footprint, low weight, high sensitivity, flexibility, portability, and immunity to electromagnetic interference. See Liu, Y., Lin, H., Dai, Y., Zhou, A. & Yuan, L. Fiber in-line mach—zehnder interferometer for gas pressure sensing. IEEE Sensors J. 18, 8012-8016, DOI: 10.1109/JSEN.2018.2864277 (2018). Unfortunately, these same systems are often plagued by several drawbacks including a lack versatility and modularity, coupling loss, and unfamiliarity to the end user. Furthermore, fiber-optic systems are not agnostic to their input source—the same optical fiber used to transmit light at 600 nm will not be able to transmit light at 6000 nm.

SUMMARY

The inventor of the embodiments described in this disclosure has identified the need to measure optical properties of an environment or specimen by directing various light paths through a monolithic unit cell. Larger, free-space interferometer systems exploit material and mechanical traits to reduce construction issues. However, truly monolithic designs, for example, form an interferometer from a single, unbroken block of material to avoid alignment errors. Other "monolithic" designs form a single slab of material by aligning and bonding two or more components together.

Further design simplification eliminates the cosine error due to inconsistencies in mirror position by removing detached or rotating mirrors. Thermal mismatch between dissimilar materials can be alleviated through the use of single-material components. In the case of ultra-low expansion (ULE) glass, the free-space monolithic interferometer also benefits from thermal insensitivity.

The geometry of a monolithic, single-material slab can be made to both exploit the natural reflection and refraction within the structure and provide a customized solution for the problem at hand. This approach eliminates the need to align and bond multiple components together and takes advantage of chromatic dispersion's weak effect on total internal reflection (TIR) and refraction. Furthermore, the dispersion dependence of the proposed design suggests that as long as refractive index (n) and transmission (T) requirements are met, any number of sources can be used with the same interferometer design. Unlike fiber-optic designs, the same monolithic design used to characterize an atmosphere at 450 nm with one material (ex. Schott BK3 glass) can also be used to characterize the same atmosphere at 6000 nm with another material (calcium fluoride).

The large spectral bandwidth accessible with a single unit cell is significant because it covers major molecular resonance frequencies of many hazardous chemicals. Colorless, flammable gases like hydrogen sulfide ($H_2S$) and phosphine ($PH_3$) have resonances at 3.8 µm and 4.3 µm respectively, while greenhouse gases such as carbon dioxide ($CO_2$) and methane ($CH_4$) have resonances at 4.3 µm and 3.3 µm. Less hazardous chemicals like water have resonances below 3 µm.

Given that the precision of an interferometer is correlated with its fringe spacing, there is great potential in a system that is able to operate at both short and long wavelengths to probe an environment. Shorter wavelengths are useful to obtain higher resolution measurements while longer wavelengths could be used to take advantage of molecular absorption peaks.

The present disclosure in aspects and embodiments addresses these various needs and problems. Embodiments of the present disclosure provide a highly versatile, modular, compact interferometer design. In embodiments, based on a monolithic, single-material, geometry, the design is intuitive and can be easily manufactured. The resulting interferometer is capable of characterizing both free-space and encapsulated environments and can be operated with a wide variety of coherent light sources spanning the visible and other spectral regimes.

The modular nature of the interferometer allows it to act as both a stand-alone measurement tool and as a "unit cell" which can be tessellated into a more complex and capable system. In each embodiment, the interferometer unit cell represents one component in a larger system; to be fully operational, a source and detector are also needed. The interferogram(s) formed by the unit cell can be recorded and monitored in real-time, enabling timely detection of changes in the refractive index of a surrounding environment.

FIG. 2 illustrates a circumferential compact monolithic multispectral interferometer 100 with very few parts which, after being fabricated, do not need further optical alignment. Interferometer 100 may be placed in an external environment 90. The interferometer 100 may measure the optical properties of the environment 90, such as the molarity, concentration, temperature, pressure, humidity, or impurities contained in the environment 90.

Referring to FIGS. 2 and 3, interferometer 100 includes an array 22 of monolithic unit cells 20 and multiple coherent light sources 10 (10A, 10B, 10C, etc.). Each of the individual coherent light sources 10A, 10B, 10C, 10D, 10E, etc., may provide a different wavelength of coherent light to measure optical properties of the environment 90. The different coherent light-source wavelengths may be specified to identify different types of gases that may be present in external environment 90.

FIG. 3 illustrates the array 22 of monolithic unit cells 20 arranged in a circumferential pattern around center axis 86, illustrated in the same cardinal X-direction. FIG. 3 further illustrates various hermetic seals 80, 82, and 84 described in further detail below.

In embodiments, and referring to FIG. 9 as an example illustration, interferometer 100 includes a coherent light source 10 and an array of electrically coupled light-sensitive pixel elements 60. Interferometer 100 is further configured to direct a first internal optical path 30 of the coherent light source and a first external optical path 40 of the coherent light source 10 into a monolithic unit cell 20 or 24. In addition, the monolithic unit cell 20 or 24 is configured to direct the first internal optical path 30 first through the monolithic unit cell 20 or 24 and then onto the array 60 and also configured to direct the first external optical path 40 back outside the monolithic unit cell 20 or 24 through a first external environment 90 and then back into the monolithic unit cell 20 or 24 and finally onto the array 60. In addition, interferometer 100 is further configured to combine the first internal optical path 30 and the first external optical path 40 at the array 60 and produce a first interferogram 71 (shown in FIGS. 10A-10D) on the array 60, the interferogram 71 characterizing an optical property of the first external environment 90.

Embodiments of the present disclosure also include methods for measuring optical properties of a gas or external environment using an interferometer such as interferometer 100, 104, or 106, etc.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

Figure 1:
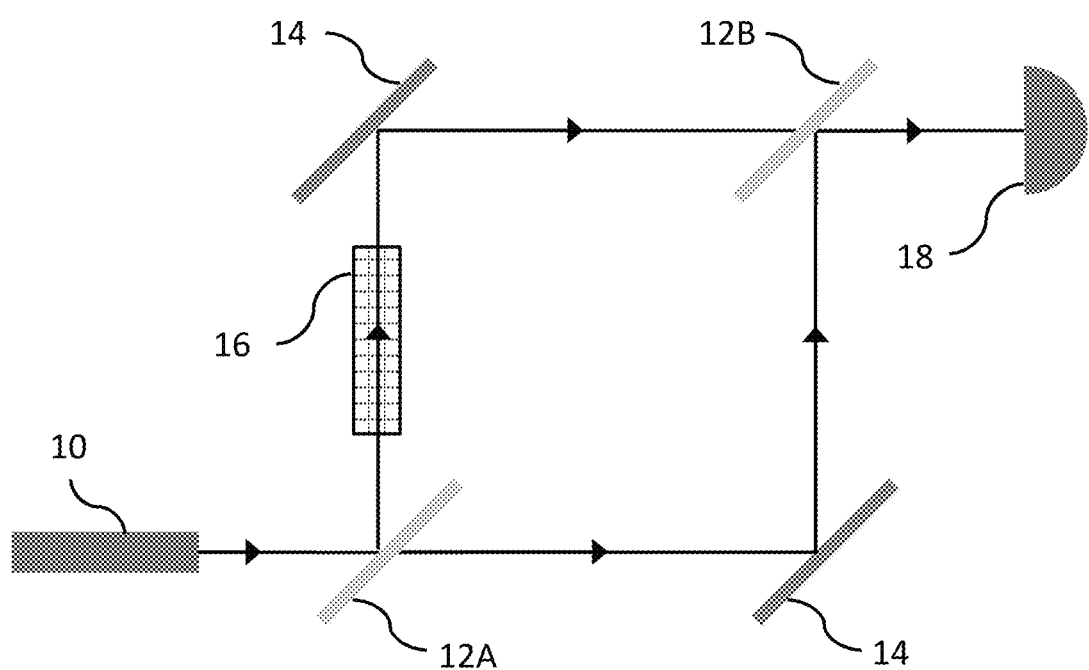
FIG. 1 is a prior-art figure illustrating a conventional Mach-Zehnder interferometer.

The present disclosure covers apparatuses and associated methods for a highly versatile, modular, compact interferometer design. Based on a monolithic, single-material, mirrorless geometry, the design is intuitive and can be easily manufactured. The disclosed interferometer is capable of characterizing both free-space and encapsulated environments and can be operated with a wide variety of sources spanning the visible and infrared regimes.

In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional", "optionally" or "or" refer, for example, to instances in which subsequently described circumstance may or may not occur, and include instances in which the circumstance occurs and instances in which the circumstance does not occur. For example, if the text reads "option A or option B," there may be instances where option A and option B are mutually exclusive or instances where both option A and option B may be included. The terms "one or more" and "at least one" refer, for example, to instances in which one of the subsequently described circumstances occurs, and to instances in which more than one of the subsequently described circumstances occurs.

The following examples are illustrative only and are not intended to limit the disclosure in any way.

Figure 2:
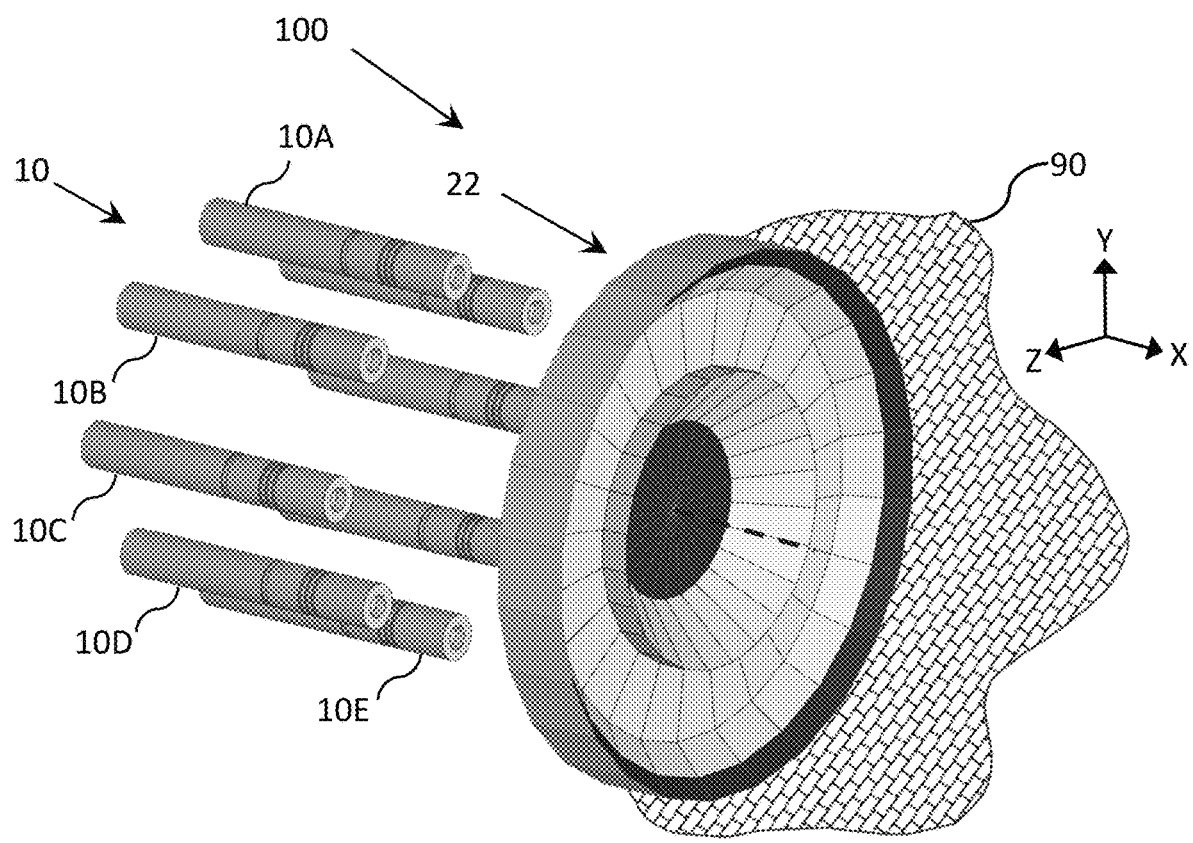
FIG. 2 is a depiction of an embodiment of the present disclosure.
Figure 3:
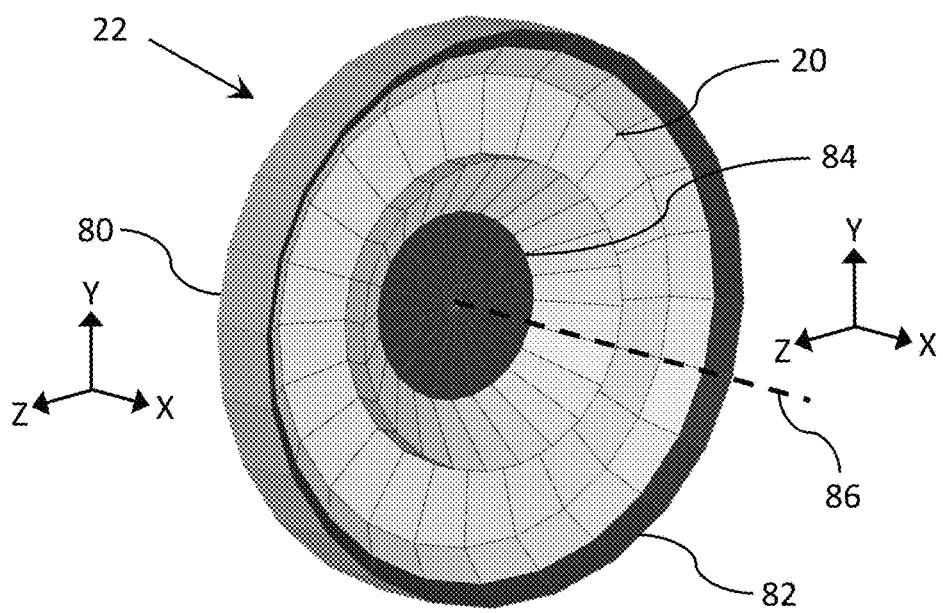
FIG. 3 illustrates an array of monolithic unit cells arranged in a circumferential pattern.
Figure 4:
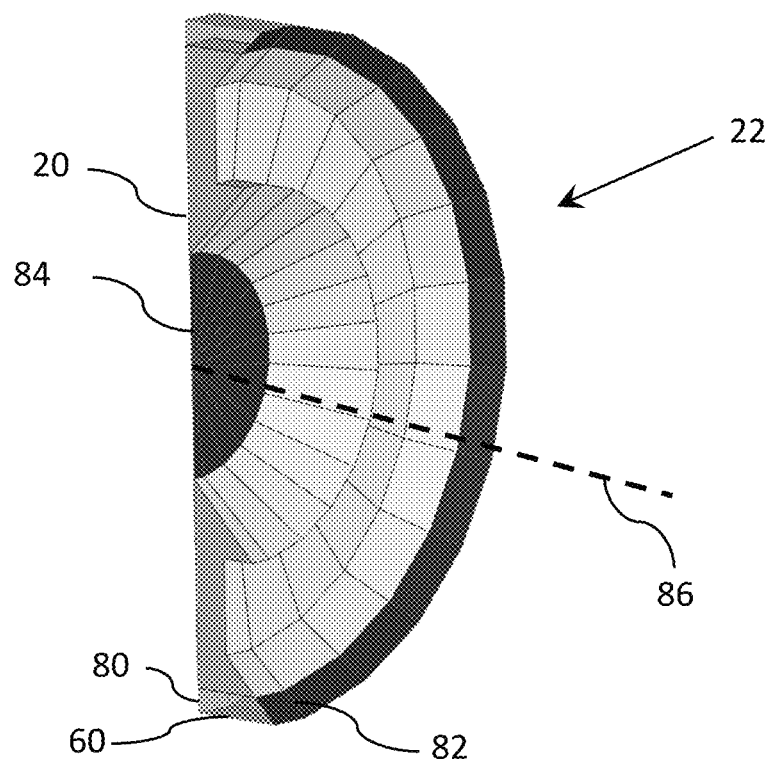
FIG. 4 is another depiction of an embodiment of the present disclosure.

FIG. 4 is a cut-away view of an array 22 of monolithic unit cells 20 arranged in a circumferential pattern around center axis 86. FIG. 4 also shows the locations of hermetic seal 80, front hermetic seal 82, and center hermetic seal 84. Hermetic seals 80 and 82 separate the array of electrically coupled light-sensitive pixel elements 60 from an external environment, such as external environment 90 shown in FIG. 2.

Figure 5:
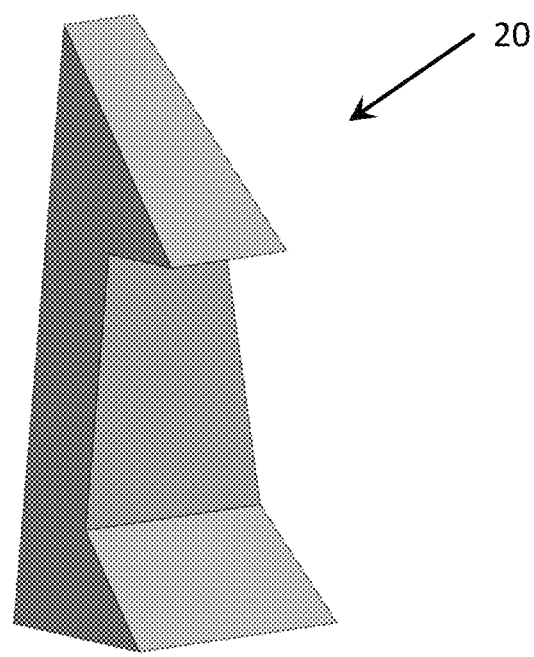
FIG. 5 illustrates a single circumferential, monolithic unit cell.

FIG. 5 illustrates a single monolithic unit cell 20 with a geometry suited for use in the array 22 of monolithic unit cells illustrated in FIG. 4.

Figure 6:
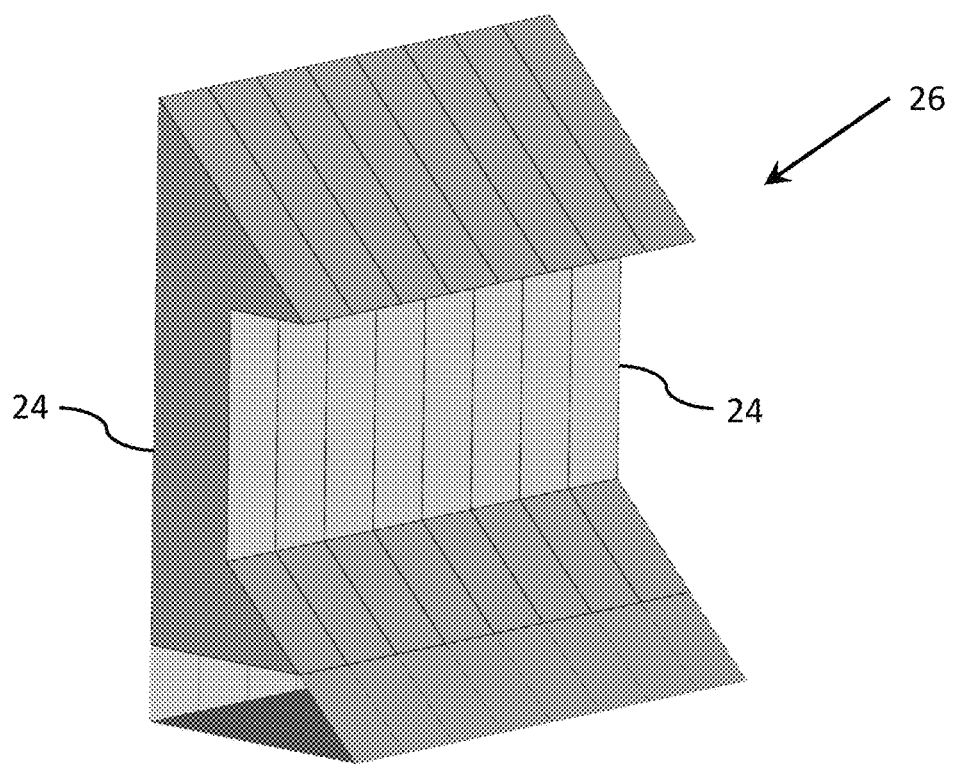
FIG. 6 illustrates an array of monolithic unit cells arranged in a linear pattern.
Figure 7:
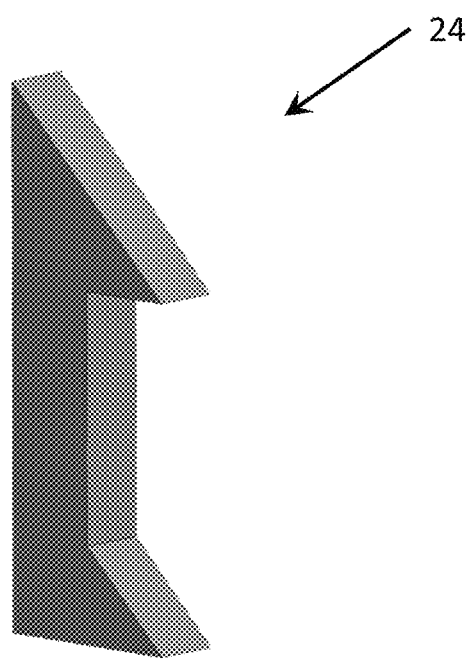
FIG. 7 illustrates another embodiment of a single monolithic unit cell.

Similar to FIG. 4, FIG. 6 illustrates an array 26 of monolithic unit cells 24 arranged in a linear pattern. FIG. 7 illustrates a single monolithic unit cell 24 with a geometry suited for use in the array 26 of monolithic unit cells illustrated in FIG. 6.

Figure 8:
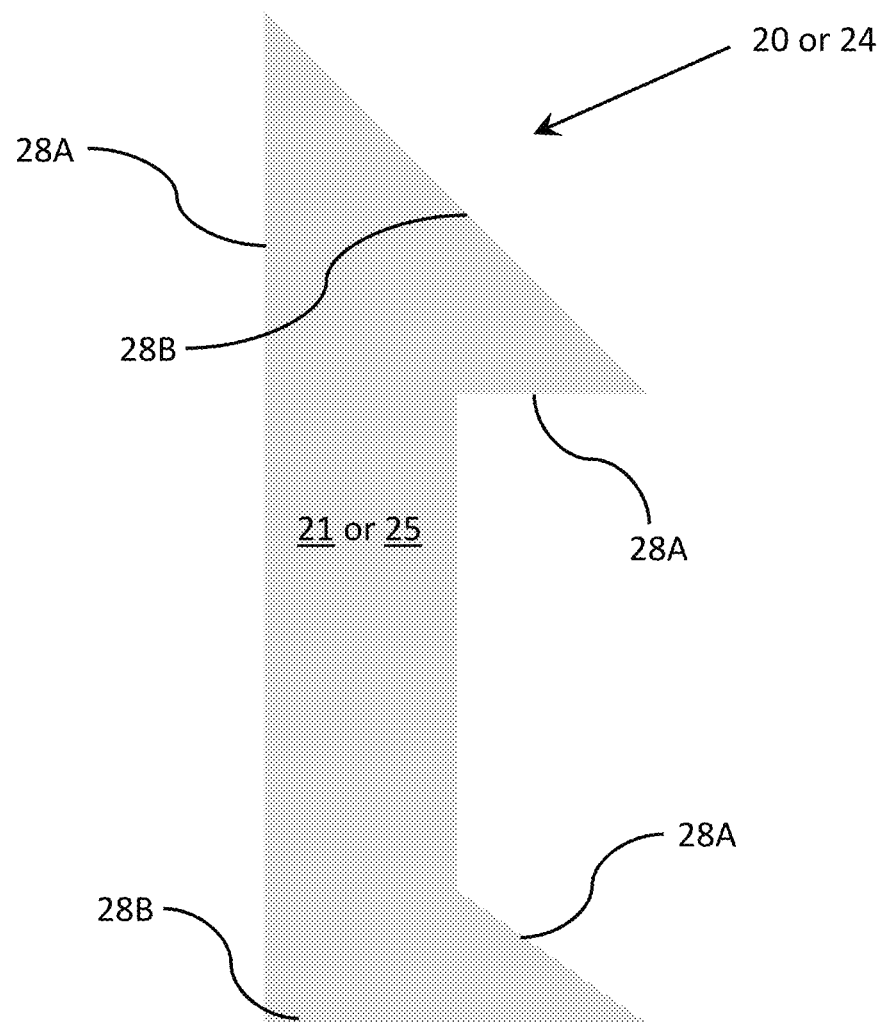
FIG. 8 illustrates a single monolithic unit cell.

FIG. 8 illustrates a single monolithic unit cell 20 or 24. A unit cell 20 or 24 has various external 28A and internal 28B surfaces configured to redirect or reflect light through the unit cell 20 or 24 onto an array of electrically coupled light-sensitive pixel elements (shown in FIG. 4). Monolithic unit cell 20 or 24 has a refractive index 21 or 25 different than that of air or a surrounding environment, such as environment 90.

Figure 9:
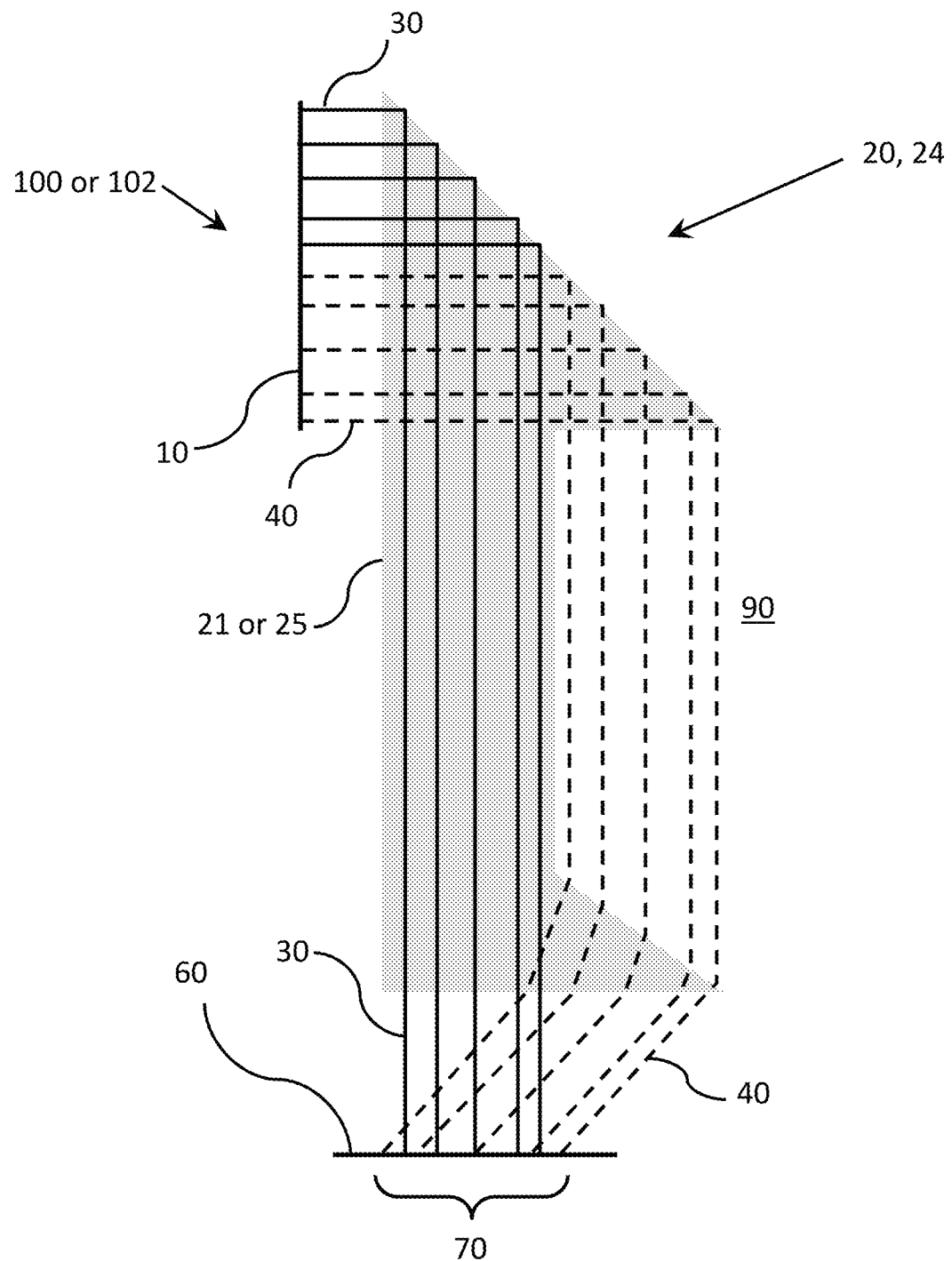
FIG. 9 illustrates a simplified ray trace through the unit cell illustrated in FIG. 8.

FIG. 9 illustrates a simplified ray trace through a unit cell 20 or 24 of interferometer 100 or 102. In embodiments, a first internal optical light path 30 originating from a coherent light source 10 enters the unit cell 20 or 24 through an external surface (such as external surface 28A) where the light or light path 30 is reflected off an internal surface (such as internal surface 28B) and then directed to an array of electrically coupled light-sensitive pixel elements 60. Upon entering the unit cell 20 or 24, internal light path 30 travels entirely within the unit cell 20 or 24 until it exits the unit cell 20 or 24 onto the array of electrically coupled light-sensitive pixel elements 60. In this sense, internal light path 30 is a reference beam.

A first external optical light path 40 similarly originating from the coherent light source 10 enters the unit cell 20 or 24 through an external surface (such as external surface 28A) where the light or light path 40 is reflected off an internal surface (such as internal surface 28B) and then directed back outside the monolithic unit cell 20 or 24 through a first external environment 90 and then back into the monolithic unit cell 20 or 24 and finally onto the array of electrically coupled light-sensitive pixel elements 60. The external environment 90 may be an unknown environment containing unknown gases. Optical light path 40 may be referred to as a probe beam because is passes through an environment being probed by a compact monolithic multi-spectral interferometer, such as interferometer 100 or 102.

Monolithic unit cell 20 or 24 has a refractive index 21 or 25 different from the external environment 90. As the first external optical path 40 travels outside the monolithic unit cell 20 or 24, it experiences a change in refractive index over a known length. The change in refractive index experienced by the first external optical path 40 imparts a phase difference to the first external optical path 40. Therefore, the optical path difference arises not through mechanical actuation (e.g., a rotating or travelling mirror or grating), but because of the refractive index difference between the monolithic unit cell 20 or 24 and the external environment 90.

First internal optical path 30 and first external optical path 40 recombine at the monolithic unit cell 20 or 24 and the array of electrically coupled light-sensitive pixel elements 60 and produce an interferogram 71 (shown in FIGS. 10A, etc.) within interferogram region 70 on the array 60. The interferogram 71 is captured in the form of coherent irradiance on the detector 60. The interferogram 71 may characterize an optical property of the external environment 90 such as its temperature, pressure, refractive index, optical density, or gas molarity of a gas or gases within the external environment 90.

To add a sense of scale to the models, in embodiments, the height, width, and thickness of the simulated monolithic unit cell 20 or 24 geometry is 20 mm, 10 mm, and 4.5 mm, respectively. The bottom of the monolithic structure 20B or 24B is separated from the detector 60 by 10 mm. None of the angles nor lengths of the ray traces replicated are exaggerated.

Figure 10A:
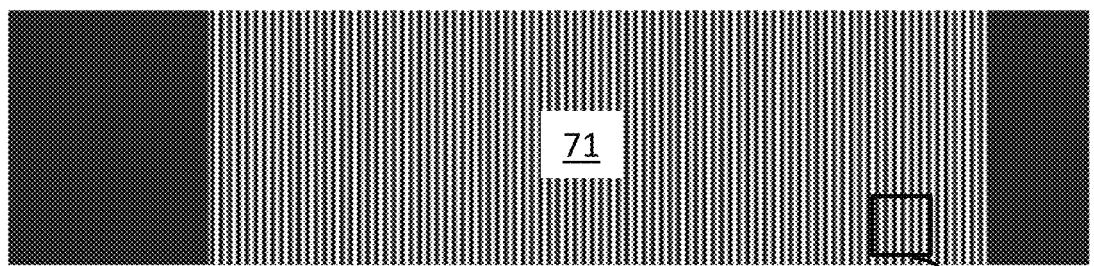
FIG. 10A illustrates the simulated coherent irradiance of an interferogram.
Figure 10B:
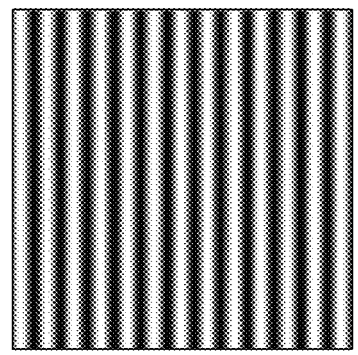
FIG. 10B is an enlarged view of the simulated coherent irradiance of the interferogram illustrated in FIG. 10A.

FIG. 10A illustrates the simulated coherent irradiance of the interferogram 71 created on the detector 60 within interferogram region 70 by the interferometer 100 or 102 described in FIG. 9. FIG. 10B is an enlarged view of the simulated coherent irradiance of the interferogram 71 illustrated in FIG. 10A. The simulated coherent irradiance of the interferogram illustrated in FIG. 10A was modeled using Zemax® OpticStudio® software, Professional version 21.3.2. Zemax® and OpticStudio® are registered trademarks of Zemax, LLC. Unless stated otherwise, all other simulated interferograms illustrated in the various figures and specification of this disclosure were simulated using the same version of Zemax® OpticStudio® software. Similarly, each simulation traces 600 million rays through the interferometer, such as interferometer 100, from the collimated monochromatic coherent source, e.g., coherent light source 10, to the detector, e.g., detector 60. Also, the total output power of the coherent light source, e.g., coherent light source 10, is one watt.

In FIGS. 10A and 10B, the detector 60 is defined as a 10 mm×5 mm array consisting of 3200×200 pixels. The resulting analysis provides a geometric ray trace, coherent irradiance, and coherent phase of an interferogram. In this simulation, the coherent light source, e.g., coherent light source 10 in FIG. 9, has a wavelength of 450 nm. The unit cell 20 or 24 is modeled as FK3 glass from the Schott materials catalogue within the Zemax® OpticStudio® software. In this simulated model, the peak irradiance (e.g., white) has a power per area of 8.131 W/cm$^2$ and the minimum irradiance (e.g., black) has a power per area of 0.210 W/cm$^2$.

Figure 10C:
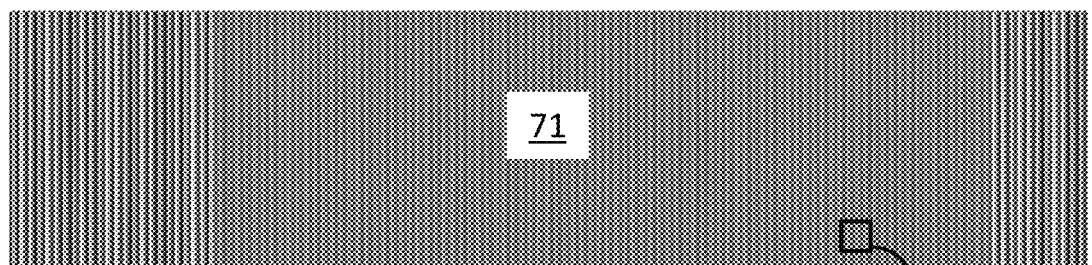
FIG. 10C illustrates the simulated coherent phase of the interferogram created with the same model as described in FIGS. 9, 10A, and 10B.
Figure 10D:
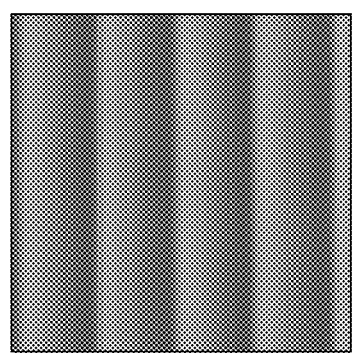
FIG. 10D is an enlarged view of the simulated coherent phase of the interferogram illustrated in FIG. 10C.

FIG. 10C illustrates the simulated coherent phase of the interferogram 71 created with the same model as described in FIGS. 9, 10A, and 10B. An interferogram, such as interferogram 71, includes both the coherent irradiance and coherent phase. Therefore, the interferogram illustrations in FIGS. 10A and 10C are both labeled as 71. The simulated coherent irradiance and phase of various interferograms are similarly labeled throughout the various figures and described in this specification. FIG. 10D is an enlarged view of the simulated coherent phase of the interferogram 71 illustrated in FIG. 10C. In this illustration, the maximum phase (e.g., light gray) value is 179.30 degrees and the minimum phase (e.g., dark gray) value is −179.30 degrees.

Figure 10E:
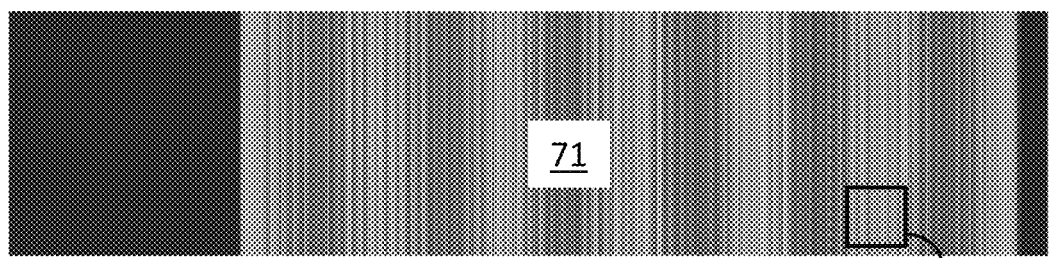
FIG. 10E illustrates the simulated coherent irradiance of the interferogram of the interferometer 100 described in FIG. 9.
Figure 10F:
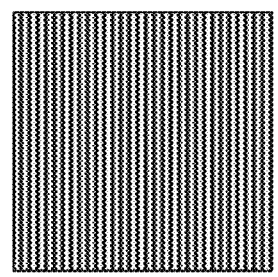
FIG. 10F is an enlarged view of the simulated coherent irradiance of the interferogram illustrated in FIG. 10E.

FIG. 10E illustrates a simulated coherent irradiance of the interferogram 71 from the interferometer 100 described in FIG. 9. FIG. 10F is an enlarged view of the simulated coherent irradiance of the interferogram 71 illustrated in FIG. 10E. In this simulation, the coherent light source 10 has a wavelength of 6000 nm and the unit cell 20 or 24 has been changed to calcium fluoride (CaF$_2$). In this simulated model, the peak irradiance (white) has a power per area of 3.47 W/cm$^2$ and the minimum irradiance (black) has a power per area of 0.07 W/cm$^2$.

Figure 10G:
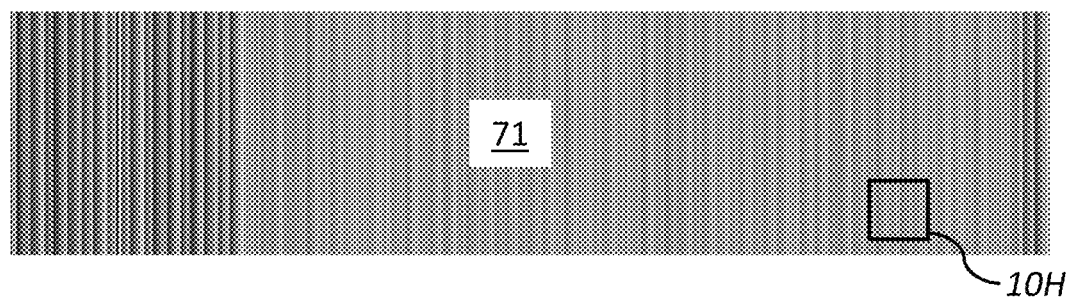
FIG. 10G illustrates the simulated coherent phase of the interferogram created with the same model as described in FIGS. 9, 10E, and 10F.
Figure 10H:
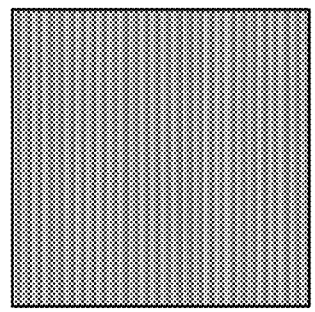
FIG. 10H is an enlarged view of the simulated coherent phase of the interferogram illustrated in FIG. 10G.

FIG. 10G illustrates a simulated coherent phase of the interferogram 71 created with the same model as described in FIGS. 9, 10E, and 10F. FIG. 10H is an enlarged view of the simulated coherent phase of the interferogram 71 illustrated in FIG. 10G. In this illustration, the maximum phase value (light gray) is 87.78 degrees, and the minimum phase value (dark gray) is −11.29 degrees.

Figure 10I:
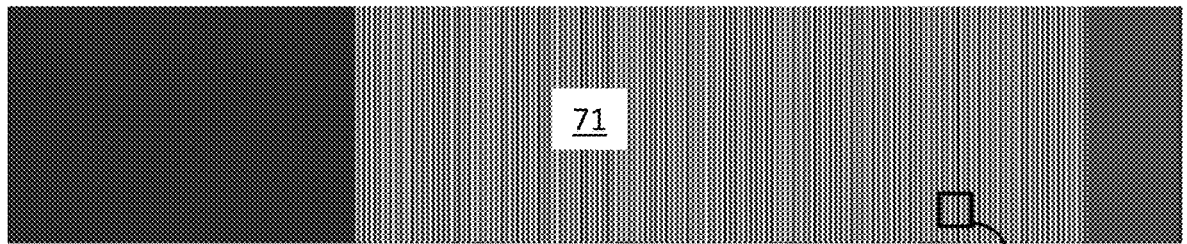
FIG. 10I illustrates the simulated coherent irradiance of the interferogram of the interferometer described in FIG. 9.
Figure 10J:
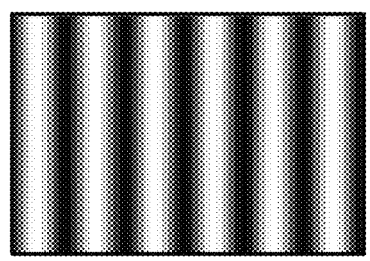
FIG. 10J is an enlarged view of the simulated coherent irradiance of the interferogram illustrated in FIG. 10I.

FIG. 10I illustrates a simulated coherent irradiance of the interferogram 71 from the interferometer 100 described in FIG. 9. FIG. 10J is an enlarged view of the simulated coherent irradiance of the interferogram 71 illustrated in FIG. 10I. In this simulation, the coherent light source 10 has a wavelength of 9000 nm and the unit cell 20 or 24 is made of calcium fluoride (CaF$_2$). In this simulated model, the peak irradiance (white) has a power per area of 2.033 W/cm$^2$ and the minimum irradiance (black) has a power per area of 0.034 W/cm$^2$.

Figure 10K:
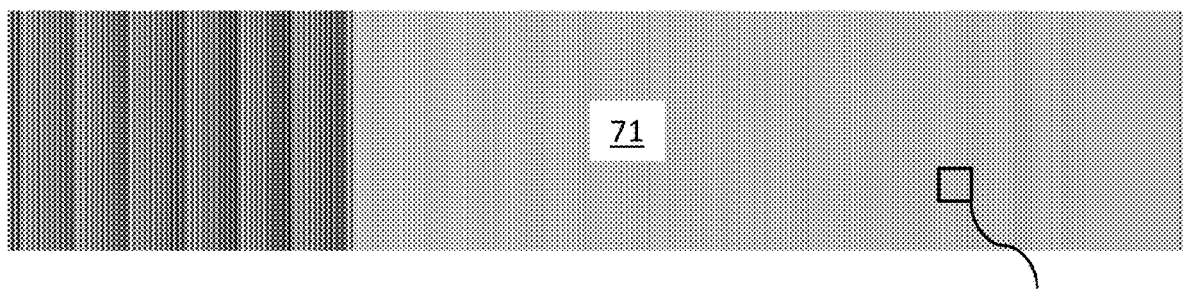
FIG. 10K illustrates the simulated coherent phase of the interferogram created with the same model as described in FIGS. 9, 10I, and 10J.
Figure 10L:
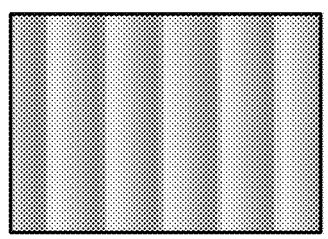
FIG. 10L is an enlarged view of the simulated coherent phase of the interferogram illustrated in FIG. 10K.

FIG. 10K illustrates a simulated coherent phase of the interferogram 71 created with the same model as described in FIGS. 9, 10I, and 10J. FIG. 10L is an enlarged view of the simulated coherent phase of the interferogram 71 illustrated in FIG. 10K. In this illustration, the maximum phase value (light gray) is 131.80 degrees, and the minimum phase value (dark gray) is 30.64 degrees.

The simulated models illustrated in FIGS. 10E through 10K show that the same unit cell 20 or 24 geometry functions equally well in the infrared regime. The same design is equally valid at other source wavelengths as demonstrated here. A spectrum characterizing an optical property of the first external environment 90 can be reconstructed using a Fourier transform of the temporal coherence of the light illustrated in FIGS. 10A and 10B. Thus, the interferogram 71 or data from the interferogram 71, may characterize an optical property of an external environment, such as external environment 90. An optical property may include the external environment's temperature, pressure, refractive index, optical density, or gas molarity of a gas or gases within the external environment 90.

Figure 11:
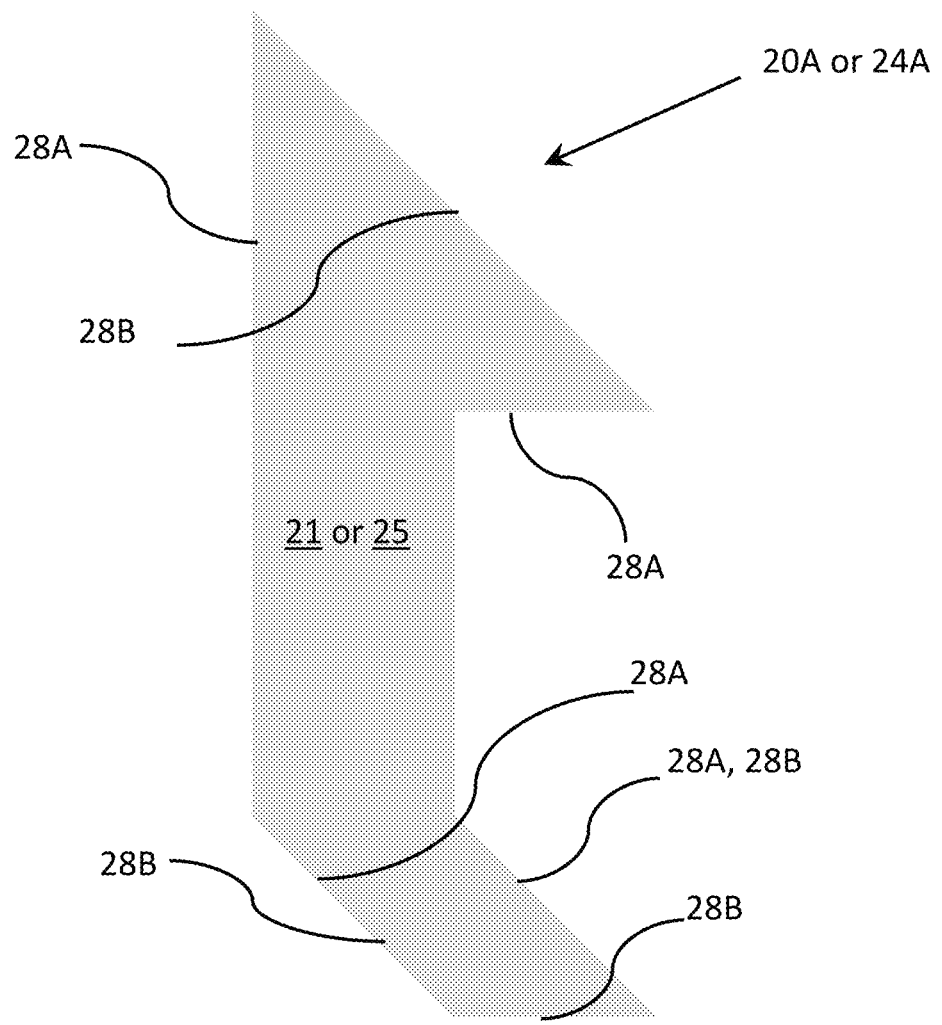
FIG. 11 illustrates another embodiment of a single monolithic unit cell.

FIG. 11 illustrates a single monolithic unit cell 20A or 24A, similar to the single monolithic unit cell 20 or 24 illustrated in FIG. 8. A unit cell 20A or 24A has various external 28A and internal 28B surfaces configured to redirect or reflect light through the unit cell 20A or 24A onto an array of electrically coupled light-sensitive pixel elements (shown in FIG. 4). Monolithic unit cell 20A or 24A has a refractive index 21 or 25 different than that of air, a vacuum, or a surrounding environment, such as environment 90.

Figure 12:
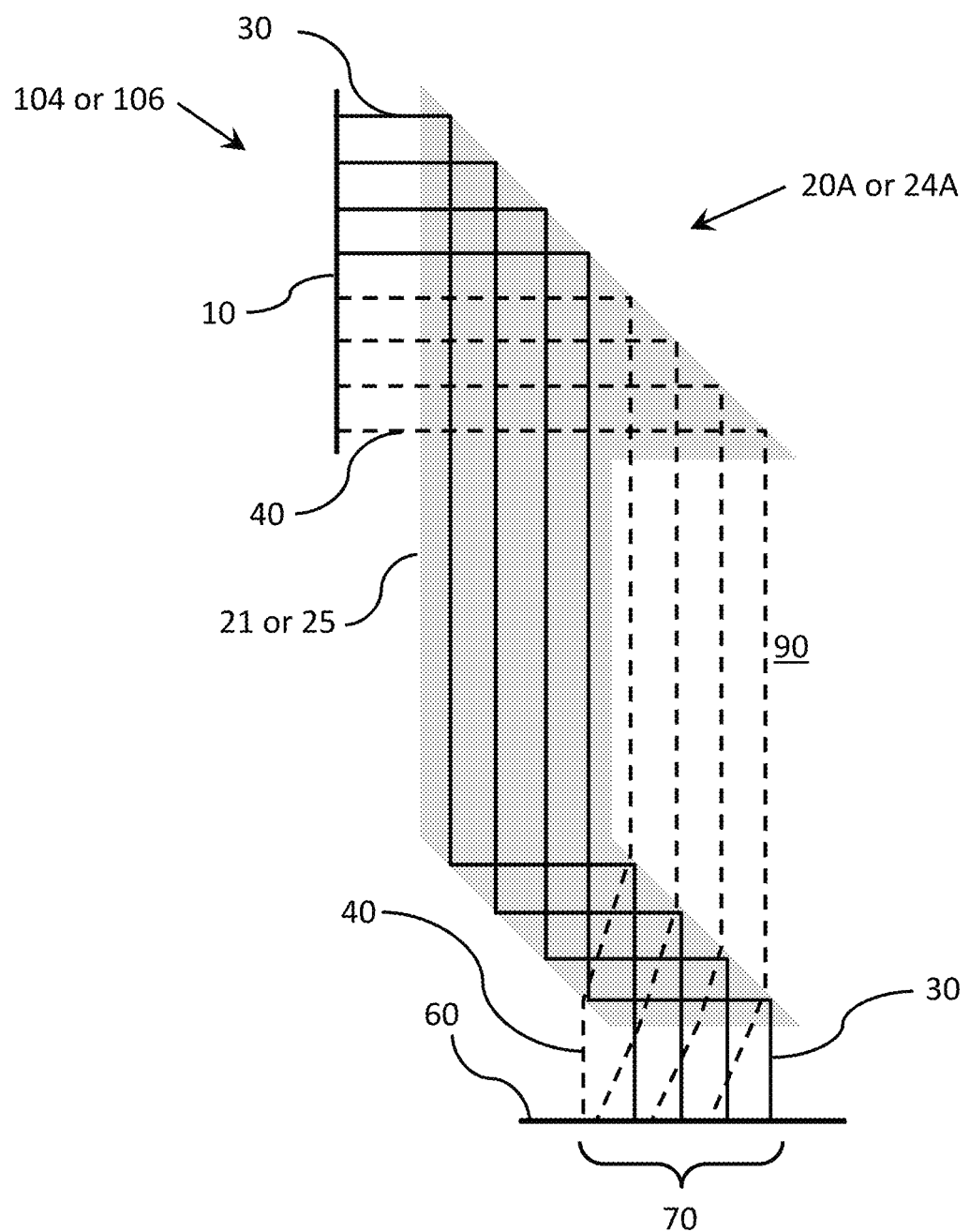
FIG. 12 illustrates a simplified ray trace through the unit cell of FIG. 11.

FIG. 12 illustrates a simplified ray trace through a unit cell 20A or 24A. The ray trace through unit cell 20A or 24A is slightly different than the ray trace through unit cell 20 or 24 illustrated in FIG. 9 as the geometry of the unit cell 20A or 24A is different. In embodiments, a first internal optical light path 30 originating from a coherent light source 10 enters the unit cell 20A or 24A through an external surface (such as external surface 28A illustrated in FIG. 11) where the light or light path 30 is reflected off multiple internal surfaces (such as internal surfaces 28B illustrated in FIG. 11) and then directed to an array of electrically coupled light-sensitive pixel elements 60. Once entering the unit cell 20A or 24A, internal light path 30 travels entirely within the unit cell 20A or 24A until it exits the unit cell 20A or 24A onto the array of electrically coupled light-sensitive pixel elements 60. In this sense, internal light path 30 is a reference beam.

A first external optical light path 40 similarly originating from the coherent light source 10 enters the unit cell 20A or 24A through an external surface (such as external surface 28A illustrated in FIG. 11) where the light or light path 40 is reflected off an internal surface (such as internal surface 28B illustrated in FIG. 11) and then directed back outside the monolithic unit cell 20A or 24A through a first external environment 90 and then back into the monolithic unit cell 20A or 24A and finally onto the array of electrically coupled light-sensitive pixel elements 60. The external environment 90 may be an unknown environment containing unknown gases or other semi-transparent materials. Optical light path 40 may be referred to as a probe beam because is passes through an environment being probed by a compact monolithic multispectral interferometer, such as interferometer 104 or 106.

Monolithic unit cell 20A or 24A has a refractive index 21 or 25 different from the external environment 90. As the first external optical path 40 travels outside the monolithic unit cell 20A or 24A, it experiences a change in refractive index over a known length. The change in refractive index experienced by the first external optical path 40 imparts a phase difference to the first external optical path 40. Therefore, the optical path difference arises not through mechanical actuation (e.g., a rotating or travelling mirror or grating), but because of the refractive index mismatch between the monolithic unit cell 20A or 24A and the external environment 90.

First internal optical path 30 and first external optical path 40 recombine at the array of electrically coupled light-sensitive pixel elements 60 and produce a first interferogram 71 (shown in later figures) within region 70 on the array 60. The interferogram 71 is captured in the form of coherent irradiance on the detector 60. The interferogram 71 may characterize an optical property of the external environment 90 such as its temperature, pressure, refractive index, optical density, or gas molarity of a gas or gases within the external environment 90.

Figure 13A:
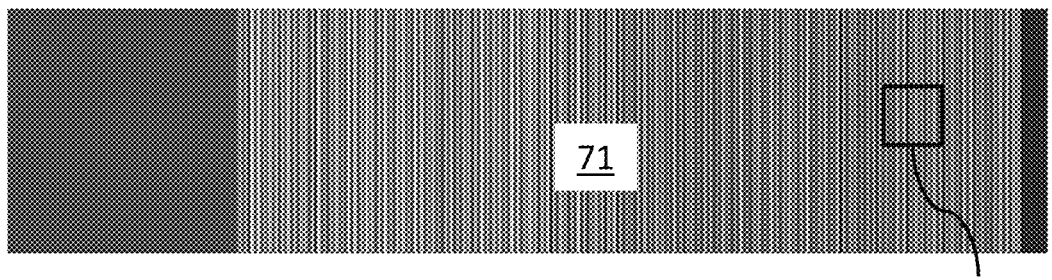
FIG. 13A illustrates the simulated coherent irradiance of the interferogram created by the interferometer illustrated in FIG. 12.
Figure 13B:
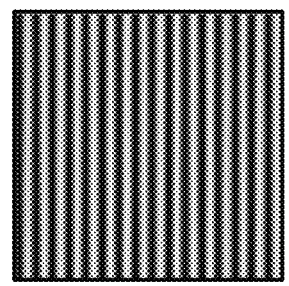
FIG. 13B is an enlarged view of the simulated coherent irradiance of the interferogram illustrated in FIG. 13A.

FIG. 13A illustrates a simulated coherent irradiance of the interferogram 71 created on the detector 60 within interferogram region 70 from the interferometer 104 or 106 illustrated in FIG. 12. FIG. 13B is an enlarged view of the simulated coherent irradiance of the interferogram 71 illustrated in FIG. 13A.

In FIGS. 13A and 13B, the detector 60 is defined as a 10 mm×5 mm array consisting of 3200×200 pixels. The resulting analysis provides a geometric ray trace, coherent irradiance, and coherent phase. In this simulation, the coherent light source, e.g., coherent light source 10 in FIG. 12, has a wavelength of 450 nm. The unit cell 20A or 24A is modeled as FK3 glass from the Schott materials catalogue within the Zemax® OpticStudio® software. In this simulated model, the peak irradiance (e.g., white) has a power per area of 10.98 W/cm$^2$ and the minimum irradiance (e.g., black) has a power per area of 0.191 W/cm$^2$.

Figure 13C:
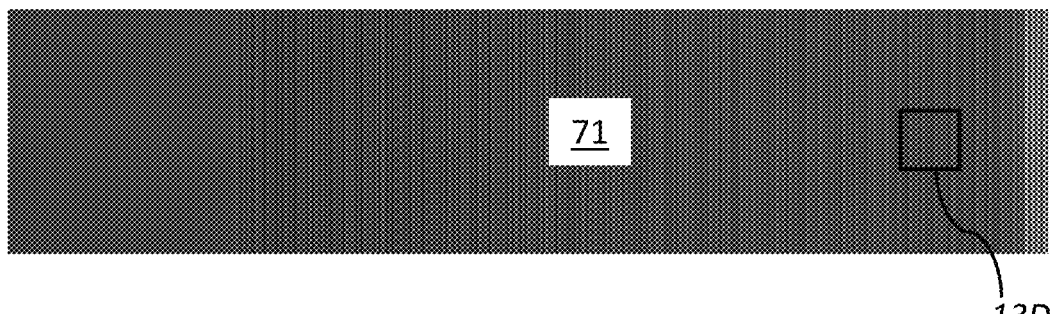
FIG. 13C illustrates the simulated coherent phase of the interferogram created with the same model as described in FIGS. 12, 13A, and 13B.
Figure 13D:
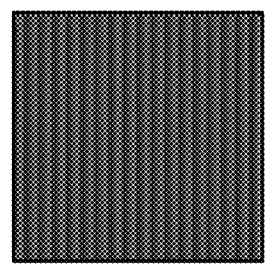
FIG. 13D is an enlarged view of the simulated coherent phase of the interferogram illustrated in FIG. 13C.

FIG. 13C illustrates the simulated coherent phase of the interferogram 71 created with the same model as described in FIGS. 12, 13A, and 13B. FIG. 13D is an enlarged view of the simulated coherent phase of the interferogram 71 illustrated in FIG. 13C. In this illustration, the maximum phase (e.g., light gray) value is −31.11 degrees and the minimum phase (e.g., dark gray) value is −133.80 degrees.

Figure 14:
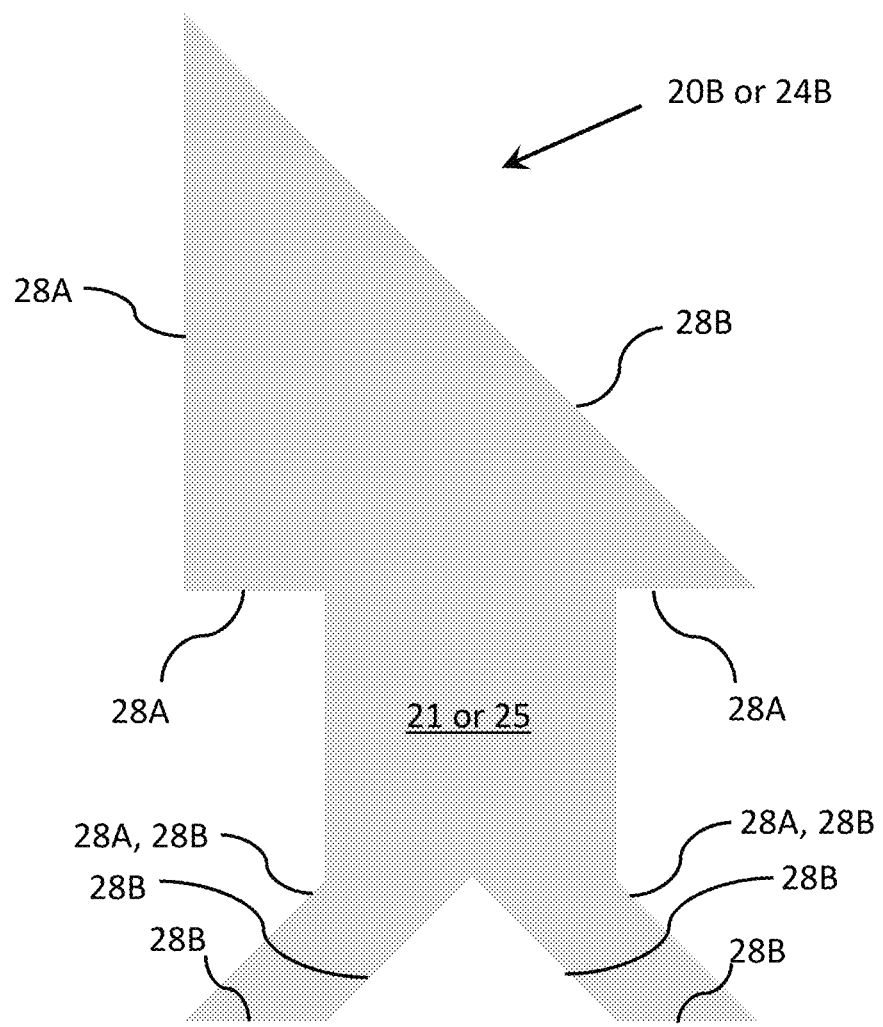
FIG. 14 illustrates another embodiment of a single monolithic unit cell.

FIG. 14 illustrates a single monolithic unit cell 20B or 24B. A unit cell 20B or 24B has various external 28A and internal 28B surfaces configured to redirect or reflect light through the unit cell 20B or 24B onto an array of electrically coupled light-sensitive pixel elements (not shown in FIG. 14). Monolithic unit cell 20B or 24B has a refractive index 21 or 25 different than that of air or a surrounding environment, such as external environment 90 (not shown in FIG. 14).

Figure 15:
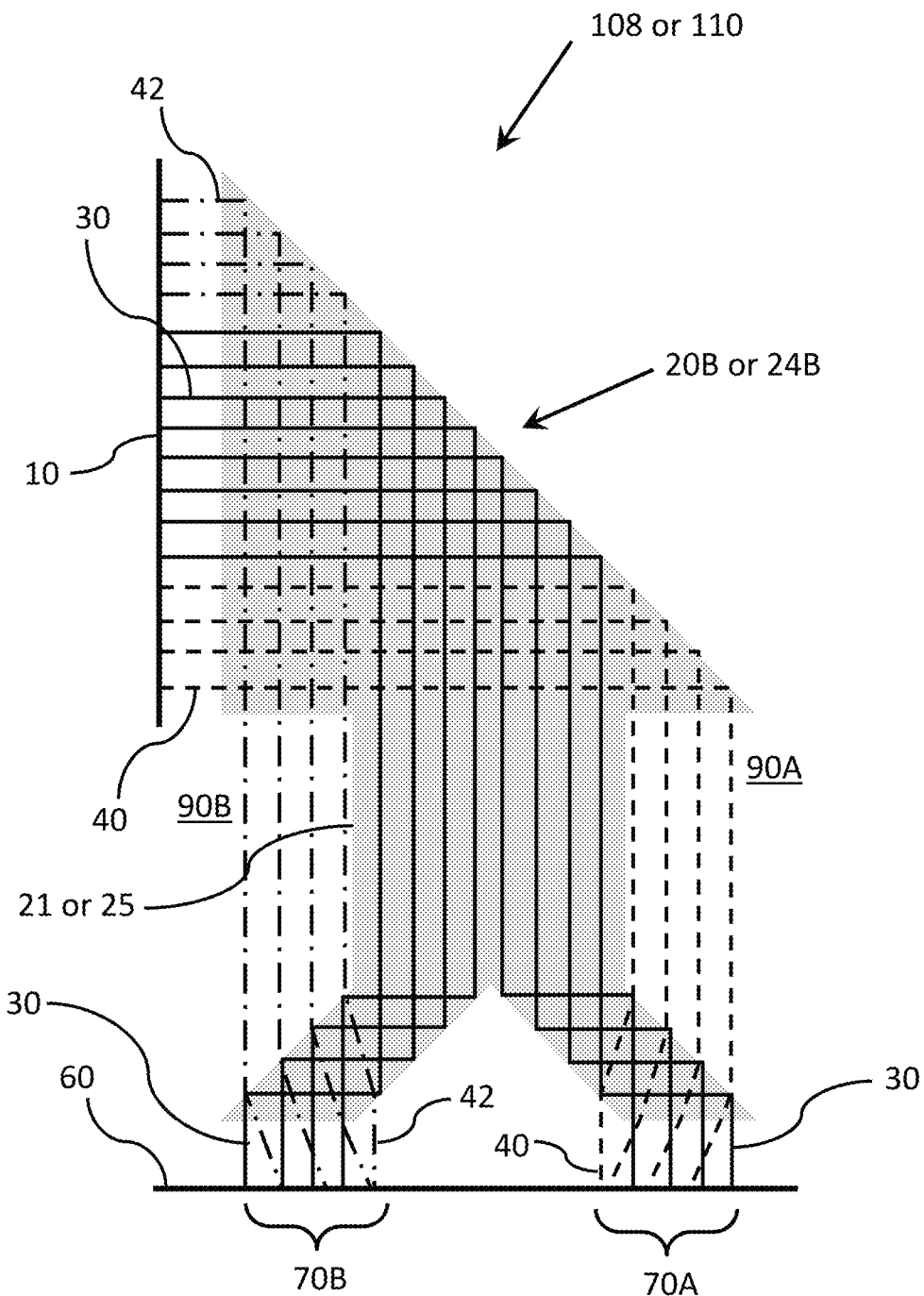
FIG. 15 illustrates a simplified ray trace through the unit cell of FIG. 14.

FIG. 15 illustrates a simplified ray trace through a unit cell 20B or 24B. The ray trace through unit cell 20B or 24B is similar to the ray trace through unit cell 20A or 24A shown in FIG. 12 but includes an additional or second external optical path 42. In embodiments, a first internal optical light path 30 originating from a coherent light source 10 enters the unit cell 20A or 24A through an external surface (such as external surface 28A illustrated in FIG. 14) where the light or light path 30 is reflected off multiple internal surfaces (such as internal surfaces 28B illustrated in FIG. 11) and then directed to an array of electrically coupled light-sensitive pixel elements 60. Once entering the unit cell 20B or 24B, internal light path 30 travels entirely within the unit cell 20B or 24B until it exits the unit cell 20B or 24B onto the array of electrically coupled light-sensitive pixel elements 60. In this sense, internal light path 30 is a reference beam.

A first external optical light path 40 similarly originating from the coherent light source 10 enters the unit cell 20B or 24B through an external surface (such as external surface 28A illustrated in FIG. 14) where the light or light path 40 is reflected off an internal surface (such as internal surface 28B illustrated in FIG. 14) and then directed back outside the monolithic unit cell 20B or 24B through a first external environment 90A and then back into the monolithic unit cell 20B or 24B and finally onto the array of electrically coupled light-sensitive pixel elements 60. The external environment 90A may be an unknown environment containing unknown gases or other semi-transparent materials. Optical light path 40 may be referred to as a probe beam because is passes through an environment being probed by a compact monolithic multispectral interferometer, such as interferometer 108 or 110.

A second external optical light path 42 similarly originating from the coherent light source 10 enters the unit cell 20B or 24B through an external surface (such as external surface 28A illustrated in FIG. 14) where the light or light path 42 is reflected off an internal surface (such as internal surface 28B illustrated in FIG. 14) and then directed back outside the monolithic unit cell 20B or 24B through a second external environment 90B and then back into the monolithic unit cell 20B or 24B and finally onto the array of electrically coupled light-sensitive pixel elements 60. The second external environment 90B may be an unknown environment containing unknown gases or other semi-transparent materials. Optical light path 42 may be referred to as a probe beam because is passes through an environment being probed by a compact monolithic multispectral interferometer, such as interferometer 108 or 110.

Monolithic unit cell 20B or 24B has a refractive index 21 or 25 different from the first external environment 90A or the second external environment 90B. As the first external optical path 40 travels outside the monolithic unit cell 20B or 24B, it experiences a change in refractive index over a known length. Similarly, as the second external optical path 42 travels outside the monolithic unit cell 20B or 24B, it experiences a change in refractive index over a known length. The change in refractive index experienced by the first external optical path 40 and the second external optical path 42 imparts a phase difference to the first external optical path 40 and the second optical light path 42. Therefore, the optical path difference arises not through mechanical actuation (e.g., a rotating or travelling mirror or grating), but because of the refractive index mismatch between the monolithic unit cell 20B or 24B and the first and second external environments 90A and 90B.

First internal optical path 30 and first external optical path 40 recombine at the array of electrically coupled light-sensitive pixel elements 60 and produce a first interferogram 71A (shown in later figures) within region 70A on the array 60. The interferogram 71A is captured in the form of coherent irradiance on the detector 60. The first interferogram 71A within region 70A may characterize an optical property of the external environment 90A such as its temperature, pressure, refractive index, optical density, or gas molarity of a gas or gases within the external environment 90A.

Similarly, first internal optical path 30 and second external optical path 42 recombine at the array of electrically coupled light-sensitive pixel elements 60 and produce a second interferogram 71B (shown in later figures) within region 70B on the array 60. First interferogram 71A and second interferogram 71B are spatially separated from each other as regions 70A and 70B are spatially separated from each other. The interferogram 71B is captured in the form of coherent irradiance on the detector 60. The second interferogram 71B within region 70B may characterize an optical property of the external environment 90B such as its temperature, pressure, refractive index, optical density, or gas molarity of a gas or gases within the external environment 90B.

Figures 16A, 16B:
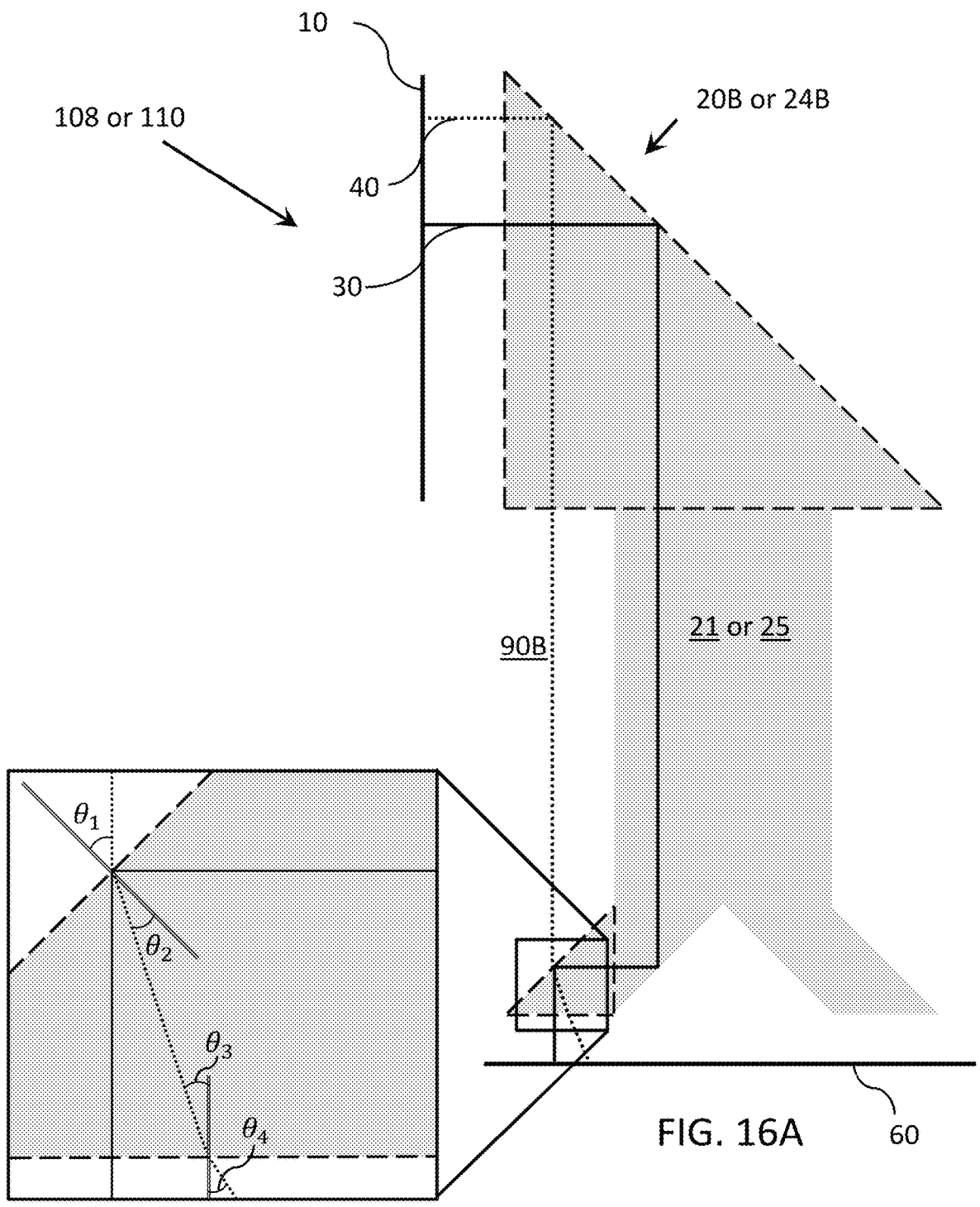
FIG. 16A illustrates the geometry of the monolithic unit illustrated in FIG. 15.
FIG. 16B is an enlarged view of a portion of the monolithic unit cell illustrated in FIG. 16A.

FIG. 16A illustrates the geometry of the monolithic unit cell 20B or 24B of compact monolithic multispectral interferometer 108 or 110 illustrated in FIG. 15. FIG. 16B is an enlarged view of a portion of the monolithic unit cell 20B or 24B illustrated in FIG. 16A. In FIGS. 16A and 16B, collimated light from a monochromatic coherent source 10 enters the top of the unit cell 20B or 24B as internal optical path 30. A face angled at 45° redirects incident rays towards the detector 60 via total internal reflection. The interferometer 108 or 110 is designed such that half of the incident rays are directed through the monolithic structure as internal optical path 30, acting as a reference beam. The other half of the rays are directed outside of the structure as external optical light path 40, acting as the test or "probe" beam. After traversing the free-space environment, the probe rays or external optical light path 40 refract through the second angled face at the foot of the monolithic unit cell 20B or 24B, re-entering the monolithic unit cell 20B or 24B. The reference and probe beams exit the bottom of the monolithic unit cell 20B or 24B and overlap to create an oblique ionogram on the detector 60. Variation in the optical path length between the reference and probe beams generate the interferogram on the detector.

Based on the simplicity of the unit cell 20B or 24B, analytical descriptions of the optical paths 30 and 40 may be derived. Interference between the reference and probe rays (e.g., optical paths 30 and 40) will be constructive when their optical path length difference ($\Delta OPL$) is an integer multiple of the incident light's wavelength ($\Delta OPL = n\lambda$) and destructive when this value is offset by one half the incident light's wavelength ($\Delta OPL = \lambda/2 + n\lambda$). The difference in optical path length gives rise to a phase difference between the two beams, defined by $\varphi = k \sin(\Delta\theta)$. Therefore, it is important to understand how the optical path length difference arises between the reference and probe rays (e.g., optical paths 30 and 40).

In FIGS. 16A and 16B, the unit cell 20B or 24B comprises 45° triangles, outlined with dashed lines. Upon reaching the unit cell, the angle of incidence of each optical path 30 and 40 is the same ($\theta_1 = 45°$). The angle it refracts into the unit cell 20B or 24B is determined by Snell's Law: al $\sin\theta_1 = n_2 \sin\theta_2$. $n_1$ is the refractive index of the environment 90B. Therefore, 1·sin (45°=1.472 $\sin\theta_2$ and $\theta_2 = 28.71°$. Also, $\theta_3 = 45° - 28.71° = 16.29°$. Finally, 1.472·sin(16.29°)=1 sin $\theta_4$. Therefore, $\Delta\theta = \theta_4 = 24.39°$.

Figure 17A:
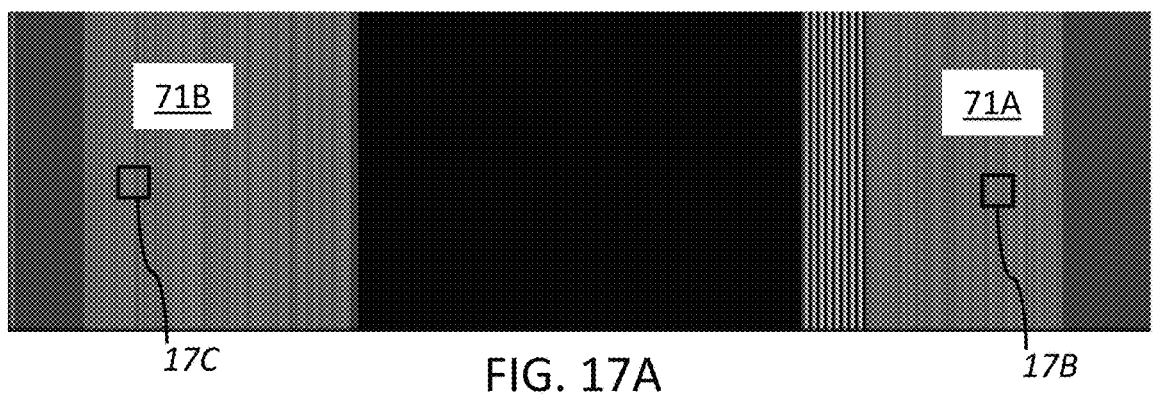
FIG. 17A illustrates the simulated coherent irradiance of the interferogram created by the interferometer illustrated in FIG. 15.
Figure 17C:
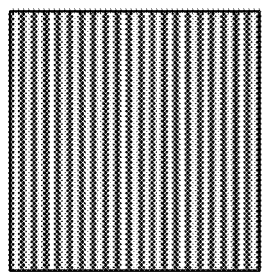
FIGS. 17B and 17C are enlarged views of the simulated coherent irradiance of the interferogram illustrated in FIG. 17A.
Figure 17B:
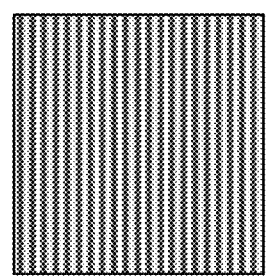

FIG. 17A illustrates the simulated coherent irradiance of the interferograms 71A and 71B created on the detector 60 within regions 70A and 70B from the interferometer 108 or 110 illustrated in FIG. 15. FIGS. 17B and 17C are enlarged views of the simulated coherent irradiance of the interferograms illustrated in FIG. 17A from first interferogram 71A and second interferogram 71B, respectively.

In FIGS. 17A, 17B, and 17C, the detector 60 is defined as a 60 mm×14 mm array consisting of 6000×200 pixels. The resulting analysis provides a geometric ray trace, coherent irradiance, and coherent phase. In this simulation, the coherent light source, e.g., coherent light source 10 in FIG. 15, has a wavelength of 450 nm. The unit cell 20B or 24B is modeled as FK3 glass from the Schott materials catalogue within the Zemax® OpticStudio® software. In this simulated model, the peak irradiance (e.g., white) has a power per area of 0.524 W/cm$^2$ and the minimum irradiance (e.g., black) has a power per area of 0.007 W/cm$^2$.

Figure 17D:
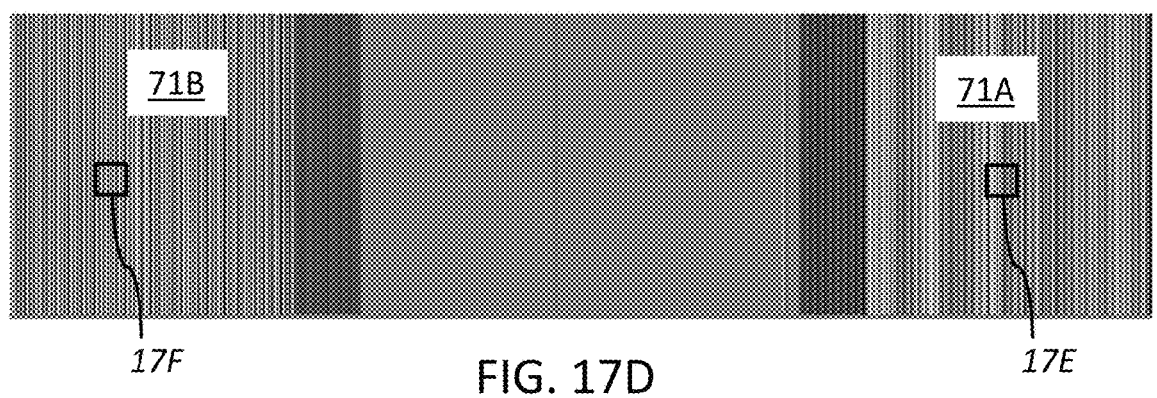
FIG. 17D illustrates the simulated coherent phase of the interferogram created with the same model as described in FIGS. 15, 17A, 17B, and 17C.
Figure 17F:
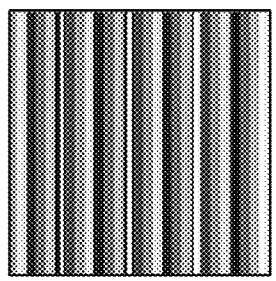
FIGS. 17E and 17F are an enlarged view of the simulated coherent phase of the interferogram illustrated in FIG. 17D.
Figure 17E:
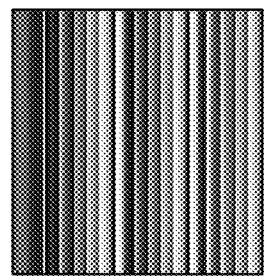

FIG. 17D illustrates the simulated coherent phase of the interferograms 71A and 71B created with the same model as described in FIGS. 15, 17A, 17B, and 17C. FIGS. 17E and 17F are an enlarged views of the simulated coherent phase interferograms illustrated in FIG. 17D. In this illustration, the maximum phase (e.g., light gray) value is 177.90 degrees and the minimum phase (e.g., dark gray) value is −178.70 degrees.

Figure 18:
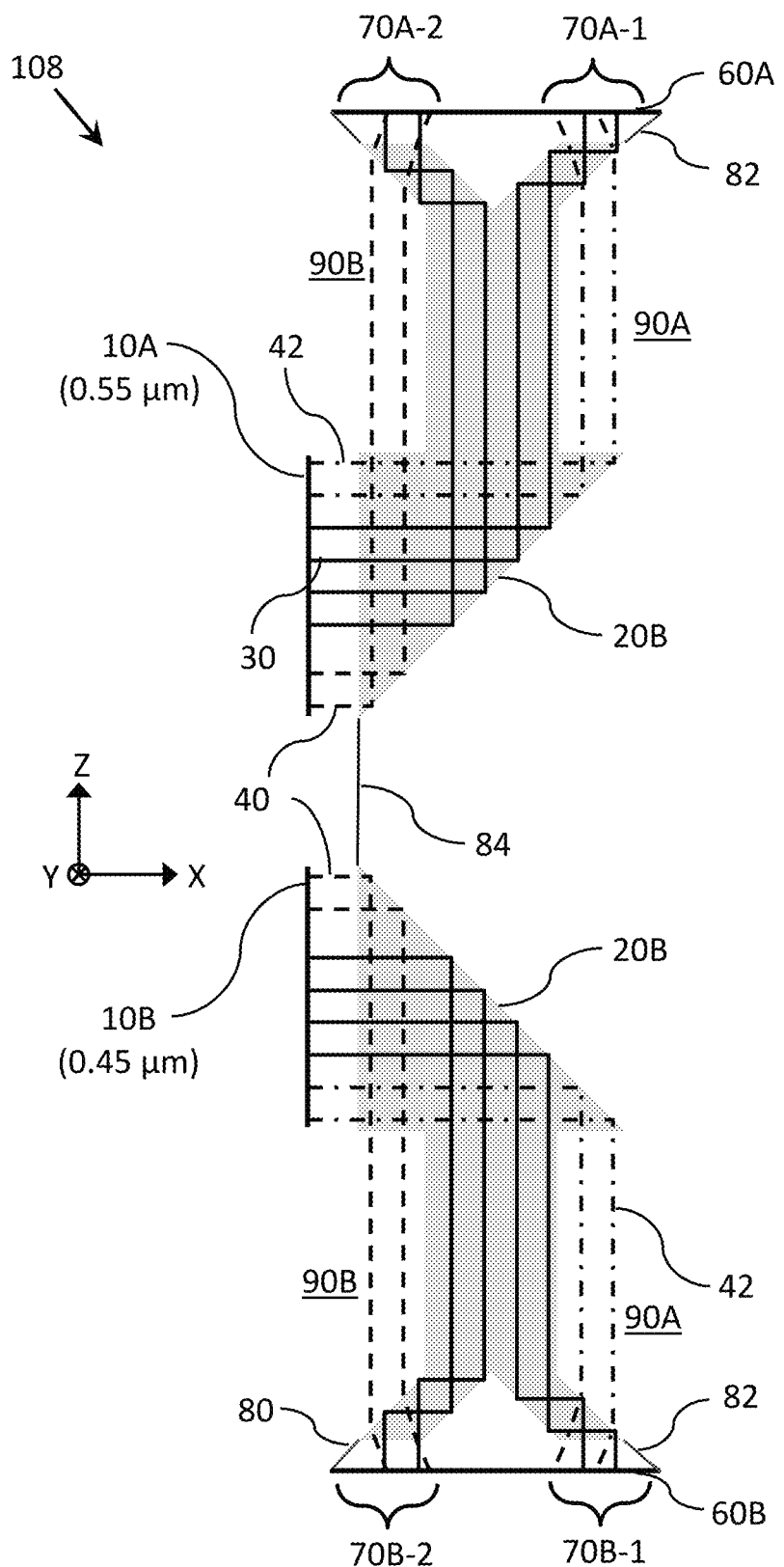
FIG. 18 illustrates a simulated ray-trace through a cross-section of a circumferential compact monolithic multi spectral interferometer.

FIG. 18 illustrates a simulated ray-trace through a cross-section of a circumferential compact monolithic multispectral interferometer 108. The cross-section view of interferometer 108 shows two monolithic unit cells 20B. Each of unit cells 20B use a coherent light source 10A or 10B. Coherent light source 10A has a wavelength of 550 nm and coherent light source 10B has a wavelength of 450 nm. In each unit cell, an interferogram is produced by the optical path length difference between two of the three optical paths: internal path 30, first external path 40 and second external path 42. In both unit cells, internal optical path 30 traverses entirely within the monolithic interferometer unit cell 20B. Also in each unit cell, the first external optical path 40 traverses outside a unit cell 20B, through a first external environment 90A, and back into a unit cell 20B. Similarly, the second external optical path 42 traverses outside a unit cell 20B through a second external environment 90B and back into a unit cell 20B. External environment 90B may be different than external environment 90A. External optical paths 40 and 42 travel outside a unit cell 20B and experience a change in refractive index over a known length. The change in refractive index experienced by the external optical paths imparts a phase difference from the first internal optical path 30. Therefore, the optical path difference arises not through mechanical actuator (ex. rotating mirror or traveling mirror or grating), but through a refractive index mismatch to generate an optical path difference between an internal optical path 30 and the external optical paths 40 and 42.

A first internal optical path 30 and a first external optical path 40 recombine after the first external optical path 40 re-enters and passes through a monolithic unit cell 20B. Similarly, a first internal optical path 30 and a second external optical path 42 recombine after the second external optical path 40 re-enters and passes through a monolithic unit cell 20B. The optical path recombination is oblique, forming an oblique interferogram on sensor 60. The recombination occurs for each unknown environment 90A and 90B.

Figure 19A:
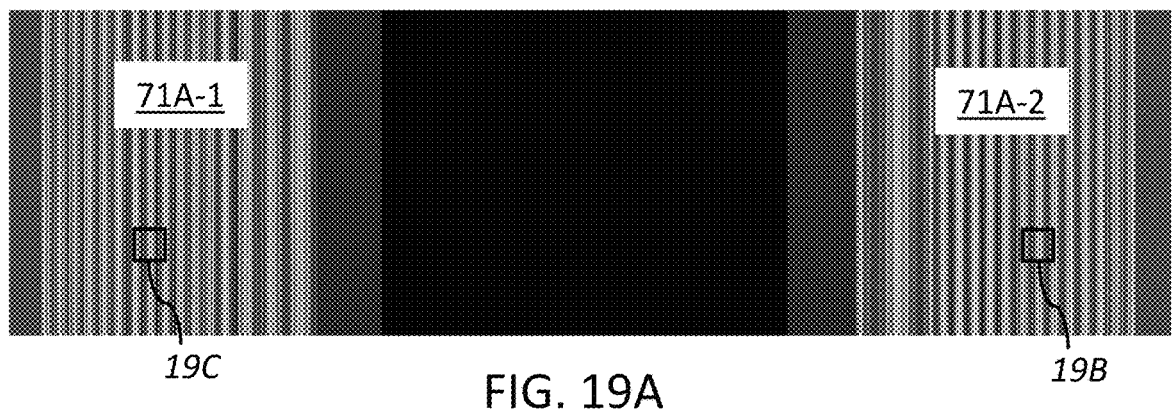
FIG. 19A illustrates the simulated coherent irradiance of the interferogram created by the interferometer illustrated in FIG. 18.
Figure 19C:
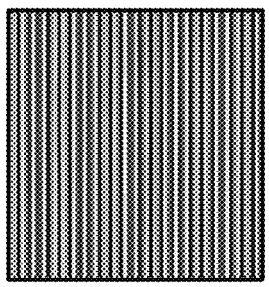
FIGS. 19B and 19C are enlarged views of the simulated coherent irradiance of the interferogram illustrated in FIG. 19A.
Figure 19B:
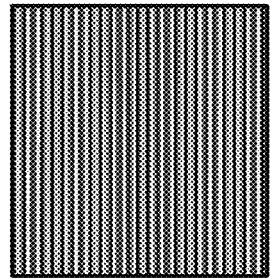

FIG. 19A illustrates the simulated coherent irradiance of the interferograms 71A-1 and 71A-2 created on the detector 60A within interferogram regions 70A-1 and 70A-2 from the interferometer 108 illustrated in FIG. 18. FIGS. 19B and 19C are enlarged views of the simulated coherent irradiance of the interferograms 71A-1 and 71A-2 illustrated in FIG. 19A.

In FIGS. 19A, 19B, and 19C, the detector 60A is defined as an 11 mm×3.5 mm array consisting of 6000×200 pixels. The resulting analysis provides a geometric ray trace, coherent irradiance, and coherent phase. In this simulation, the coherent light source, e.g., coherent light source 10A in FIG. 18, has a wavelength of 450 nm. The unit cell 20B is modeled as FK3 glass from the Schott materials catalogue within the Zemax® OpticStudio® software. In this simulated model, the peak irradiance (e.g., white) has a power per area of 0.896 W/cm$^2$ and the minimum irradiance (e.g., black) has a power per area of 0.012 W/cm$^2$.

Figure 19D:
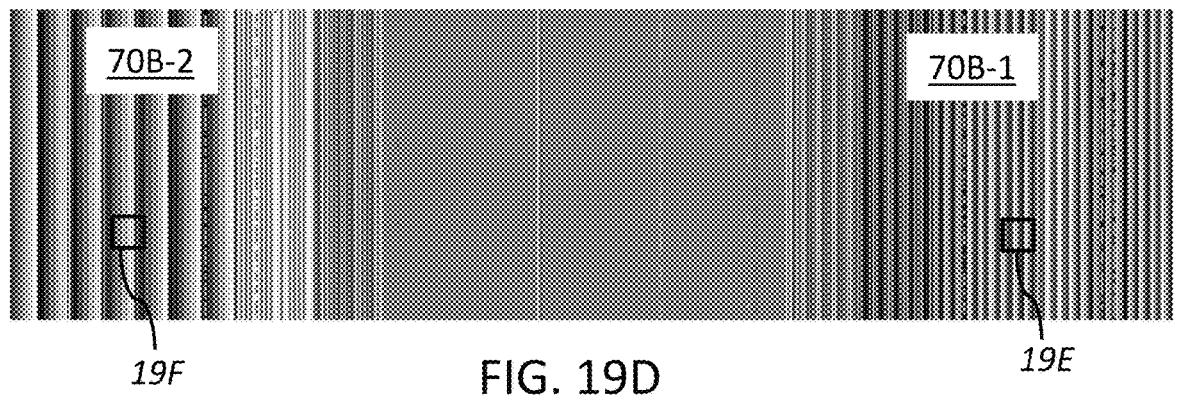
FIG. 19D illustrates the simulated coherent irradiance of the interferogram created by the interferometer illustrated in FIG. 18.
Figure 19F:
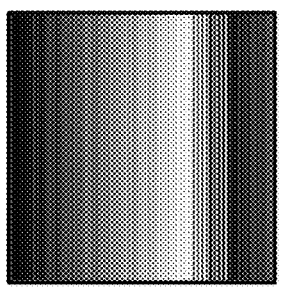
FIGS. 19E and 19F are enlarged views of the simulated coherent irradiance of the interferogram illustrated in FIG. 19D.
Figure 19E:
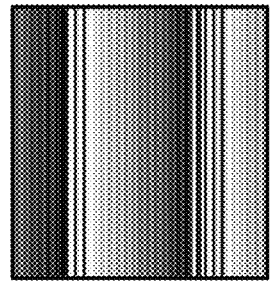

FIG. 19D illustrates the simulated coherent phase of the interferograms 71A-1 and 71A-2 created with the same model as described in FIGS. 18, 19A, 19B, and 19C. FIGS. 19F and 19E are an enlarged view of the simulated coherent phase interferograms 71A-1 and 71A-2 illustrated in FIG. 19D. In this illustration, the maximum phase (e.g., light gray) value is 179.90 degrees and the minimum phase (e.g., dark gray) value is −176.40 degrees.

Figure 20A:
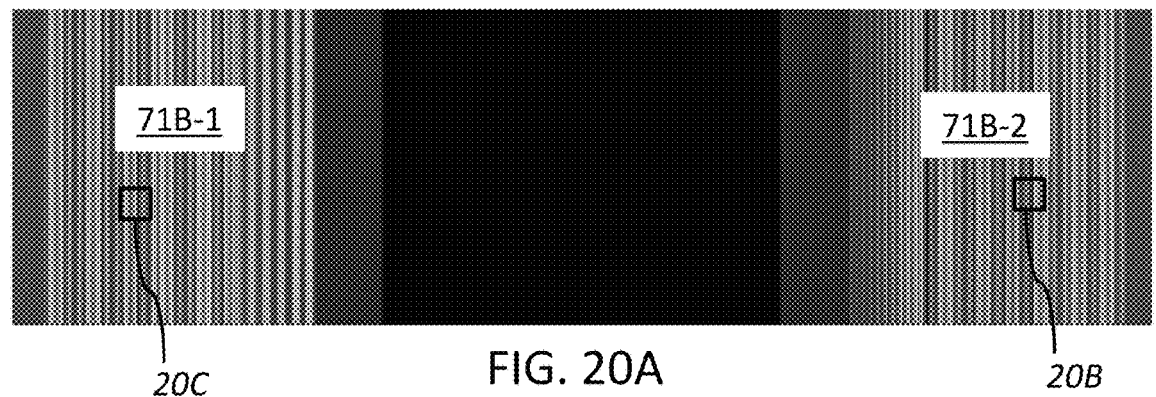
FIG. 20A illustrates another simulated coherent irradiance of the interferogram created by the interferometer illustrated in FIG. 18.
Figure 20C:
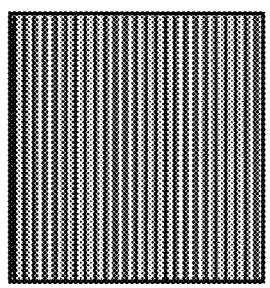
FIGS. 20B and 20C are enlarged views of the simulated coherent irradiance of the interferogram illustrated in FIG. 20A.
Figure 20B:
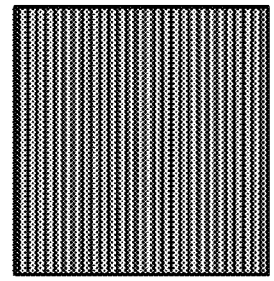

FIG. 20A illustrates the simulated coherent irradiance of the interferograms 71B-1 and 71B-2 created on the detector 60A within regions 70B-1 and 70B-2 from the interferometer 108 illustrated in FIG. 18. FIGS. 20B and 20C are enlarged views of the simulated coherent irradiance of the interferograms 71B-1 and 71B-2 illustrated in FIG. 20A.

In FIGS. 20A, 20B, and 20C, the detector 60B is defined as an 11 mm×3.5 mm array consisting of 6000×200 pixels. The resulting analysis provides a geometric ray trace, coherent irradiance, and coherent phase. In this simulation, the coherent light source, e.g., coherent light source 10A in FIG. 18, has a wavelength of 550 nm. The unit cell 20B is modeled as FK3 glass from the Schott materials catalogue within the Zemax® OpticStudio® software. In this simulated model, the peak irradiance (e.g., white) has a power per area of 0.799 W/cm$^2$ and the minimum irradiance (e.g., black) has a power per area of 0.016 W/cm$^2$.

Figure 20D:
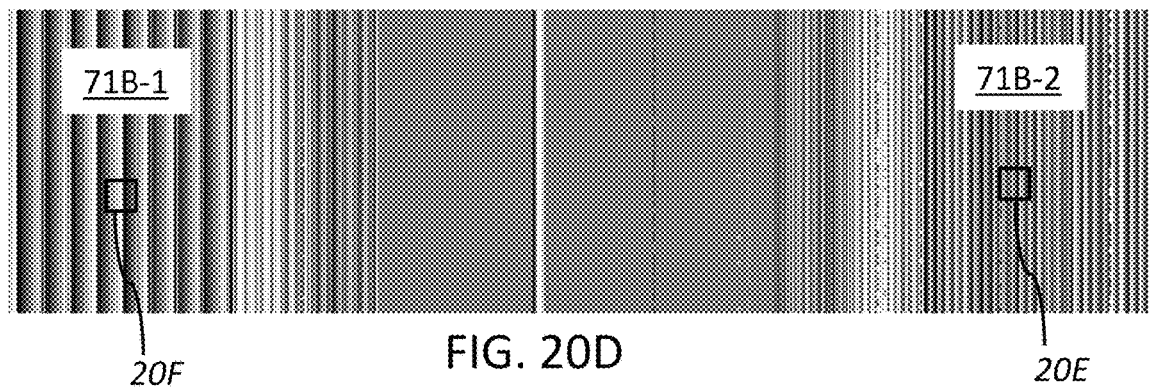
FIG. 20D illustrates the simulated coherent phase of the interferogram created with the same model as described in FIGS. 18, 20A, 20B, and 20C.
Figure 20F:
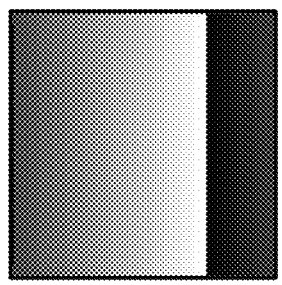
FIGS. 20E and 20F are an enlarged view of the simulated coherent phase of the interferogram illustrated in FIG. 20D.
Figure 20E:
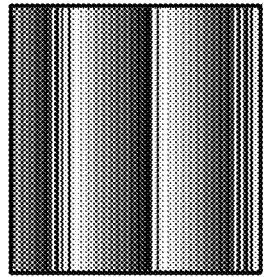

FIG. 20D illustrates the simulated coherent phase of the interferograms 71B-1 and 71B-2 created with the same model as described in FIGS. 18, 20A, 20B, and 20C. FIGS. 20E and 20F are an enlarged view of the simulated coherent phase interferograms 71B-1 and 71B-2 illustrated in FIG. 20D. In this illustration, the maximum phase (e.g., light gray) value is 178.00 degrees and the minimum phase (e.g., dark gray) value is −178.70 degrees.

Figure 21:
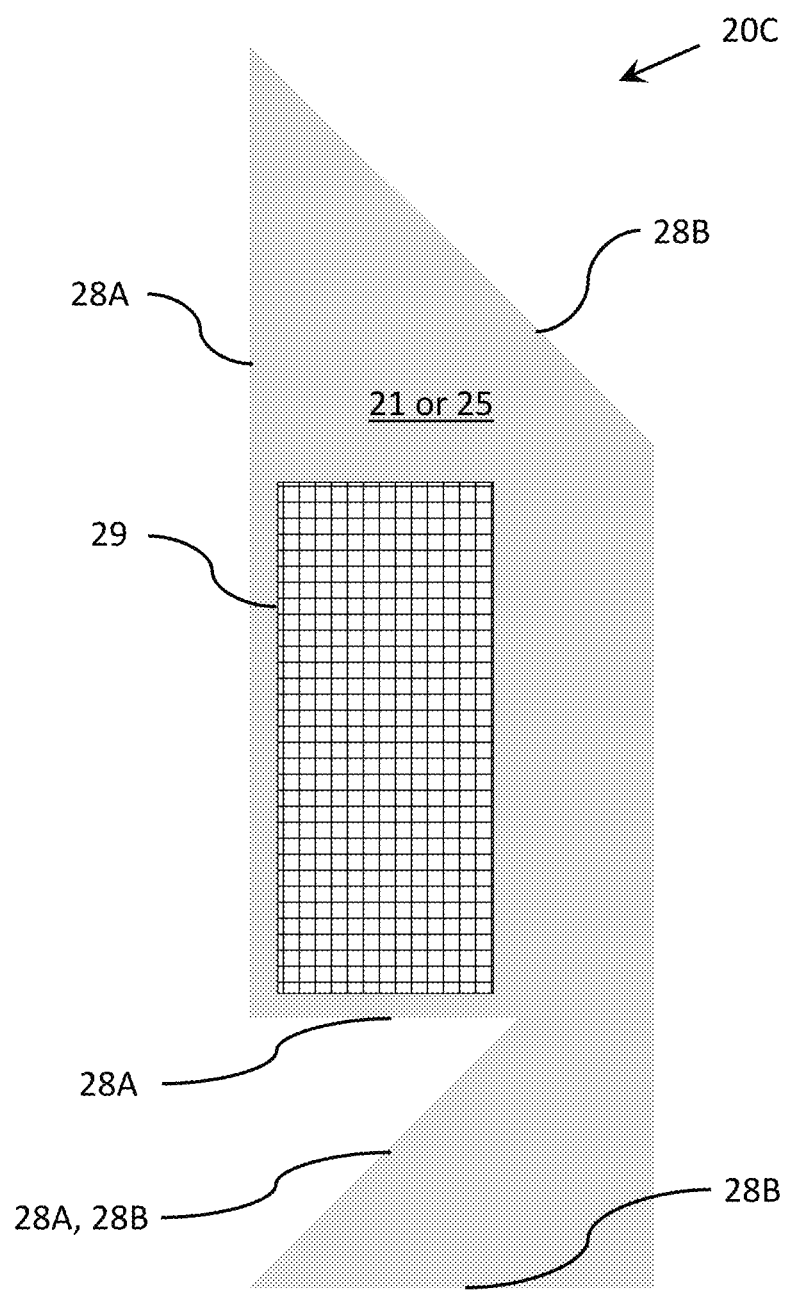
FIG. 21 illustrates another embodiment of a single monolithic unit cell.

FIG. 21 illustrates a single monolithic unit cell 20C. Unit cell 20C has various external 28A and internal 28B surfaces configured to redirect or reflect light through the unit cell 20C onto an array of electrically coupled light-sensitive pixel elements (not shown in FIG. 21). Monolithic unit cell 20C also includes a specimen or gas-cell 29. Monolithic unit cell 20C has a refractive index 21 or 25 different than that specimen cell 29.

Figure 22:
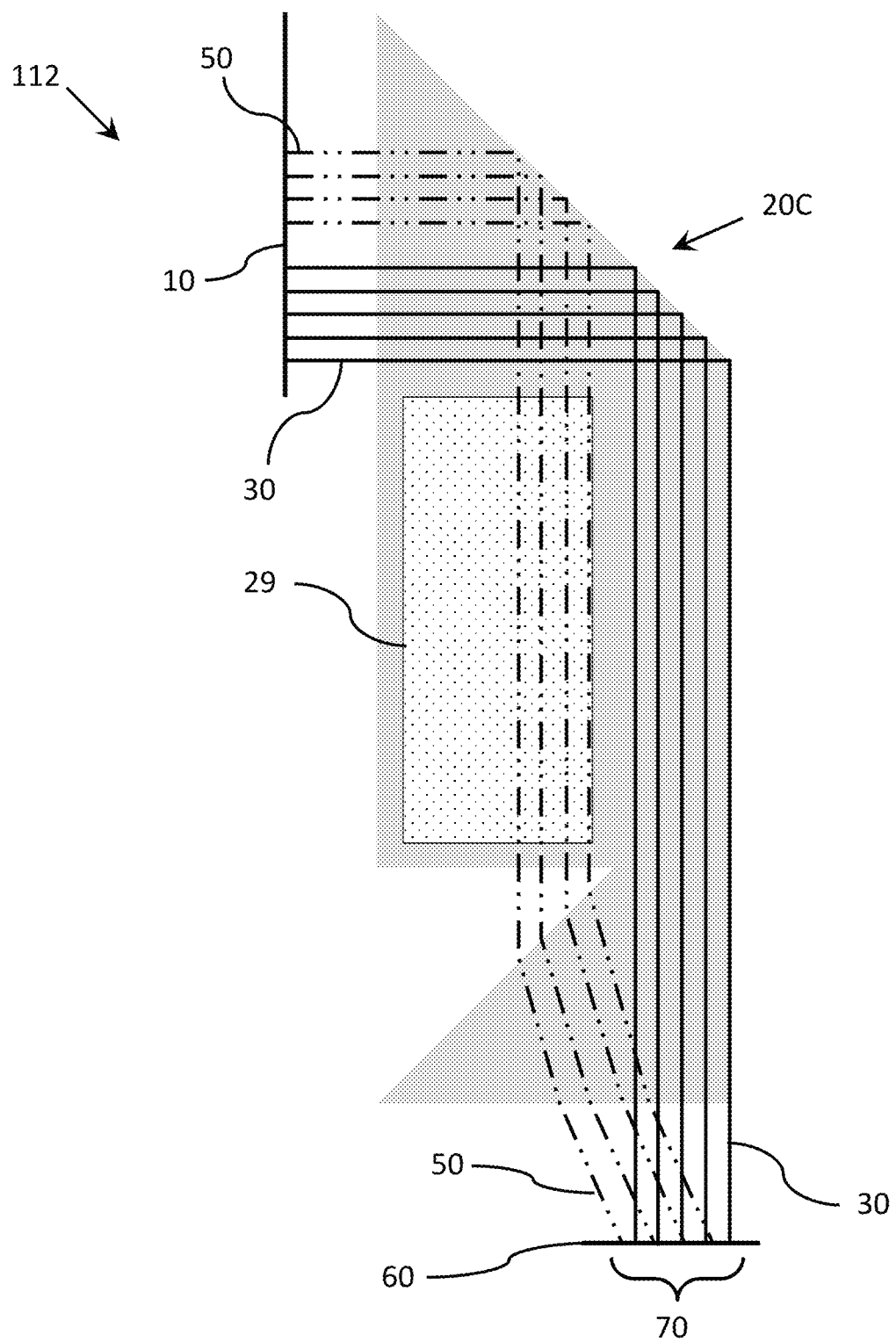
FIG. 22 illustrates a simplified ray trace through the unit cell illustrated in FIG. 21.

FIG. 22 illustrates a simplified ray trace through a unit cell 20C. The ray trace through unit cell 20C is similar to the ray trace through unit cell 20 or 24 shown in FIG. 19 but includes an additional optical path 50 through specimen cell 29 (instead of an external optical path). In embodiments, a first internal optical light path 30 originating from a coherent light source 10 enters the unit cell 20C through an external surface (such as external surface 28A illustrated in FIG. 21) where the light or light path 30 is reflected off multiple internal surfaces (such as internal surfaces 28B illustrated in FIG. 21) and then directed to an array of electrically coupled light-sensitive pixel elements 60. Once entering the unit cell 20C, internal light path 30 travels entirely within the unit cell 20C until it exits the unit cell 20C onto the array of electrically coupled light-sensitive pixel elements 60. In this sense, internal light path 30 is a reference beam.

A first internal gas-cell or specimen cell optical light path 50 similarly originating from the coherent light source 10 enters the unit cell 24C through an external surface (such as external surface 28A illustrated in FIG. 21) where the light or light path 50 is reflected off an internal surface (such as internal surface 28B illustrated in FIG. 21) and then directed back outside the monolithic unit cell 20C through a specimen cell 29 and then back into the monolithic unit cell 20C and finally onto the array of electrically coupled light-sensitive pixel elements 60. The specimen cell 29 may be an unknown environment containing unknown gases or other semi-transparent materials. Optical light path 50 may be referred to as a probe beam because is passes through an environment being probed by a compact monolithic multi-spectral interferometer, such as interferometer 112.

First internal optical path 30 and first internal gas-cell or specimen-cell optical path 50 recombine at the array of electrically coupled light-sensitive pixel elements 60 and produce a first interferogram 71 (shown in later figures) within region 70 on the array 60. The interferogram 71 is captured in the form of coherent irradiance on the detector 60. The first interferogram 71 may characterize an optical property of the internal gas-cell or specimen-cell 29 such as its temperature, pressure, refractive index, optical density, or gas molarity of a gas or gases within the external environment 29.

Figure 23A:
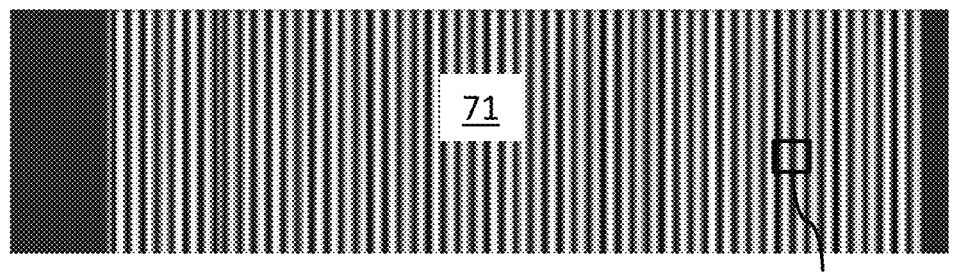
FIG. 23A illustrates the simulated coherent irradiance of the interferogram created by the interferometer illustrated in FIG. 21.
Figure 23B:
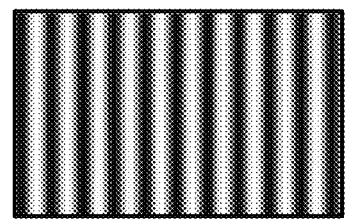
FIG. 23B is an enlarged view of the simulated coherent irradiance of the interferogram illustrated in FIG. 23A.

FIG. 23A illustrates a simulated coherent irradiance of the interferogram 71 created on the detector 60 within interferogram regions 70 from the interferometer 112 illustrated in FIG. 21. FIG. 23B is an enlarged view of the simulated coherent irradiance of the interferogram 71 illustrated in FIG. 23A.

In FIGS. 23A and 23B, the detector 60 is defined as a 5 mm×3 mm array consisting of 3200×200 pixels. The resulting analysis provides a geometric ray trace, coherent irradiance, and coherent phase. In this simulation, the coherent light source, e.g., coherent light source 10 in FIG. 22, has a wavelength of 450 nm. The unit cell 20C is modeled as FK3 glass from the Schott materials catalogue within the Zemax® OpticStudio® software. In this simulated model, the peak irradiance (e.g., white) has a power per area of 19.88 W/cm$^2$ and the minimum irradiance (e.g., black) has a power per area of 0.621 W/cm$^2$.

Figure 23C:
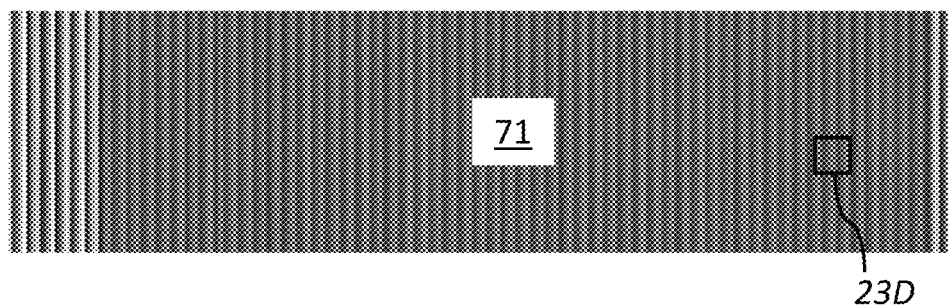
FIG. 23C illustrates the simulated coherent phase of the interferogram created with the same model as described in FIGS. 22, 23A and 23B.
Figure 23D:
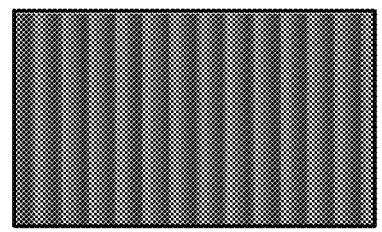
FIG. 23D is an enlarged view of the simulated coherent phase of the interferogram illustrated in FIG. 23C.

FIG. 23C illustrates the simulated coherent phase of the interferogram 71 created with the same model as described in FIGS. 22, 23A and 23B. FIG. 23D is an enlarged view of the simulated coherent phase of the interferogram 71 illustrated in FIG. 23C. In this illustration, the maximum phase (e.g., light gray) value is 3.10 degrees and the minimum phase (e.g., dark gray) value is −85.76 degrees.

Figure 24:
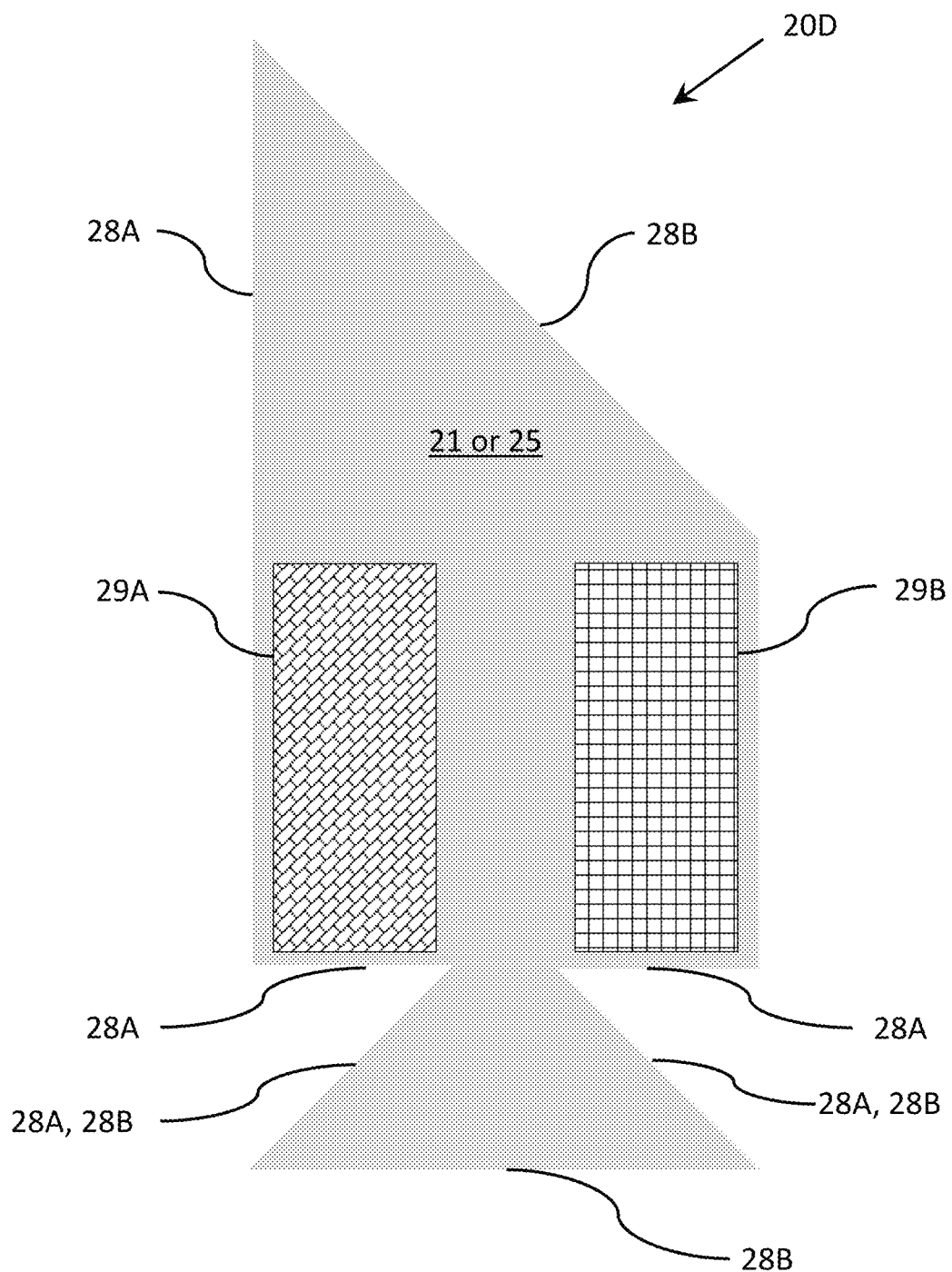
FIG. 24 illustrates another embodiment of a single monolithic unit cell.

FIG. 24 illustrates a single monolithic unit cell 20D. Unit cell 20D has various external 28A and internal 28B surfaces configured to redirect or reflect light through the unit cell 20D onto an array of electrically coupled light-sensitive pixel elements (not shown in FIG. 24). Unit cell 20D also includes specimen or gas-cells 29A and 29B. Specimen or gas-cells 29A or 29B may contain a known or unknown gas at a known or unknown concentration. Monolithic unit cell 20D has a refractive index 21 or 25 different than that of specimen or gas-cells 29A and 29B.

Figure 25:
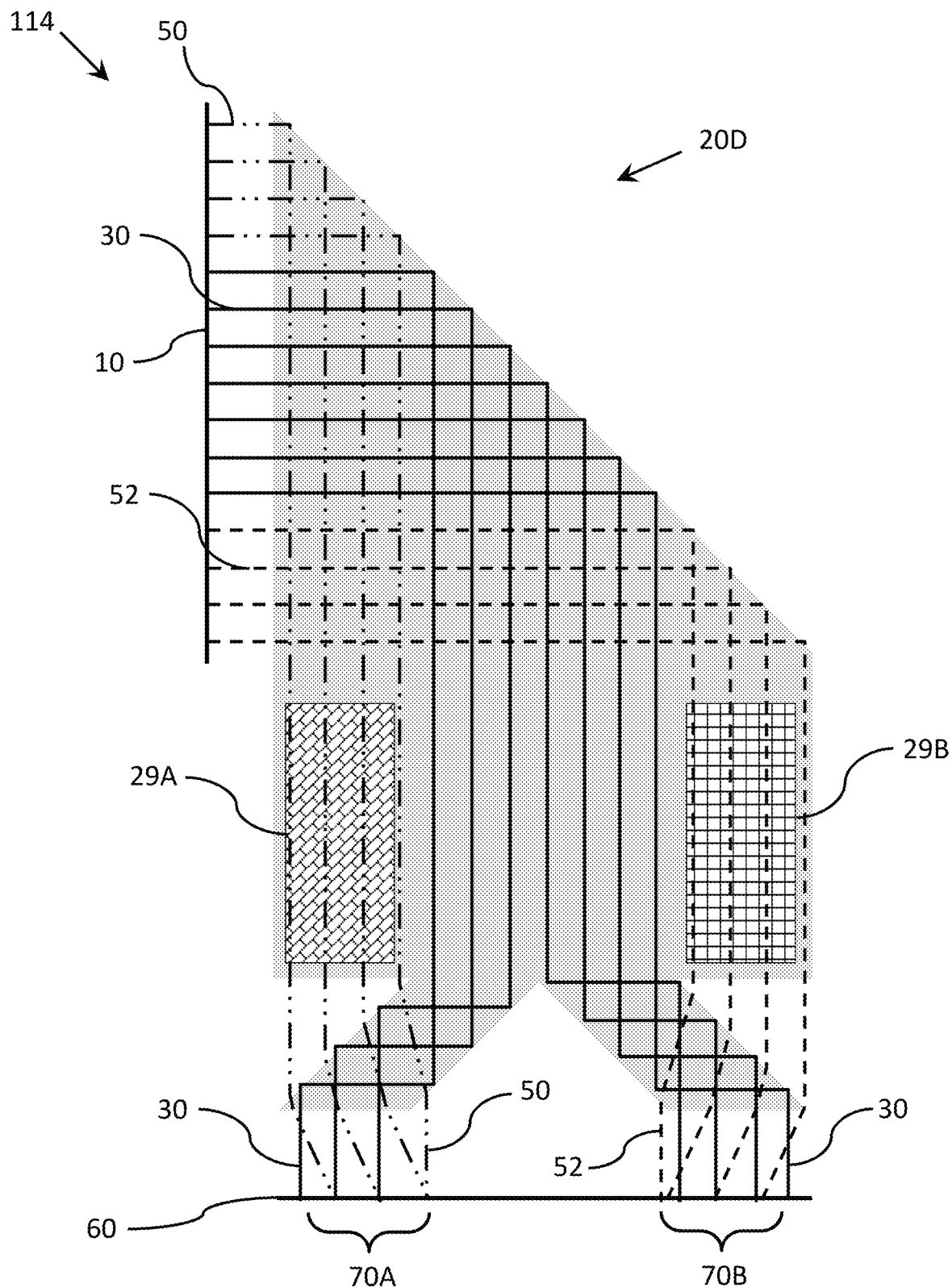
FIG. 25 illustrates a simplified ray trace through the unit cell illustrated in FIG. 24.

FIG. 25 illustrates a simplified ray trace through a unit cell 20D. The ray trace through unit cell 20D is similar to the ray trace through unit cell 20C shown in FIG. 22 but includes an additional optical path 52 through specimen cell 29B. In embodiments, a first internal optical light path 30 originating from a coherent light source 10 enters the unit cell 20D through an external surface (such as external surface 28A illustrated in FIG. 24) where the light or light path 30 is reflected off multiple internal surfaces (such as internal surfaces 28B illustrated in FIG. 24) and then directed to an array of electrically coupled light-sensitive pixel elements 60. Upon entering the unit cell 20D, internal light path 30 travels entirely within the unit cell 20D until it exits the unit cell 20D onto the array of electrically coupled light-sensitive pixel elements 60. In this sense, internal light path 30 is a reference beam.

A first internal gas-cell or specimen cell optical light path 50 similarly originating from the coherent light source 10 enters the unit cell 20D through an external surface (such as external surface 28A illustrated in FIG. 24) where the light or light path 50 is reflected off an internal surface (such as internal surface 28B illustrated in FIG. 24) and then directed back outside the monolithic unit cell 20D through a specimen cell 29A and then back into the monolithic unit cell 20D and finally onto the array of electrically coupled light-sensitive pixel elements 60. The specimen cell 29A may be an unknown environment containing unknown gases. Optical light path 50 may be referred to as a probe beam because is passes through an environment being probed by a compact monolithic multispectral interferometer, such as interferometer 114.

A second internal gas-cell or specimen cell optical light path 52 similarly originating from the coherent light source 10 enters the unit cell 20D through an external surface (such as external surface 28A illustrated in FIG. 24) where the light or light path 52 is reflected off an internal surface (such as internal surface 28B illustrated in FIG. 24) and then directed back outside the monolithic unit cell 20D through a specimen cell 29B and then back into the monolithic unit cell 20D and finally onto the array of electrically coupled light-sensitive pixel elements 60. The specimen cell 29B may be an unknown environment containing unknown gases. Optical light path 52 may be referred to as a probe beam because is passes through an environment being probed by a compact monolithic multispectral interferometer, such as interferometer 114.

First internal optical path 30 and first internal gas-cell or specimen-cell optical path 50 recombine at the array of electrically coupled light-sensitive pixel elements 60 and produce a first interferogram 71A (illustrated in later figures) within region 70A on the array 60. Similarly, first internal optical path 30 and second internal gas-cell or specimen-cell optical path 52 recombine at the array of electrically coupled light-sensitive pixel elements 60 and produce a second interferogram 71B within region 70B on the array 60. An interferogram is captured in the form of coherent irradiance on the detector 60. The first interferogram 70A may characterize an optical property of the internal gas-cell or specimen-cell 29A such as its temperature, pressure, refractive index, optical density, or gas molarity of a gas or gases within the gas cell 29A. Similarly, the second interferogram 70B may characterize an optical property of the internal gas-cell or specimen-cell 29B such as its temperature, pressure, refractive index, optical density, or gas molarity of a gas or gases within the second specimen cell 29B.

Figure 26A:
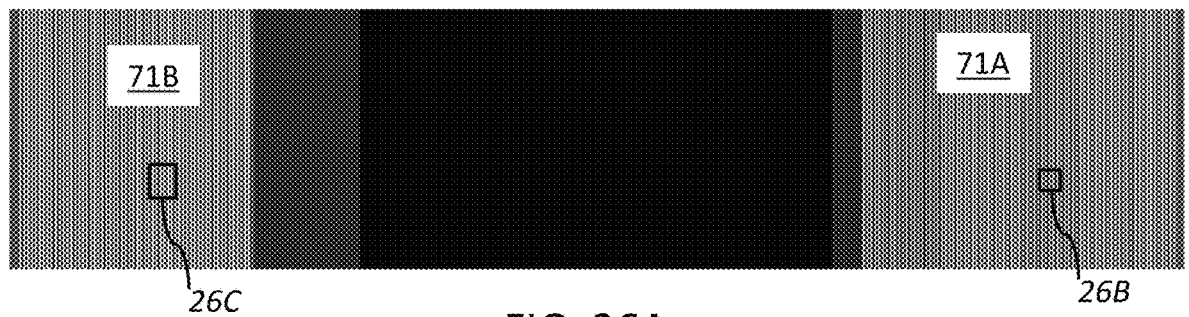
FIG. 26A illustrates the simulated coherent irradiance of the interferogram created by the interferometer illustrated in FIG. 25.
Figure 26C:
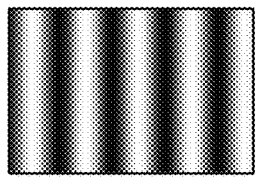
FIGS. 26B and 26C are enlarged views of the simulated coherent irradiance of the interferogram illustrated in FIG. 26A.
Figure 26B:
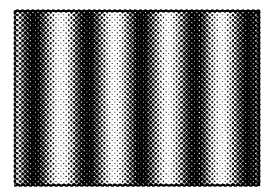

FIG. 26A illustrates a simulated coherent irradiance of the interferogram 71A and 71B created on the detector 60 within interferogram regions 70A and 70B from the interferometer 114 illustrated in FIG. 25. FIGS. 26B and 26C are enlarged views of the simulated coherent irradiance of the interferograms 71A and 71B illustrated in FIG. 26A of regions 70A and 70B, respectively.

In FIGS. 26A, 26B, and 26C, the detector 60 is defined as a 20 mm×5 mm array consisting of 6000×200 pixels. The resulting analysis provides a geometric ray trace, coherent irradiance, and coherent phase. In this simulation, the coherent light source, e.g., coherent light source 10 in FIG. 25, has a wavelength of 450 nm. The unit cell 20D is modeled as FK3 glass from the Schott materials catalogue within the Zemax® OpticStudio® software. In this simulated model, the peak irradiance (e.g., white) has a power per area of 3.504 W/cm$^2$ and the minimum irradiance (e.g., black) has a power per area of 0.093 W/cm$^2$.

Figure 26D:
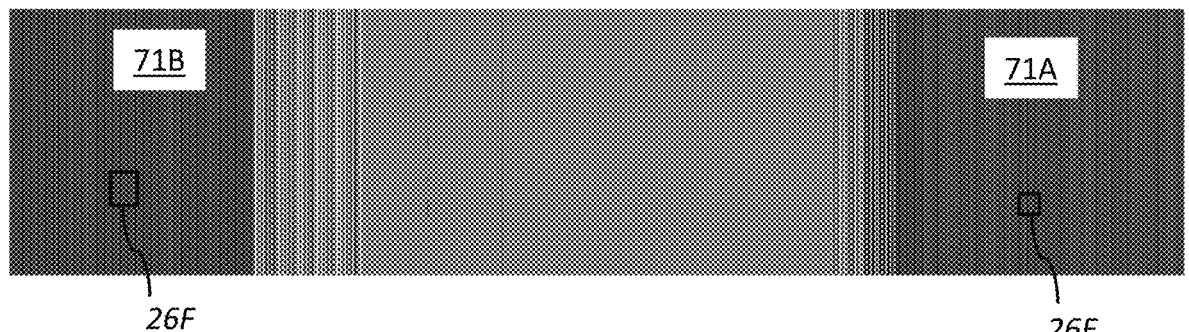
FIG. 26D illustrates the simulated coherent phase of the interferogram created with the same model as described in FIGS. 25, 26A, 26B, and 26C.
Figure 26F:
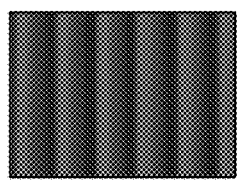
FIGS. 26E and 26F are an enlarged views of the simulated coherent phase of the interferogram illustrated in FIG. 26D.
Figure 26E:
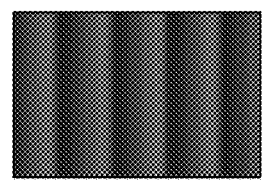

FIG. 26D illustrates the simulated coherent phase of the interferograms 71A and 71B created with the same model as described in FIGS. 25, 26A, 26B, and 26C. FIGS. 26E and 26F are an enlarged views of the simulated coherent phase of the interferograms 71A and 71B illustrated in FIG. 26D. In this illustration, the maximum phase (e.g., light gray) value is −37.98 degrees and the minimum phase (e.g., dark gray) value is −131.1 degrees.

Figure 27:
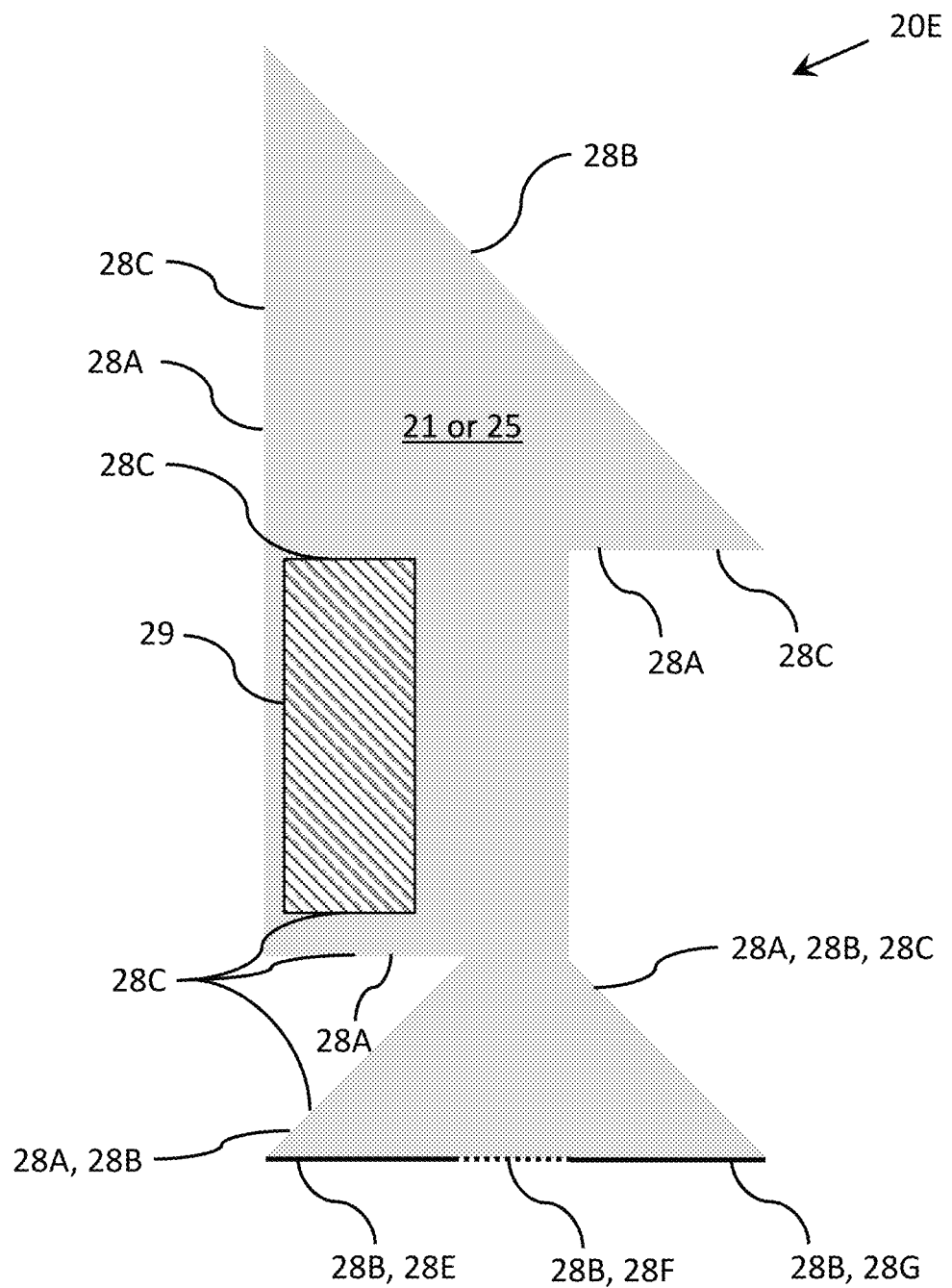
FIG. 27 illustrates another embodiment of a single monolithic unit cell.

FIG. 27 illustrates a single monolithic unit cell 20E. Unit cell 20E has various external 28A and internal 28B surfaces configured to redirect or reflect light through the unit cell 20E onto an array of electrically coupled light-sensitive pixel elements (not shown in FIG. 27). Monolithic unit cell 20E also includes a specimen or gas-cell 29. Gas-cell 29 may contain a known or unknown gas at a known or unknown pressure. In any case, monolithic unit cell 20E has a refractive index 21 or 25 different than that specimen cell 29. In addition, monolithic unit cell 20E has various surfaces that may be coated with anti-reflective or absorptive coatings depending on their purpose to prevent light from reflecting off the surface or absorbing light hitting the surface. For example, surfaces 28C may be coated with an anti-reflective coating. Surfaces 28E, 28F, and 28G (which is also internal surface 28B) may be coated with either an anti-reflective coating or an absorptive coating. Alternatively, surfaces 28E, 28F, and 28G may include a shutter to either independently transmit light passing therethrough or stopping light at that surface. Other monolithic unit cells described herein may be similarly coated with anti-reflective or absorptive coatings or include a shutter.

Figure 28:
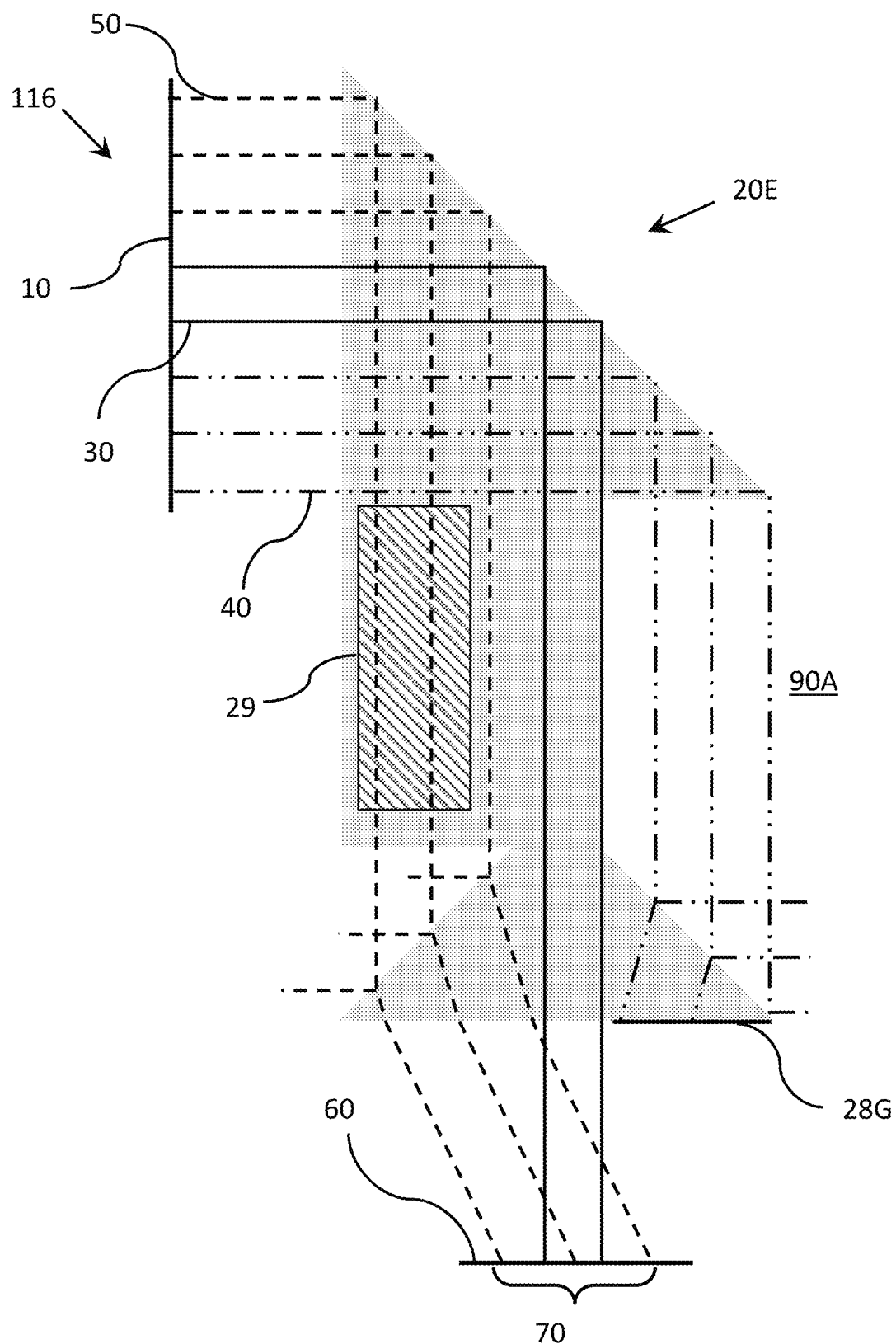
FIG. 28 illustrates a simplified ray trace through the unit cell illustrated in FIG. 27.

FIG. 28 illustrates a simplified ray trace through a unit cell 20E. In embodiments, a first internal optical light path 30 originating from a coherent light source 10 enters the unit cell 20E through an external surface (such as external surface 28A illustrated in FIG. 27) where the light or light path 30 is reflected off multiple internal surfaces (such as internal surfaces 28B illustrated in FIG. 27) and then directed to an array of electrically coupled light-sensitive pixel elements 60. Once entering the unit cell 20E, internal light path 30 travels entirely within the unit cell 20D until it exits the unit cell 20E onto the array of electrically coupled light-sensitive pixel elements 60. In this sense, internal light path 30 is a reference beam.

A first internal gas-cell or specimen cell optical light path 50, similarly originating from the coherent light source 10, enters the unit cell 20E through an external surface (such as external surface 28A illustrated in FIG. 27) where the light or light path 50 is reflected off an internal surface (such as internal surface 28B illustrated in FIG. 27) and then directed back outside the monolithic unit cell 20E through a specimen cell 29 and then back into the monolithic unit cell 20E and finally onto the array of electrically coupled light-sensitive pixel elements 60. The specimen cell 29 may be an unknown environment containing unknown gases at known or unknown pressures. Optical light path 50 may be referred to as a probe beam because is passes through an environment being probed by a compact monolithic multispectral interferometer, such as interferometer 116.

A first external optical light path 40 similarly originating from the coherent light source 10 enters the unit cell 20E through an external surface (such as external surface 28A illustrated in FIG. 27) where the light or light path 40 is reflected off an internal surface (such as internal surface 28B illustrated in FIG. 27) and then directed back outside the monolithic unit cell 20E through a first external environment 90A and then back into the monolithic unit cell 20E where it is absorbed by an absorptive coating or blocked by a shutter at surface 28G.

First internal optical path 30 and first internal gas-cell or specimen-cell optical path 50 recombine at the array of electrically coupled light-sensitive pixel elements 60 and produce a first interferogram 71A (shown in later figures) within region 70 on the array 60. The interferogram 71A is captured in the form of coherent irradiance on the detector 60. The first interferogram 71A may characterize an optical property of the internal gas-cell or specimen-cell 29 such as its temperature, pressure, refractive index, optical density, or gas molarity of a gas or gases within the external environment 29. Gas-cell 29 characterization may take place, in part, because the external light path 40 is blocked at surface 28G and does not reach detector 60.

Figure 29A:
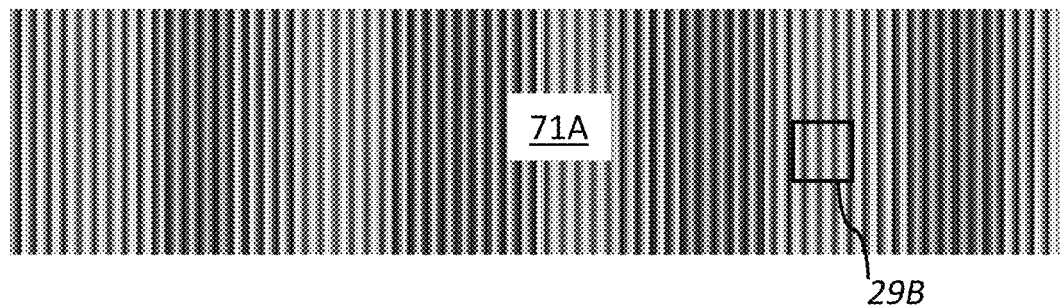
FIG. 29A illustrates the simulated coherent irradiance of the interferogram created by the interferometer illustrated in FIG. 27.
Figure 29B:
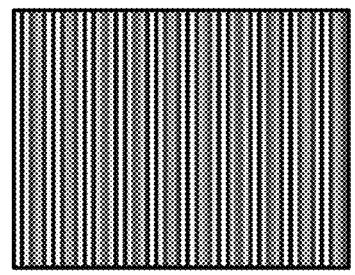
FIG. 29B is an enlarged view of the simulated coherent irradiance of the interferogram illustrated in FIG. 29A.

FIG. 29A illustrates a simulated coherent irradiance of the first interferogram 71A created on the detector 60 within interferogram region 70 from the interferometer 116 illustrated in FIG. 27. FIG. 29B is an enlarged view of the simulated coherent irradiance of the first interferogram 71A illustrated in FIG. 29A.

In FIGS. 29A and 29B, the detector 60 is defined as a 5 mm×3.5 mm array consisting of 3200×200 pixels. The resulting analysis provides a geometric ray trace, coherent irradiance, and coherent phase. In this simulation, the coherent light source, e.g., coherent light source 10 in FIG. 28, has a wavelength of 450 nm. The unit cell 20E is modeled as FK3 glass from the Schott materials catalogue within the Zemax® OpticStudio® software. In this simulated model, the peak irradiance (e.g., white) has a power per area of 7.387 W/cm$^2$ and the minimum irradiance (e.g., black) has a power per area of 0.212 W/cm$^2$.

Figure 29C:
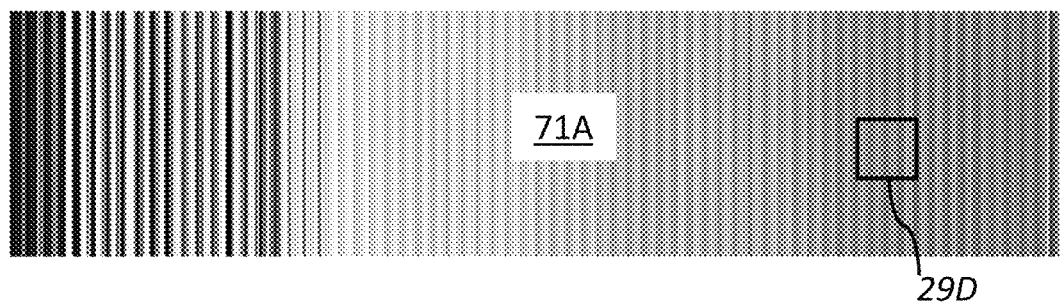
FIG. 29C illustrates the simulated coherent phase of the interferogram created with the same model as described in FIGS. 28, 29A, and 29B.
Figure 29D:
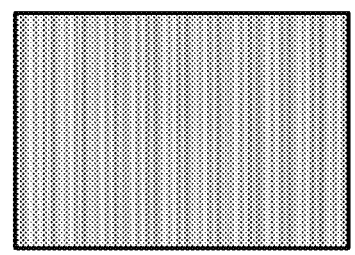
FIG. 29D is an enlarged view of the simulated coherent phase of the interferogram illustrated in FIG. 29C.

FIG. 29C illustrates the simulated coherent phase of the first interferogram 71A created with the same model as described in FIGS. 28, 29A, and 29B. FIG. 29D is an enlarged view of the simulated coherent phase the first interferogram 71A illustrated in FIG. 29C. In this illustration, the maximum phase (e.g., light gray) value is 176.8 degrees and the minimum phase (e.g., dark gray) value is −78.90 degrees.

Figure 30:
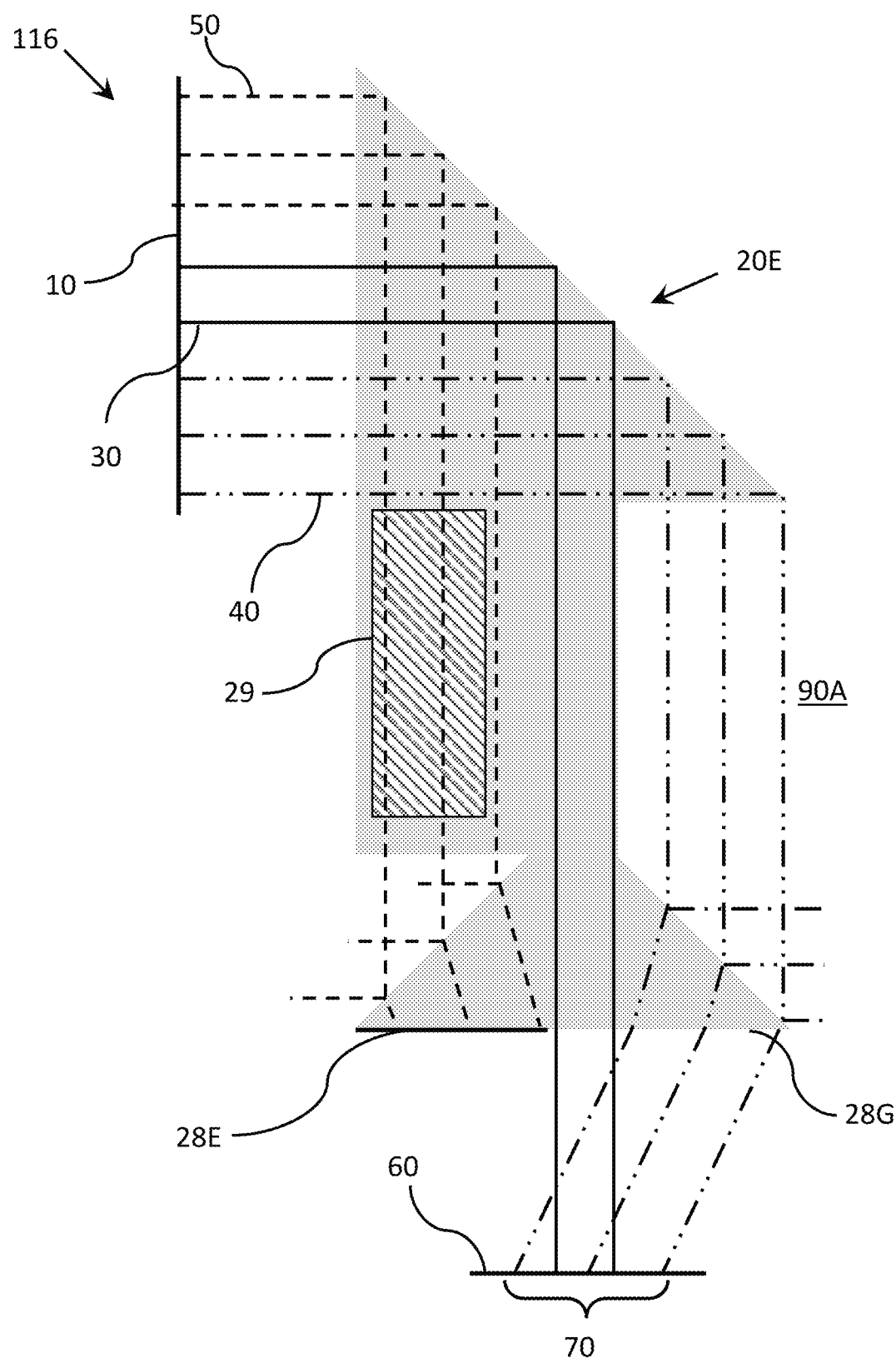
FIG. 30 illustrates another simplified ray trace through the unit cell illustrated in FIG. 27.

FIG. 30 illustrates another simplified ray trace through a unit cell 20D, similar to the ray trace illustrated in FIG. 28, except in this ray trace, internal gas-cell optical light path 50 is blocked at surface 28E and external optical light path 40 is allowed to travel to the array of electrically coupled light-sensitive pixel elements 60.

First internal optical light path 30 and first external optical light path 40 recombine at the array of electrically coupled light-sensitive pixel elements 60 and produce a second interferogram 71B (shown in later figures) within region 70 on the array 60. The second interferogram 71B is captured in the form of coherent irradiance on the detector 60. The second interferogram 71B may characterize an optical property of the external environment 90A, such as its temperature, pressure, refractive index, optical density, or gas molarity. External environment 90A characterization may take place, in part, because the internal gas-cell optical light path 50 is blocked at surface 28E and does not reach detector 60.

Figure 31A:
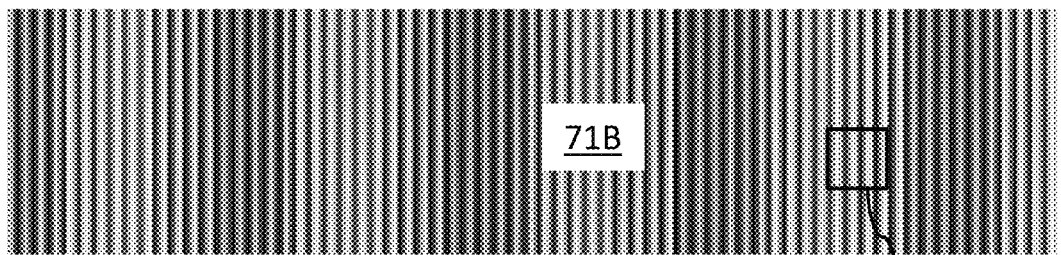
FIG. 31A illustrates the simulated coherent irradiance of the interferogram created by the interferometer 116 illustrated in FIG. 30.
Figure 31B:
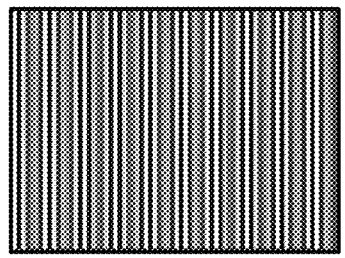
FIG. 31B is an enlarged view of the simulated coherent irradiance of the interferogram illustrated in FIG. 31A.

FIG. 31A illustrates a simulated coherent irradiance of the second interferogram 71B created on the detector 60 within interferogram region 70 from the interferometer 116 illustrated in FIG. 30. FIG. 31B is an enlarged view of the simulated coherent irradiance of the second interferogram 71B illustrated in FIG. 31A.

In FIGS. 31A and 31B, the detector 60 is defined as a 5 mm×3.5 mm array consisting of 3200×200 pixels. The resulting analysis provides a geometric ray trace, coherent irradiance, and coherent phase. In this simulation, the coherent light source, e.g., coherent light source 10 in FIG. 30, has a wavelength of 450 nm. The unit cell 20E is modeled as FK3 glass from the Schott materials catalogue within the Zemax® OpticStudio® software. In this simulated model, the peak irradiance (e.g., white) has a power per area of 7.642 W/cm$^2$ and the minimum irradiance (e.g., black) has a power per area of 0.157 W/cm$^2$.

Figure 31C:
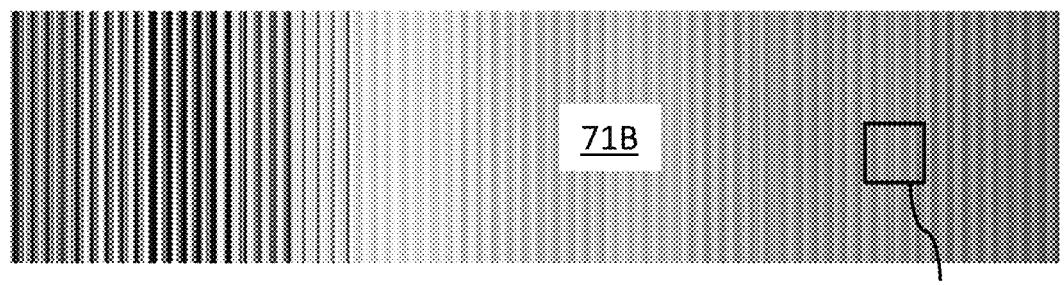
FIG. 31C illustrates the simulated coherent phase of the interferogram created with the same model as described in FIGS. 30, 31A, and 31B.
Figure 31D:
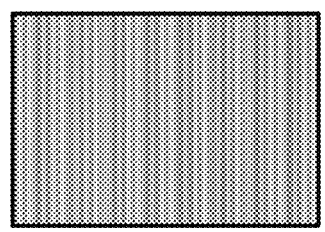
FIG. 31D is an enlarged view of the simulated coherent phase of the interferogram illustrated in FIG. 31C.

FIG. 31C illustrates the simulated coherent phase of the second interferogram 71B created with the same model as described in FIGS. 30, 31A, and 31B. FIG. 31D is an enlarged view of the simulated coherent phase of the second interferogram 71B illustrated in FIG. 31C. In this illustration, the maximum phase (e.g., light gray) value is 149.5 degrees and the minimum phase (e.g., dark gray) value is 47.4 degrees.

Figure 32:
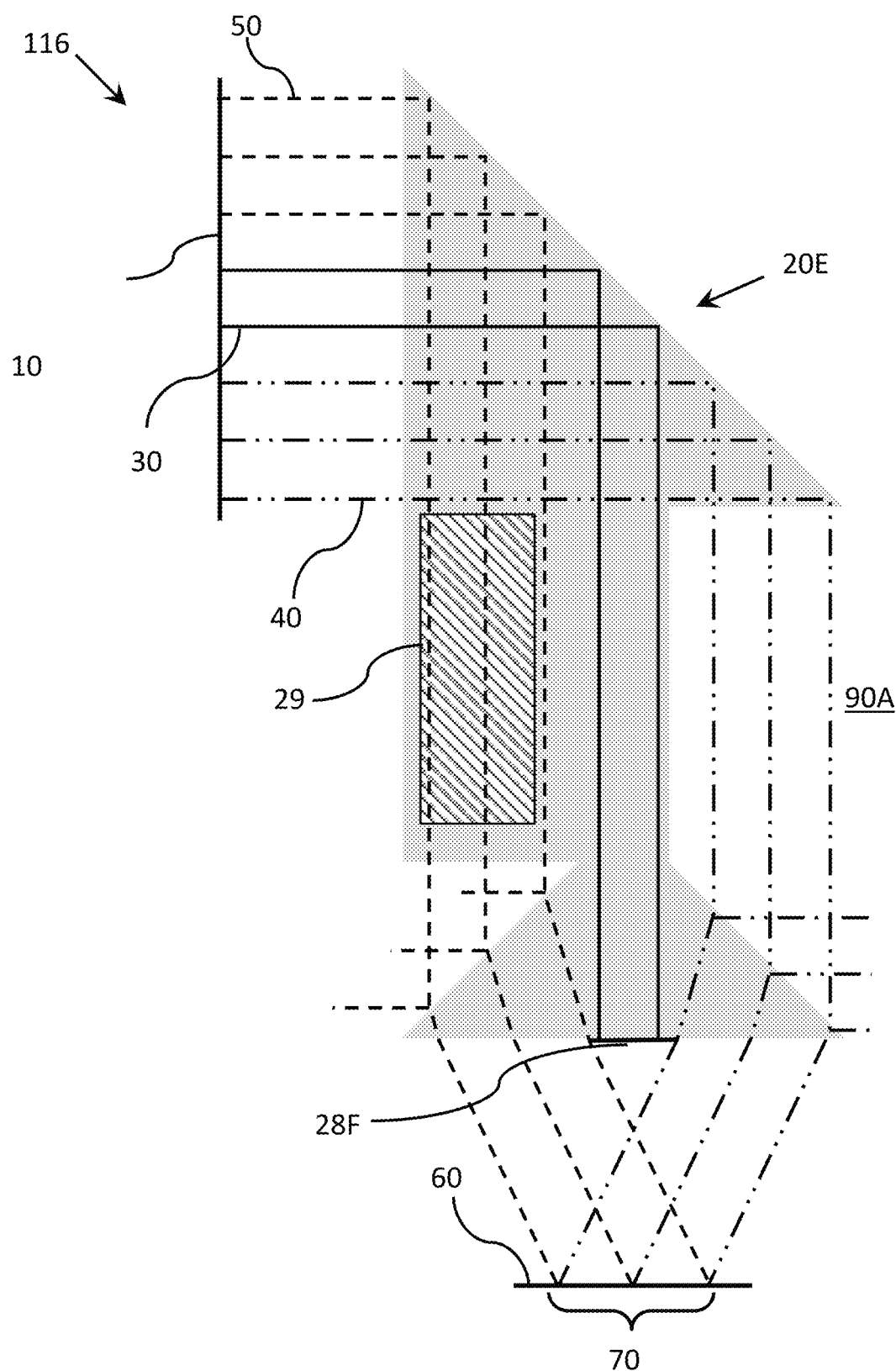
FIG. 32 illustrates another simplified ray trace through the unit cell illustrated in FIG. 27.

FIG. 32 illustrates another simplified ray trace through a unit cell 20E, similar to the ray traces illustrated in FIGS. 28 and 30, except in this ray trace, internal optical light path 30 is blocked at surface 28F and external optical light path 40 and internal gas-cell optical path 50 are allowed to travel to the array of electrically coupled light-sensitive pixel elements 60.

First external optical light path 40 and internal gas-cell optical light path 50 recombine at the array of electrically coupled light-sensitive pixel elements 60 and produce a third interferogram 71C within region 70 on the array 60. The third interferogram 71C is captured in the form of coherent irradiance on the detector 60. The third interferogram 71C may characterize the relative difference in optical properties of the gas-cell 29 and external environment 90A, such as a difference in temperature, pressure, refractive index, optical density, or gas molarity. The characterization comparison between external environment 90A and gas-cell 29 may take place, in part, because the internal optical light path 30 is blocked at surface 28F and does not reach detector 60.

Figure 33A:
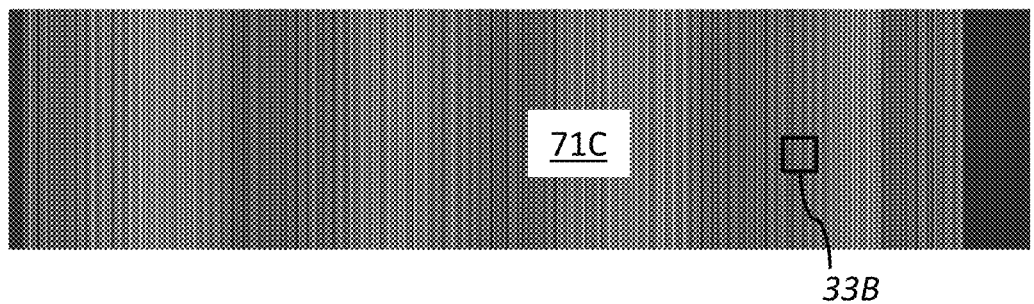
FIG. 33A illustrates the simulated coherent irradiance of the interferogram created by the interferometer illustrated in FIG. 32.
Figure 33B:
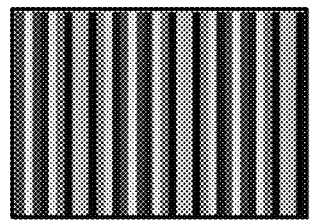
FIG. 33B is an enlarged view of the simulated coherent irradiance of the interferogram illustrated in FIG. 33A.

FIG. 33A illustrates a simulated coherent irradiance of the third interferogram 71C created on the detector 60 within interferogram region 70 of the interferometer 116 illustrated in FIG. 32. FIG. 33B is an enlarged view of the simulated coherent irradiance of the third interferogram 71C illustrated in FIG. 33A.

In FIGS. 33A and 33B, the detector 60 is defined as a 11 mm×3.5 mm array consisting of 3200×200 pixels. The resulting analysis provides a geometric ray trace, coherent irradiance, and coherent phase. In this simulation, the coherent light source, e.g., coherent light source 10 in FIG. 32, has a wavelength of 450 nm. The unit cell 20E is modeled as FK3 glass from the Schott materials catalogue within the Zemax® OpticStudio® software. In this simulated model, the peak irradiance (e.g., white) has a power per area of 6.332 W/cm² and the minimum irradiance (e.g., black) has a power per area of 0.049 W/cm².

Figure 33C:
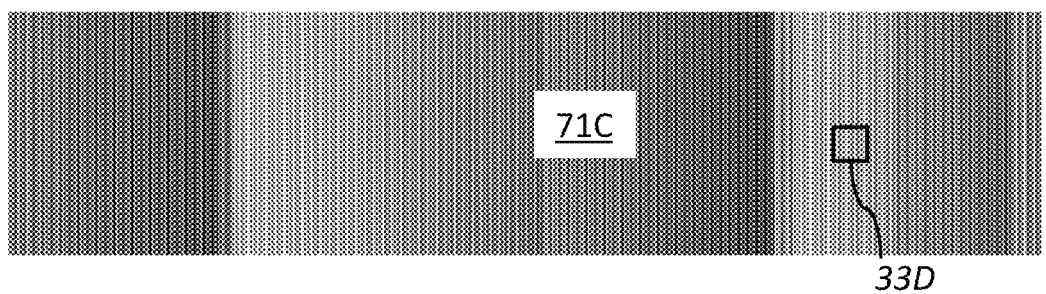
FIG. 33C illustrates the simulated coherent phase of the interferogram created with the same model as described in FIGS. 32, 33A, and 33B.
Figure 33D:
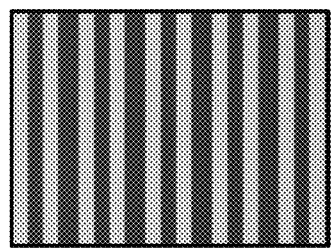
FIG. 33D is an enlarged view of the simulated coherent phase of the interferogram illustrated in FIG. 33C.

FIG. 33C illustrates the simulated coherent phase of the third interferogram 71C created with the same model as described in FIGS. 32, 33A, and 33B. FIG. 33D is an enlarged view of the simulated coherent phase of the third interferogram 71C illustrated in FIG. 33C. In this illustration, the maximum phase (e.g., light gray) value is 95.7 degrees and the minimum phase (e.g., dark gray) value is −112.9 degrees.

Figure 34:
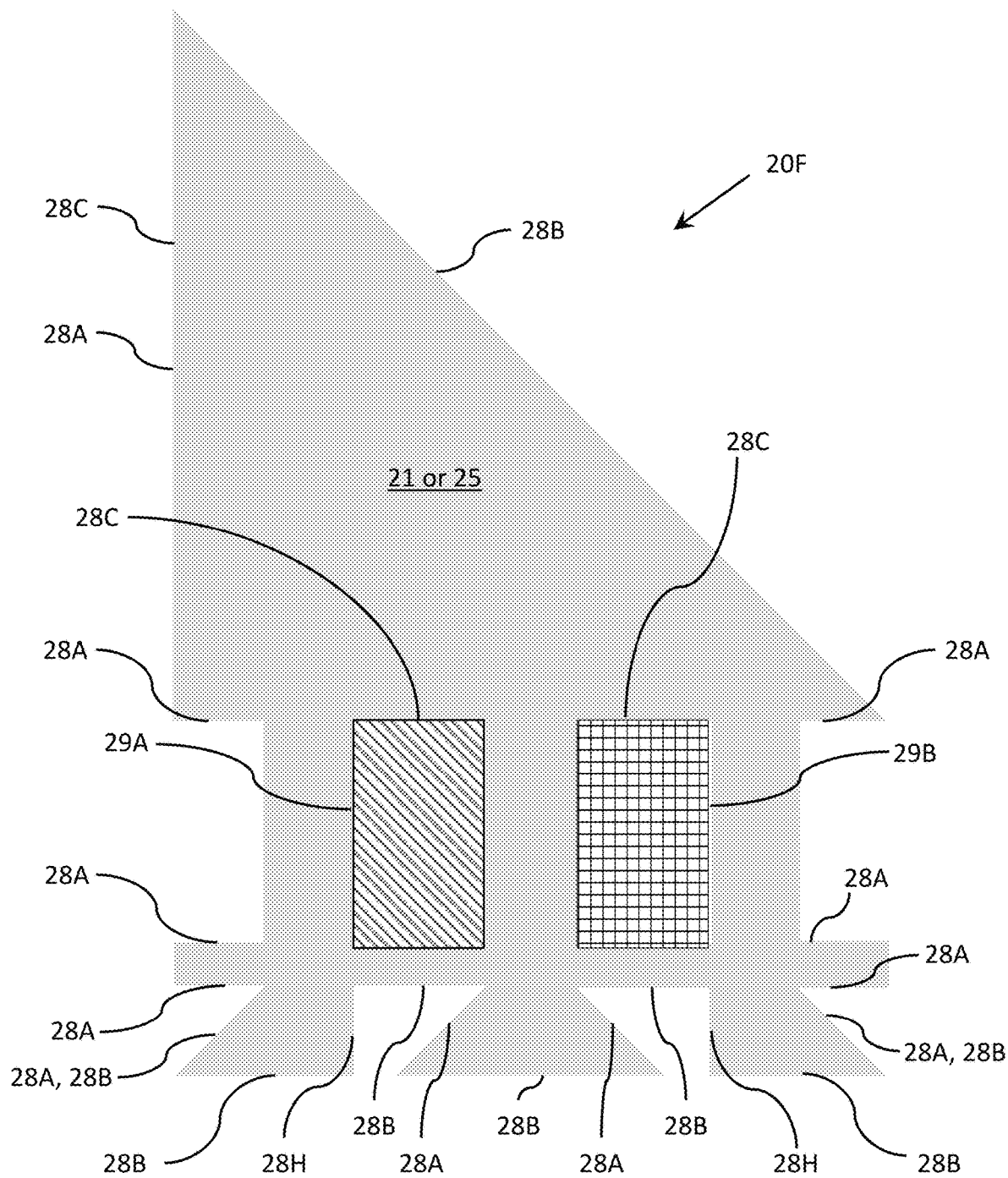
FIG. 34 illustrates another embodiment of a single monolithic unit cell.

FIG. 34 illustrates a single monolithic unit cell 20F. Unit cell 20F has various external 28A and internal 28B surfaces configured to redirect or reflect light through the unit cell 20F onto an array of electrically coupled light-sensitive pixel elements (not shown in FIG. 34). Monolithic unit cell 20F also includes a first specimen or gas-cell 29A and a second specimen or gas-cell 29B. Gas-cells 29A and 29B may contain known or unknown gases at a known or unknown pressures. In any case, monolithic unit cell 20F has a refractive index 21 or 25 different than that contained in the specimen or gas-cells 29A or 29B. In addition, monolithic unit cell 20F has various surfaces that may be coated with anti-reflective or absorptive coatings depending on their purpose to prevent light from reflecting off the surface or absorbing light hitting the surface. For example, surfaces 28C may be coated with an anti-reflective coating. Not all the surfaces coated with an anti-reflective or absorptive coating are labeled. Surfaces 28H may be coated with a protected silver coating, which provides broadband reflectivity. Coating 28H serves to prevent reflected light from entering portions of the unit cell 20F. Other monolithic unit cells described herein may be similarly coated with anti-reflective or absorptive coatings or include a shutter.

Figure 35:
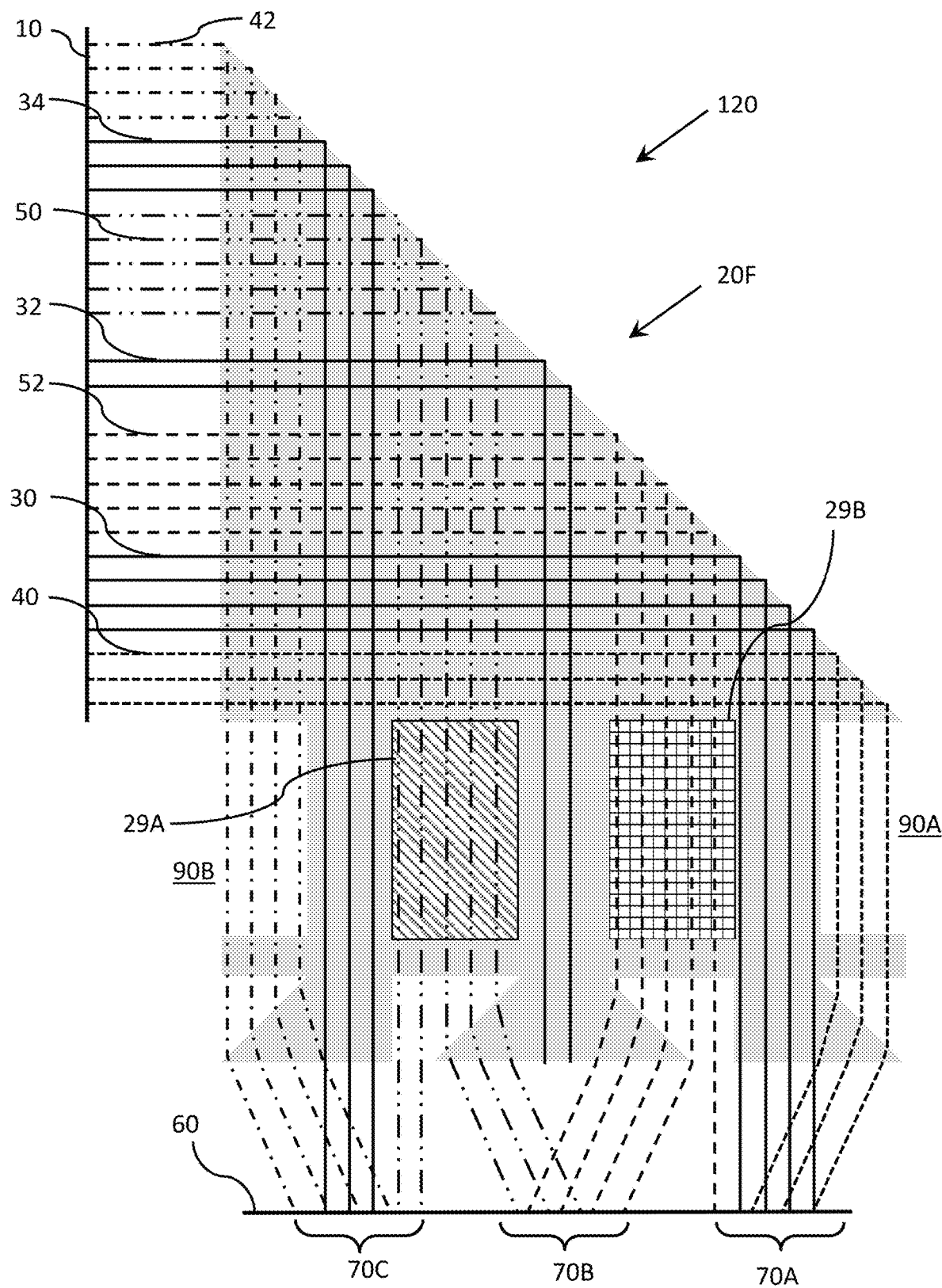
FIG. 35 illustrates a simplified ray trace through the unit cell illustrated in FIG. 34.

FIG. 35 illustrates a simplified ray trace through a unit cell 20F of interferometer 120. In embodiments, a first internal optical light path 30, a second internal optical light path 32, and a third internal optical light path 34, originating from a coherent light source 10, enters the unit cell 20F through an external surface (such as external surface 28A illustrated in FIG. 34) where the first, second, and third light or light paths 30, 32, and 24 are reflected off multiple internal surfaces (such as internal surfaces 28B illustrated in FIG. 34) and then directed to an array of electrically coupled light-sensitive pixel elements 60. Once entering the unit cell 20F, first, second, and third internal light paths 30, 32, and 34 travel entirely within the unit cell 20F until it exits the unit cell 20F onto the array of electrically coupled light-sensitive pixel elements 60. In this sense, first, second, and third internal light paths 30, 32, and 34 are reference beams.

A first internal gas-cell or specimen cell optical light path 50 and a second internal gas-cell or specimen cell optical light path 52, similarly originating from the coherent light source 10, enters the unit cell 20F through an external surface (such as external surface 28A illustrated in FIG. 34). First internal gas-cell optical light path 50 is reflected off an internal surface (such as internal surface 28B illustrated in FIG. 34) and then directed back outside the monolithic unit cell 20F through a specimen cell 29A and then back into the monolithic unit cell 20F and finally onto the array of electrically coupled light-sensitive pixel elements 60. Second internal gas-cell optical light path 52 is similarly reflected and transmitted through specimen cell 29B and then onto the array of electrically coupled light-sensitive pixel elements 60.

The specimen cells 29A and 29B may be unknown environments containing unknown gases. Optical light paths 50 and 52 may be referred to as probe beams because they pass through environments being probed by a compact monolithic multispectral interferometer, such as interferometer 120.

A first external optical light path 40 similarly originating from the coherent light source 10 enters the unit cell 20F through an external surface (such as external surface 28A illustrated in FIG. 34) where the light or light path 40 is reflected off an internal surface (such as internal surface 28B illustrated in FIG. 34) and then directed back outside the monolithic unit cell 20F through a first external environment 90A and then back into the monolithic unit cell 20F and finally onto the array of electrically coupled light-sensitive pixel elements 60. The external environment 90A may be an unknown environment containing unknown gases. Optical light path 40 may be referred to as a probe beam because it passes through an environment being probed by a compact monolithic multispectral interferometer, such as interferometer 120.

Similarly, a second external optical light path 42 similarly originating from the coherent light source 10 enters the unit cell 20F through an external surface (such as external surface 28A illustrated in FIG. 34) where the light or light path 42 is reflected off an internal surface (such as internal surface 28B illustrated in FIG. 34) and then directed back outside the monolithic unit cell 20F through a second external environment 90B and then back into the monolithic unit cell 20F and finally onto the array of electrically coupled light-sensitive pixel elements 60. The external environment 90B may be an unknown environment containing unknown gases. Optical light path 42 may be referred to as a probe beam because it passes through an environment being probed by a compact monolithic multispectral interferometer, such as interferometer 120.

Monolithic unit cell 20F has a refractive index 21 or 25 (labeled in FIG. 34) different from the first external environment 90A or the second external environment 90B. As the first external optical path 40 travels outside the monolithic unit cell 20F, it experiences a change in refractive index over a known length. Similarly, as the second external optical path 42 travels outside the monolithic unit cell 20F, it experiences a change in refractive index over a known length. The change in refractive index experienced by the first external optical path 40 and the second external optical path 42 imparts a phase difference to the first external optical path 40 and the second optical light path 42. Therefore, the optical path difference arises not through mechanical actuation (e.g., a rotating or travelling mirror or grating), but because of the refractive index difference between the monolithic unit cell 20F and the first and second external environments 90A and 90B.

First internal optical path 30 and first external optical path 40 recombine at the array of electrically coupled light-sensitive pixel elements 60 and produce a first interferogram 71A (shown in later figures) within region 70A on the array 60. The first interferogram 71A is captured in the form of coherent irradiance on the detector 60. The interferogram 71A may characterize an optical property of the external environment 90A such as its temperature, pressure, refractive index, optical density, or gas molarity of a gas or gases within the external environment 90A.

Similarly, third internal optical path 34 and second external optical path 42 recombine at the array of electrically coupled light-sensitive pixel elements 60 and produce a third interferogram 71C (shown in later figures) on the array 60. First interferogram 71A and third interferogram 71C are spatially separated from each other because regions 70A and 70C are spatially separated from each other. The third interferogram 71C is captured in the form of coherent irradiance on the detector 60. The third interferogram 71C may characterize an optical property of the external environment 90B such as its temperature, pressure, refractive index, optical density, or gas molarity of a gas or gases within the external environment 90B.

First internal gas-cell or specimen-cell optical path 50 and second internal gas-cell or specimen cell optical path 52 recombine at the array of electrically coupled light-sensitive pixel elements 60 and produce a second interferogram 71B (shown in later figures) within region 70B on the array 60. An interferogram is captured in the form of coherent irradiance on the detector 60. The second interferogram 71B may characterize differences in the optical properties of the first internal gas-cell or specimen-cell 29A and the second internal gas-cell or specimen-cell 29B, such as differences in temperature, pressure, refractive index, optical density, or gas molarity of a gas or gases within the gas cells 29A and 29B.

Figure 36A:
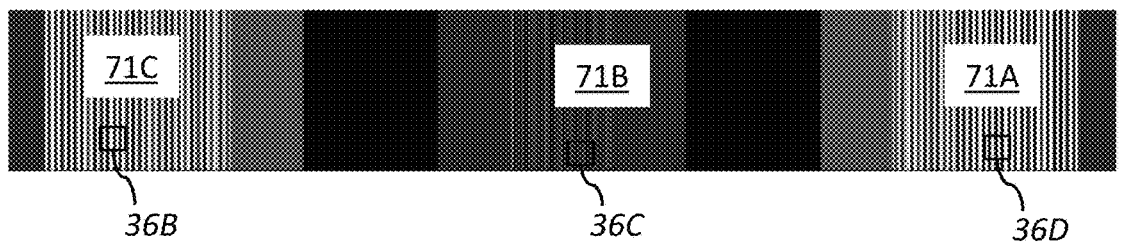
FIG. 36A illustrates the simulated coherent irradiance of the interferogram created by the interferometer illustrated in FIG. 35.
Figure 36B:
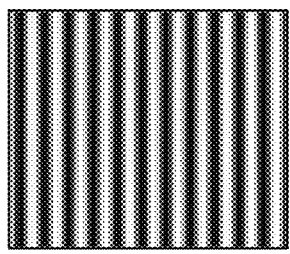
FIGS. 36B, 36C, and 36D are enlarged views of the simulated coherent irradiance of the interferogram illustrated in FIG. 35.
Figure 36C:
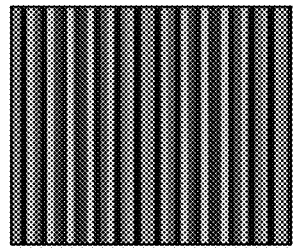
Figure 36D:
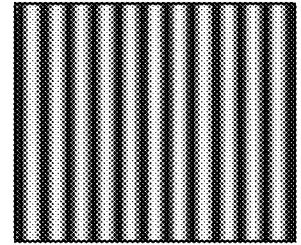

FIG. 36A illustrates a simulated coherent irradiance of the interferograms 71A, 71B, and 71C created on the detector 60 within interferogram regions 70A, 70B, and 70C from the interferometer 120 illustrated in FIG. 35. FIGS. 36B, 36C, and 36D are enlarged views of the simulated coherent irradiance of the interferogram illustrated in FIG. 35 of regions 70C, 70B, and 70A, respectively.

In FIGS. 36A, 36B, 36C, and 36D, the detector 60 is defined as a 60 mm×14 mm array consisting of 6000×200 pixels. The resulting analysis provides a geometric ray trace, coherent irradiance, and coherent phase. In this simulation, the coherent light source, e.g., coherent light source 10 in FIG. 35, has a wavelength of 450 nm. The unit cell 20F is modeled as FK3 glass from the Schott materials catalogue within the Zemax® OpticStudio® software. In this simulated model, the peak irradiance (e.g., white) has a power per area of 1.062 W/cm$^2$ and the minimum irradiance (e.g., black) has a power per area of 6.3×10$^{-5}$ W/cm$^2$.

Figure 36E:
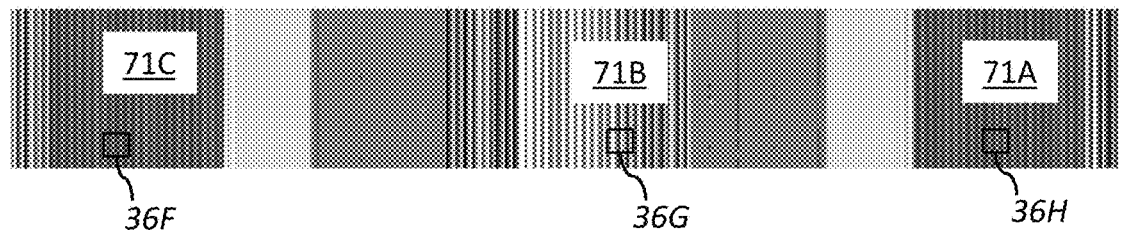
FIG. 36E illustrates the simulated coherent phase of the interferogram created with the same model as described in FIGS. 35, and 36A-36D.
Figure 36F:
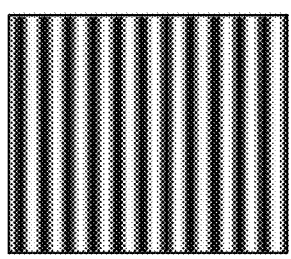
FIGS. 36F, 36G, and 36H are an enlarged views of the simulated coherent phase of the interferogram illustrated in FIG. 36E.
Figure 36G:
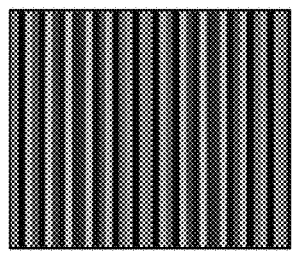
Figure 36H:
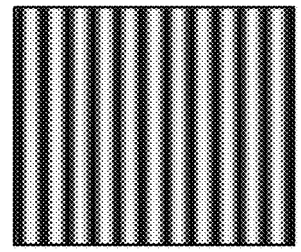

FIG. 36E illustrates the simulated coherent phase of the interferograms 71A, 71B, and 71C created with the same model as described in FIGS. 35, and 36A-36D. FIGS. 36F, 36G, and 36H are an enlarged views of the simulated coherent phase of the interferograms 71C, 71B, and 71A illustrated in FIG. 36E corresponding to regions 70C, 70B, and 70A, respectively. In this illustration, the maximum phase (e.g., light gray) value is 160.0 degrees and the minimum phase (e.g., dark gray) value is −96.03 degrees.

Figure 37:
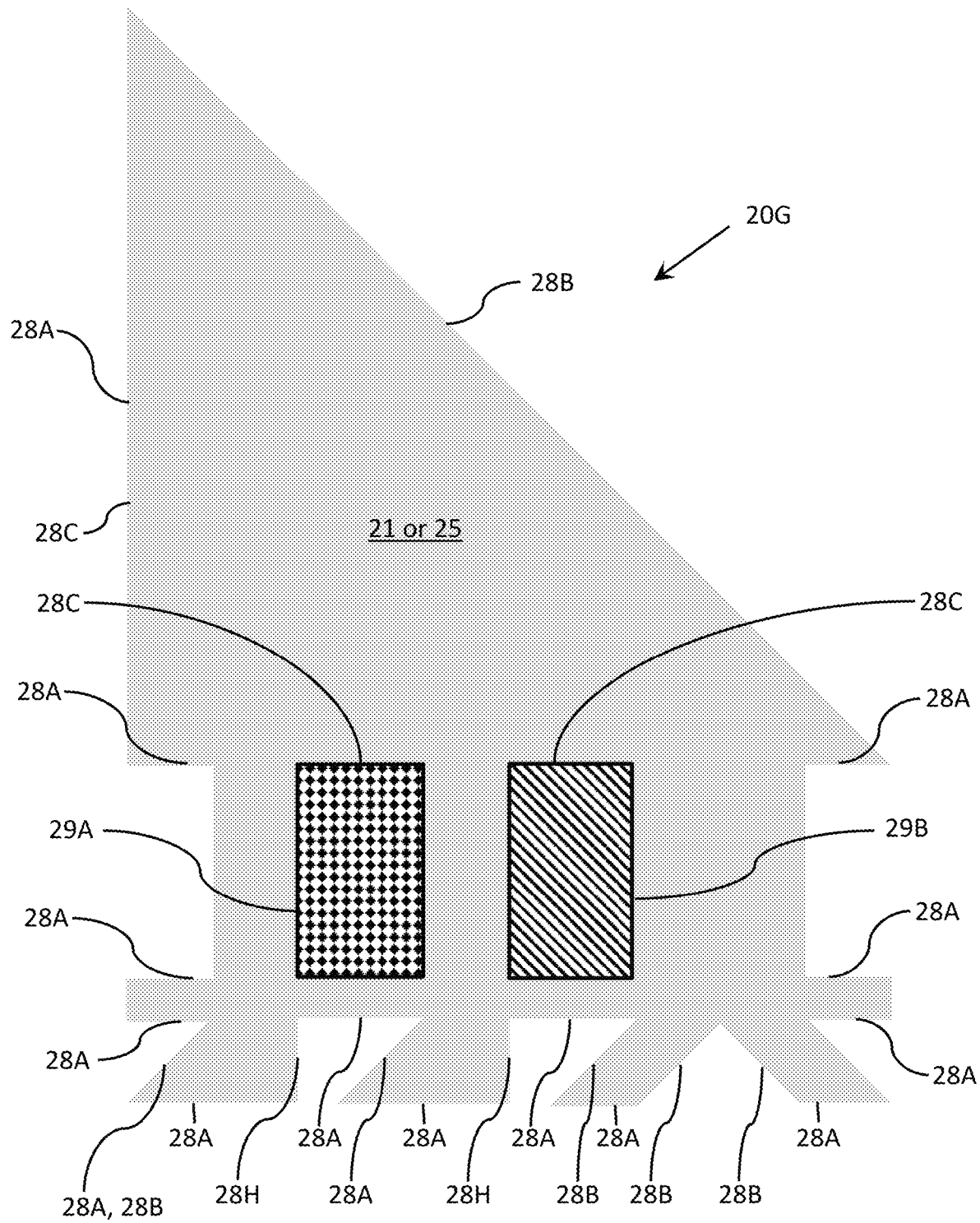
FIG. 37 illustrates another embodiment of a single monolithic unit cell.

FIG. 37 illustrates a single monolithic unit cell 20G. Like unit cell 20F illustrated in FIG. 32, unit cell 20G has various external 28A and internal 28B surfaces configured to redirect or reflect light through the unit cell 20G onto an array of electrically coupled light-sensitive pixel elements (not shown in FIG. 37). Monolithic unit cell 20G also includes a first specimen or gas-cell 29A and a second specimen or gas-cell 29B. Gas-cells 29A and 29B may contain known or unknown gases at a known or unknown pressures. Monolithic unit cell 20G has a refractive index 21 or 25 different than that contained within specimen or gas-cells 29A or 29B. In addition, monolithic unit cell 20G has various surfaces that may be coated with anti-reflective or absorptive coatings depending on their purpose to prevent light from reflecting off the surface or absorbing light hitting the surface. For example, surfaces 28C may be coated with an anti-reflective coating. Not all the surfaces coated with an anti-reflective or absorptive coating are labeled. Surfaces 28H may be coated with a protected silver coating, which provides broadband reflectivity. Coating 28H serves to prevent reflected light from entering portions of the unit cell 20G. Other monolithic unit cells described herein may be similarly coated with anti-reflective or absorptive coatings or include a shutter.

Figure 38:
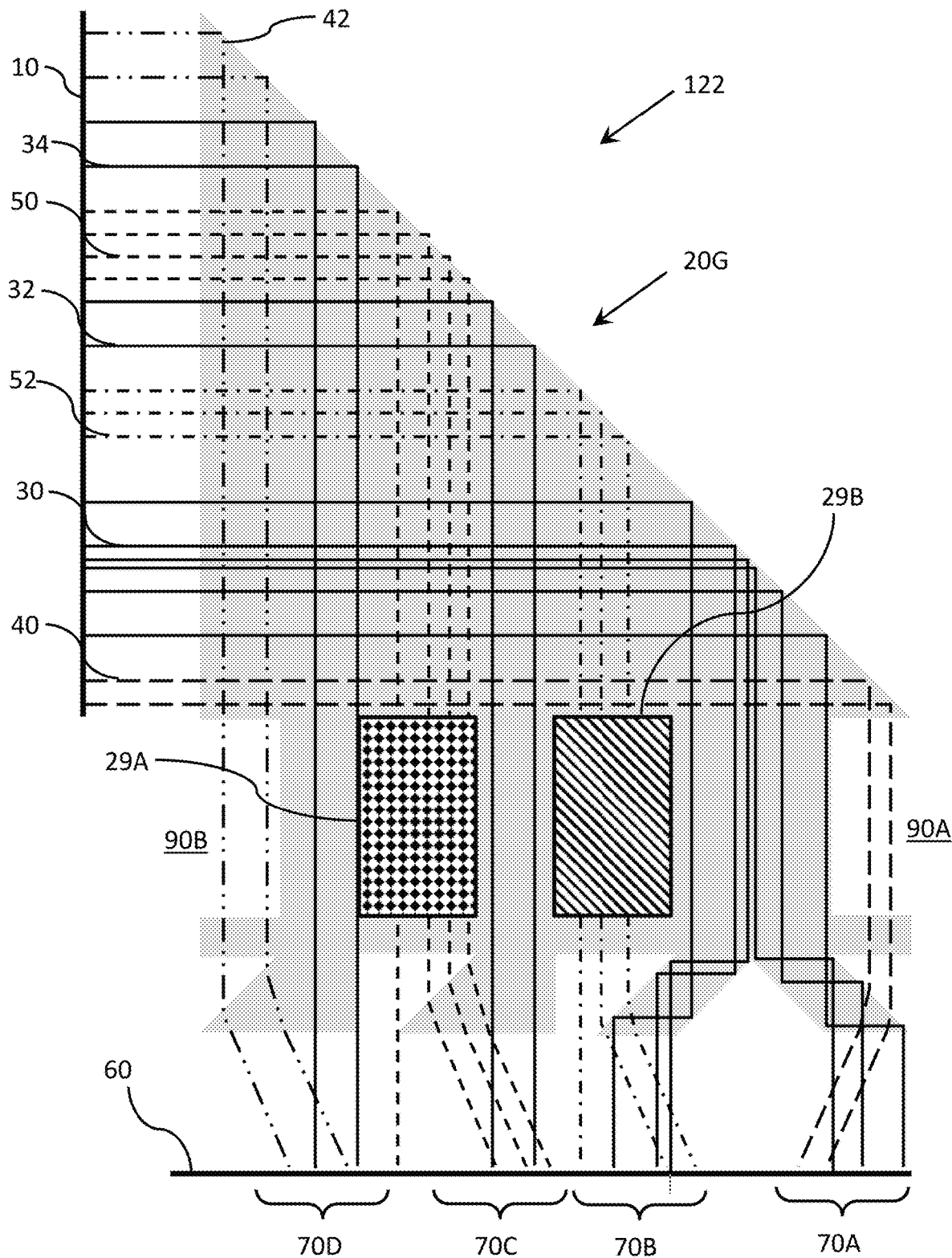
FIG. 38 illustrates a simplified ray trace through the single monolithic unit cell illustrated in FIG. 37.

FIG. 38 illustrates a simplified ray trace through a unit cell 20G of interferometer 122. In embodiments, a first internal optical light path 30, a second internal optical light path 32, and a third internal optical light path 34, originating from a coherent light source 10, enters the unit cell 20G through an external surface (such as external surface 28A illustrated in FIG. 37) where the first, second, and third light or light paths 30, 32, and 24 are reflected off multiple internal surfaces (such as internal surfaces 28B illustrated in FIG. 37) and then directed to an array of electrically coupled light-sensitive pixel elements 60. Upon entering the unit cell 20G, first, second, and third internal light paths 30, 32, and 34 travel entirely within the unit cell 20G until it exits the unit cell 20G onto the array of electrically coupled light-sensitive pixel elements 60. In this sense, first, second, and third internal light paths 30, 32, and 34 are reference beams.

A first internal gas-cell or specimen cell optical light path 50 and a second internal gas-cell or specimen cell optical light path 52, similarly originating from the coherent light source 10, enters the unit cell 20G through an external surface (such as external surface 28A illustrated in FIG. 37). First internal gas-cell optical light path 50 is reflected off an internal surface (such as internal surface 28B illustrated in FIG. 37) and then directed back outside the monolithic unit cell 20G through a specimen cell 29A and then back into the monolithic unit cell 20G and finally onto the array of electrically coupled light-sensitive pixel elements 60. Second internal gas-cell optical light path 52 is similarly reflected and transmitted through specimen cell 29B and then onto the array of electrically coupled light-sensitive pixel elements 60.

The specimen cells 29A and 29B may be unknown environments containing unknown gases. Optical light paths 50 and 52 may be referred to as probe beams because they pass through environments being probed by a compact monolithic multispectral interferometer, such as interferometer 122.

A first external optical light path 40 similarly originating from the coherent light source 10 enters the unit cell 20G through an external surface (such as external surface 28A illustrated in FIG. 37) where the light or light path 40 is reflected off an internal surface (such as internal surface 28B illustrated in FIG. 37) and then directed back outside the monolithic unit cell 20G through a first external environment 90A and then back into the monolithic unit cell 20G and finally onto the array of electrically coupled light-sensitive pixel elements 60. The external environment 90A may be an unknown environment containing unknown gases. Optical light path 40 may be referred to as a probe beam because it passes through an environment being probed by a compact monolithic multispectral interferometer, such as interferometer 122.

Similarly, a second external optical light path 42 similarly originating from the coherent light source 10 enters the unit cell 20G through an external surface (such as external surface 28A illustrated in FIG. 37) where the light or light path 42 is reflected off an internal surface (such as internal surface 28B illustrated in FIG. 37) and then directed back outside the monolithic unit cell 20G through a second external environment 90B and then back into the monolithic unit cell 20G and finally onto the array of electrically coupled light-sensitive pixel elements 60. The external environment 90B may be an unknown environment containing unknown gases. Optical light path 42 may be referred to as a probe beam because it passes through an environment being probed by a compact monolithic multispectral interferometer, such as interferometer 122.

Monolithic unit cell 20G has a refractive index 21 or 25 (labeled in FIG. 37) different from the first external environment 90A or the second external environment 90B. As the first external optical path 40 travels outside the monolithic unit cell 20G, it experiences a change in refractive index over a known length. Similarly, as the second external optical path 42 travels outside the monolithic unit cell 20G, it experiences a change in refractive index over a known length. The change in refractive index experienced by the first external optical path 40 and the second external optical path 42 imparts a phase difference to the first external optical path 40 and the second optical light path 42. Therefore, the optical path difference arises not through mechanical actuation (e.g., a rotating or travelling mirror or grating), but because of the refractive index difference between the monolithic unit cell 20G and the first and second external environments 90A and 90B.

First internal optical path 30 and first external optical path 40 recombine at the array of electrically coupled light-sensitive pixel elements 60 and produce a first interferogram 71A (shown in later figures) within region 70A on the array 60. Interferogram 71A is captured in the form of coherent irradiance on the detector 60. First interferogram 71A may characterize an optical property of external environment 90A such as its temperature, pressure, refractive index, optical density, or gas molarity of a gas or gases within the external environment 90A.

In addition, first internal optical path 30 and second gas-cell optical path 52 recombine at the array of electrically coupled light-sensitive pixel elements 60 and produce a second interferogram 71B within region 70B on the array 60. First interferogram 71A and second interferogram 71B are spatially separated from each other because regions 70A and 70B are spatially separated. Second interferogram 71B is captured in the form of coherent irradiance on the detector 60. The second interferogram 71B may characterize an optical property of second gas-cell 29B such as its temperature, pressure, refractive index, optical density, or gas molarity of a gas or gases within the gas cell 29B.

Similarly, second internal optical path 32 and first gas-cell optical path 50 recombine at the array of electrically coupled light-sensitive pixel elements 60 and produce a third interferogram 71C within region 70C on the array 60. First interferogram 71A, second interferogram pattern 71B, and third interferogram 71C are spatially separated from each other. The third interferogram 71C is captured in the form of coherent irradiance on the detector 60. The third interferogram 71C may characterize an optical property of the first gas or specimen cell 29A environment such as its temperature, pressure, refractive index, optical density, or gas molarity of a gas or gases within the gas cell 29A.

Similarly, third internal optical path 34 and second external optical path 42 recombine at the array of electrically coupled light-sensitive pixel elements 60 and produce a fourth interferogram 71D within region 70D on the array 60. First interferogram 71A, second interferogram 71B, third interferogram 71C, and fourth interferogram 71D are spatially separated from each other. The fourth interferogram 71D is captured in the form of coherent irradiance on the detector 60. The fourth interferogram 71D may characterize an optical property of the external environment 90B such as its temperature, pressure, refractive index, optical density, or gas molarity of a gas or gases within the external environment 90B.

Figure 39A:
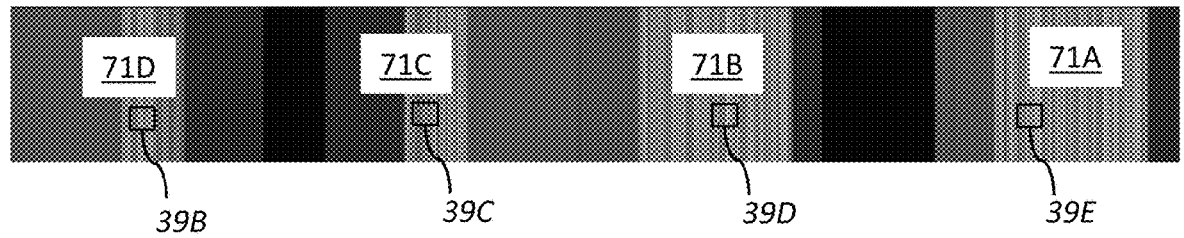
FIG. 39A illustrates the simulated coherent irradiance of the interferogram created by the interferometer illustrated in FIG. 38.
Figure 39B:
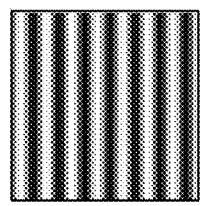
FIGS. 39B, 39C, 39D, and 39E are enlarged views of the simulated coherent irradiance of the interferogram illustrated in FIG. 39A.
Figure 39C:
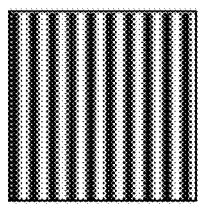
Figure 39D:
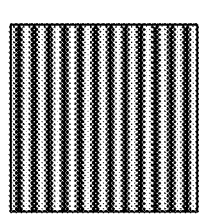
Figure 39E:
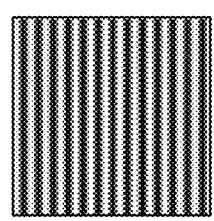

FIG. 39A illustrates a simulated coherent irradiance of the interferograms 71A, 71B, 71C, and 71D, created on the detector 60 within interferogram regions 70A, 70B, 70C, and 70C from the interferometer 122 illustrated in FIG. 38. FIGS. 39B, 39C, 39D, and 39E are enlarged views of the simulated coherent irradiance of the interferograms 71A, 71B, 71C, and 71D, illustrated in FIG. 39A.

In FIGS. 39A, 39B, 39C, 36D, and 36E, the detector 60 is defined as a 60 mm×14 mm array consisting of 6000×200 pixels. The resulting analysis provides a geometric ray trace, coherent irradiance, and coherent phase. In this simulation, the coherent light source, e.g., coherent light source 10 in FIG. 38, has a wavelength of 450 nm. The unit cell 20G is modeled as FK3 glass from the Schott materials catalogue within the Zemax® OpticStudio® software. In this simulated model, the peak irradiance (e.g., white) has a power per area of 0.908 W/cm$^2$ and the minimum irradiance (e.g., black) has a power per area of 0.027 W/cm$^2$.

Figure 39F:
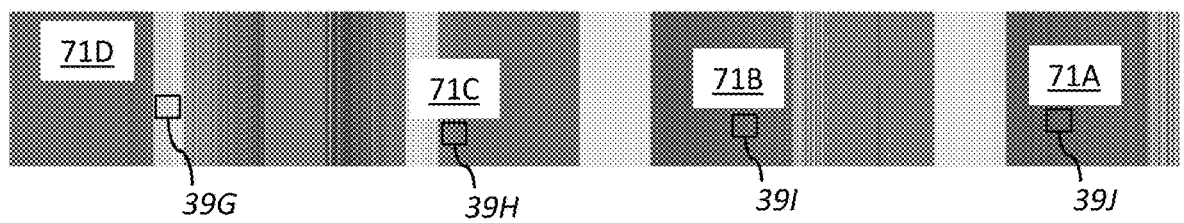
FIG. 39F illustrates the simulated coherent phase of the interferogram created with the same model as described in FIGS. 38, and 39A-39E.
Figure 39G:
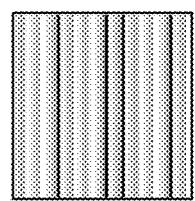
FIGS. 39G, 39H, 39I, and 39J are an enlarged views of the simulated coherent phase of the interferogram illustrated in FIG. 39F.
Figure 39H:
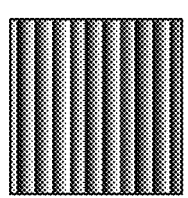
Figure 39I:
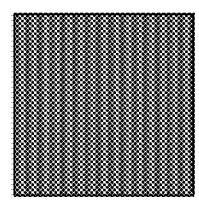
Figure 39J:
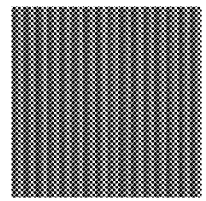

FIG. 39F illustrates the simulated coherent phase of the interferograms 71A, 71B, 71C, and 71D, created with the same model as described in FIGS. 38, and 39A-39E. FIGS. 39G, 39H, 39I, and 36J are an enlarged views of the simulated coherent phase illustrated in FIG. 39F corresponding to regions 70D, 70C, 70B, and 70A, respectively. In this illustration, the maximum phase (e.g., light gray) value is 171.9 degrees and the minimum phase (e.g., dark gray) value is −178.1 degrees.

Figure 40:
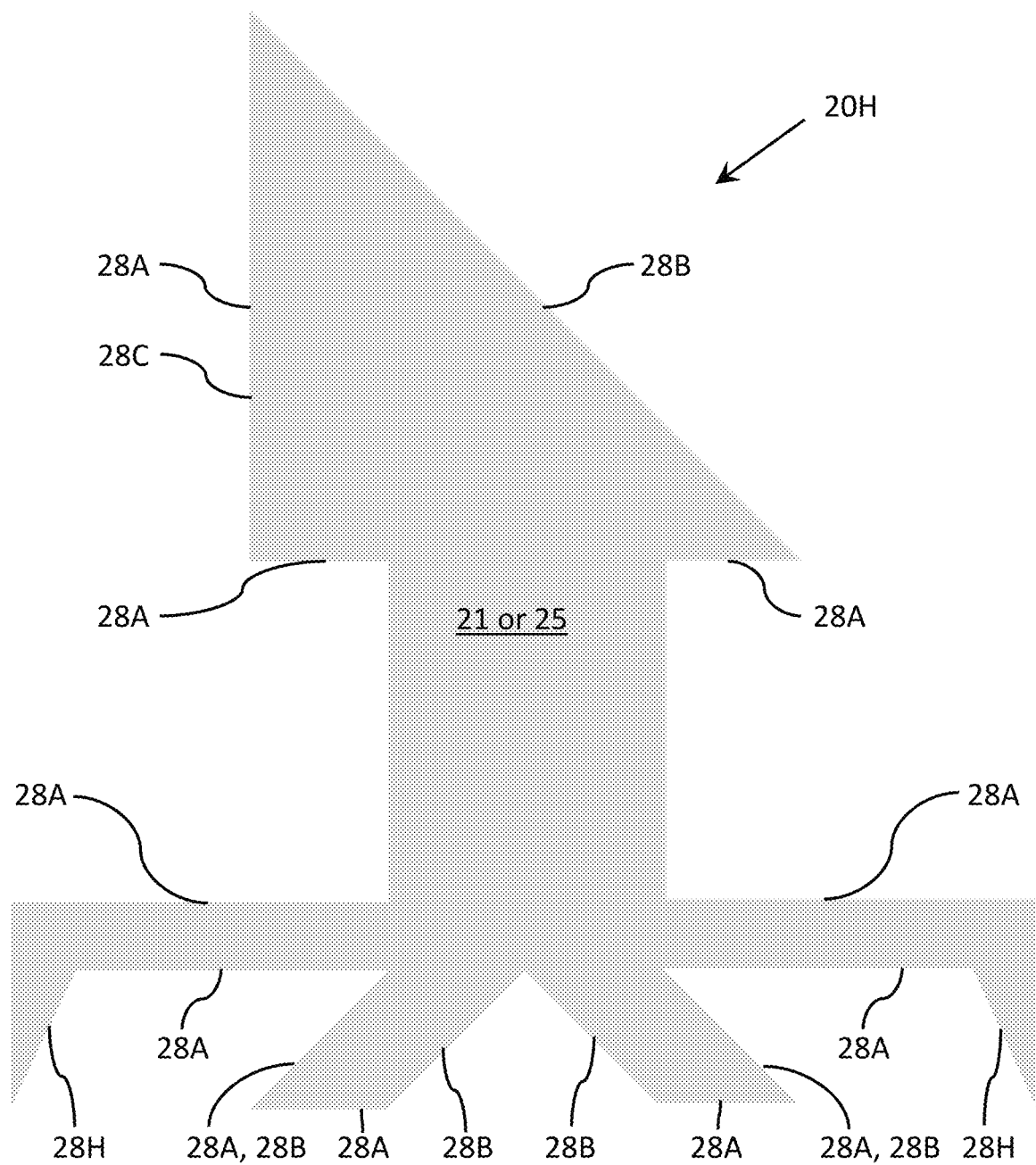
FIG. 40 illustrates another embodiment of a single monolithic unit cell.

FIG. 40 illustrates a single monolithic unit cell 20H. A unit cell 20H has various external 28A and internal 28B surfaces configured to redirect or reflect light through the unit cell 20H onto an array of electrically coupled light-sensitive pixel elements (not shown in FIG. 40). Monolithic unit cell 20H has a refractive index 21 or 25 different than that of air or a surrounding environment, such as external environment 90 (not shown in FIG. 40).

In addition, monolithic unit cell 20H has various surfaces that may be coated with anti-reflective or absorptive coatings depending on their purpose to prevent light from reflecting off the surface or absorbing light hitting the surface. For example, surfaces 28C may be coated with an anti-reflective coating. Not all the surfaces coated with an anti-reflective or absorptive coating are labeled. Surfaces 28H may be coated with a protected silver coating, which provides broadband reflectivity. Coating 28H serves to prevent reflected light from entering portions of the unit cell 20H. Other monolithic unit cells described herein may be similarly coated with anti-reflective or absorptive coatings or include a shutter.

Figure 41:
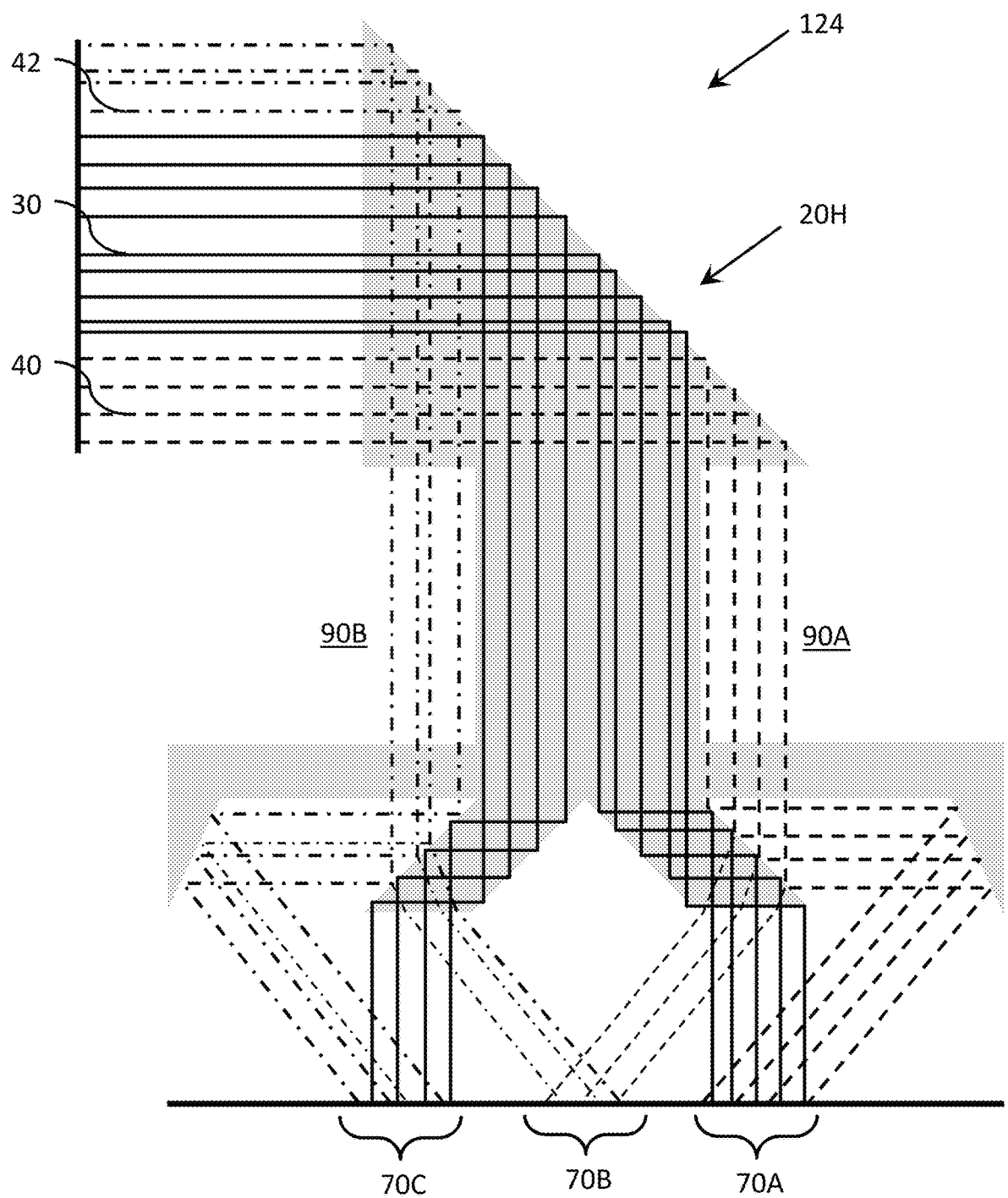
FIG. 41 illustrates a simplified ray trace through the unit cell of FIG. 40.

FIG. 41 illustrates a simplified ray trace through a unit cell 20H of interferometer 124. In embodiments, a first internal optical light path 30 originating from a coherent light source 10 enters the unit cell 20H through an external surface (such as external surface 28A illustrated in FIG. 40) where the light or light path 30 is reflected off multiple internal surfaces (such as internal surfaces 28B illustrated in FIG. 40) and then directed to an array of electrically coupled light-sensitive pixel elements 60. Once entering the unit cell 20H, internal light path 30 travels entirely within the unit cell 20H until it exits the unit cell 20H onto the array of electrically coupled light-sensitive pixel elements 60. In this sense, internal light path 30 is a reference beam.

A first external optical light path 40 similarly originating from the coherent light source 10 enters the unit cell 20H through an external surface (such as external surface 28A illustrated in FIG. 40) where the light or light path 40 is reflected off an internal surface (such as internal surface 28B illustrated in FIG. 40) and then directed back outside the monolithic unit cell 20H through a first external environment 90A and then back into the monolithic unit cell 20H and finally onto the array of electrically coupled light-sensitive pixel elements 60. The external environment 90A may be an unknown environment containing unknown gases. Optical light path 40 may be referred to as a probe beam because is passes through an environment being probed by a compact monolithic multispectral interferometer, such as interferometer 124.

A second external optical light path 42 similarly originating from the coherent light source 10 enters the unit cell 20H through an external surface (such as external surface 28A illustrated in FIG. 40) where the light or light path 42 is reflected off an internal surface (such as internal surface 28B illustrated in FIG. 40) and then directed back outside the monolithic unit cell 20H through a second external environment 90B and then back into the monolithic unit cell 20H and finally onto the array of electrically coupled light-sensitive pixel elements 60. The second external environment 90B may be an unknown environment containing unknown gases. Optical light path 42 may be referred to as a probe beam because is passes through an environment being probed by a compact monolithic multispectral interferometer, such as interferometer 124.

Monolithic unit cell 20H has a refractive index 21 or 25 different from the first external environment 90A or the second external environment 90B. As the first external optical path 40 travels outside the monolithic unit cell 20H, it experiences a change in refractive index over a known length. Similarly, as the second external optical path 42 travels outside the monolithic unit cell 20H, it experiences a change in refractive index over a known length. The change in refractive index experienced by the first external optical path 40 and the second external optical path 42 imparts a phase difference to the first external optical path 40 and the second optical light path 42. Therefore, the optical path difference arises not through mechanical actuation (e.g., a rotating or travelling mirror or grating), but because of the refractive index mismatch between the monolithic unit cell 20H and the first or second external environments 90A or 90B.

First internal optical path 30 and first external optical path 40 recombine at the array of electrically coupled light-sensitive pixel elements 60 and produce a first interferogram 71A within region 70A on the array 60. First interferogram 71A is captured in the form of coherent irradiance on the detector 60. First interferogram 71A may characterize an optical property of the external environment 90A such as its temperature, pressure, refractive index, optical density, or gas molarity of a gas or gases within the external environment 90A.

First external optical path 40 and second external optical path 42 recombine at the array of electrically coupled light-sensitive pixel elements 60 and produce a second interferogram 71B (shown in later figures) within region 70B on the array 60. First interferogram 71A and second interferogram 71B are spatially separated from each other. The second interferogram 71B is captured in the form of coherent irradiance on the detector 60. The second interferogram 71B may characterize an optical property comparing the external environments 90A and 90B such as a difference in their temperature, pressure, refractive index, optical density, or gas molarity of a gas or gases within the external environments 90A and 90B.

Also, first internal optical path 30 and second external optical path 42 recombine at the array of electrically coupled light-sensitive pixel elements 60 and produce a third interferogram 71C within region 70C on the array 60. First, second, and third interferograms 71A, 71B, and 71C are spatially separated from each other. The third interferogram 71C is captured in the form of coherent irradiance on the detector 60. The third interferogram 71C may characterize an optical property of the external environment 90B such as its temperature, pressure, refractive index, optical density, or gas molarity of a gas or gases within the external environment 90B.

Figure 42A:
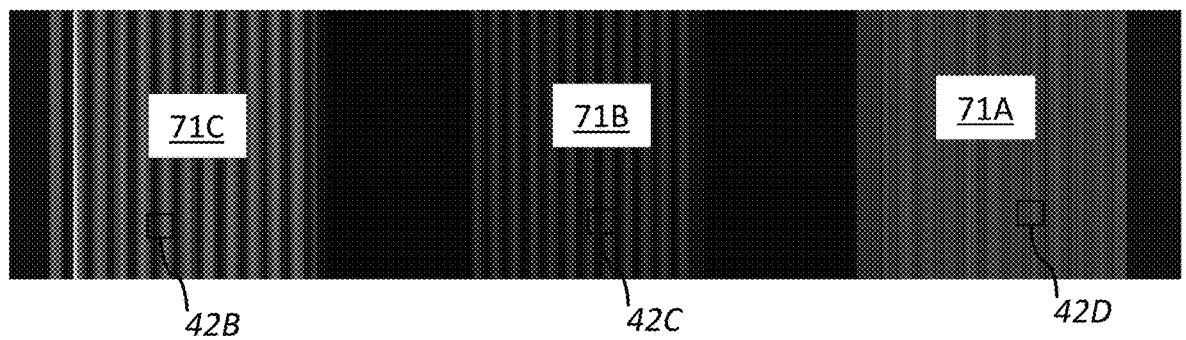
FIG. 42A illustrates the simulated coherent irradiance of the interferogram created by the interferometer illustrated in FIG. 41.
Figure 42B:
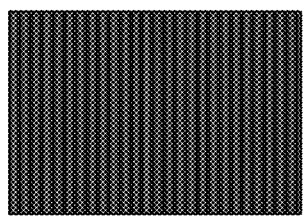
FIGS. 42B, 42C, and 42D are enlarged views of the simulated coherent irradiance of the interferogram illustrated in FIG. 42A.
Figure 42C:
Figure 42D:
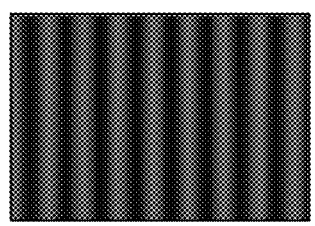

FIG. 42A illustrates simulated coherent irradiance of the interferograms 71A, 71B, and 71C created on the detector 60 within interferogram regions 70A, 70B, and 70C from the interferometer 124 illustrated in FIG. 41. FIGS. 42B, 42C, and 42D are enlarged views of the simulated coherent irradiance of the interferograms 71A, 71B, and 71C illustrated in FIG. 41.

In FIGS. 42A, 42B, 42C, and 42D, the detector 60 is defined as a 30 mm×14 mm array consisting of 6000×200 pixels. The resulting analysis provides a geometric ray trace, coherent irradiance, and coherent phase. In this simulation, the coherent light source, e.g., coherent light source 10 in FIG. 41, has a wavelength of 450 nm. The unit cell 20H is modeled as FK3 glass from the Schott materials catalogue within the Zemax® OpticStudio® software. In this simulated model, the peak irradiance (e.g., white) has a power per area of 4.152 W/cm$^2$ and the minimum irradiance (e.g., black) has a power per area of $1.1 \times 10^{-4}$ W/cm$^2$.

Figure 42E:
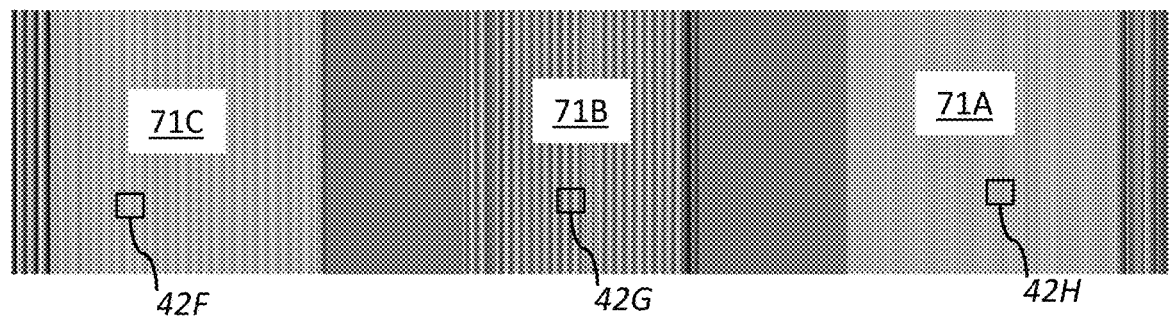
FIG. 42E illustrates the simulated coherent phase of the interferogram created with the same model as described in FIGS. 41, and 42A-42D.
Figure 42F:
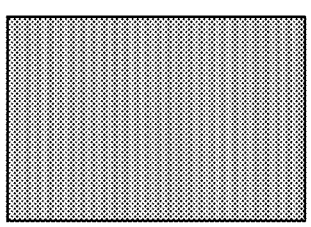
FIGS. 42F, 42G, and 42H are an enlarged views of the simulated coherent phase interferogram illustrated in FIG. 42E.
Figure 42G:
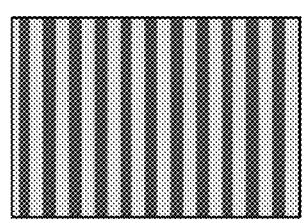
Figure 42H:
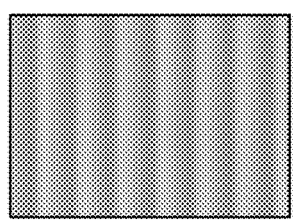

FIG. 42E illustrates the simulated coherent phase interferograms 71A, 71B, and 71C created with the same model as described in FIGS. 41, and 42A-42D. FIGS. 42F, 42G, and 42H are an enlarged views of the simulated coherent phase interferograms 71A, 71B, and 71C. In this illustration, the maximum phase (e.g., light gray) value is 161.7 degrees and the minimum phase (e.g., dark gray) value is −169.7 degrees.

Figure 43:
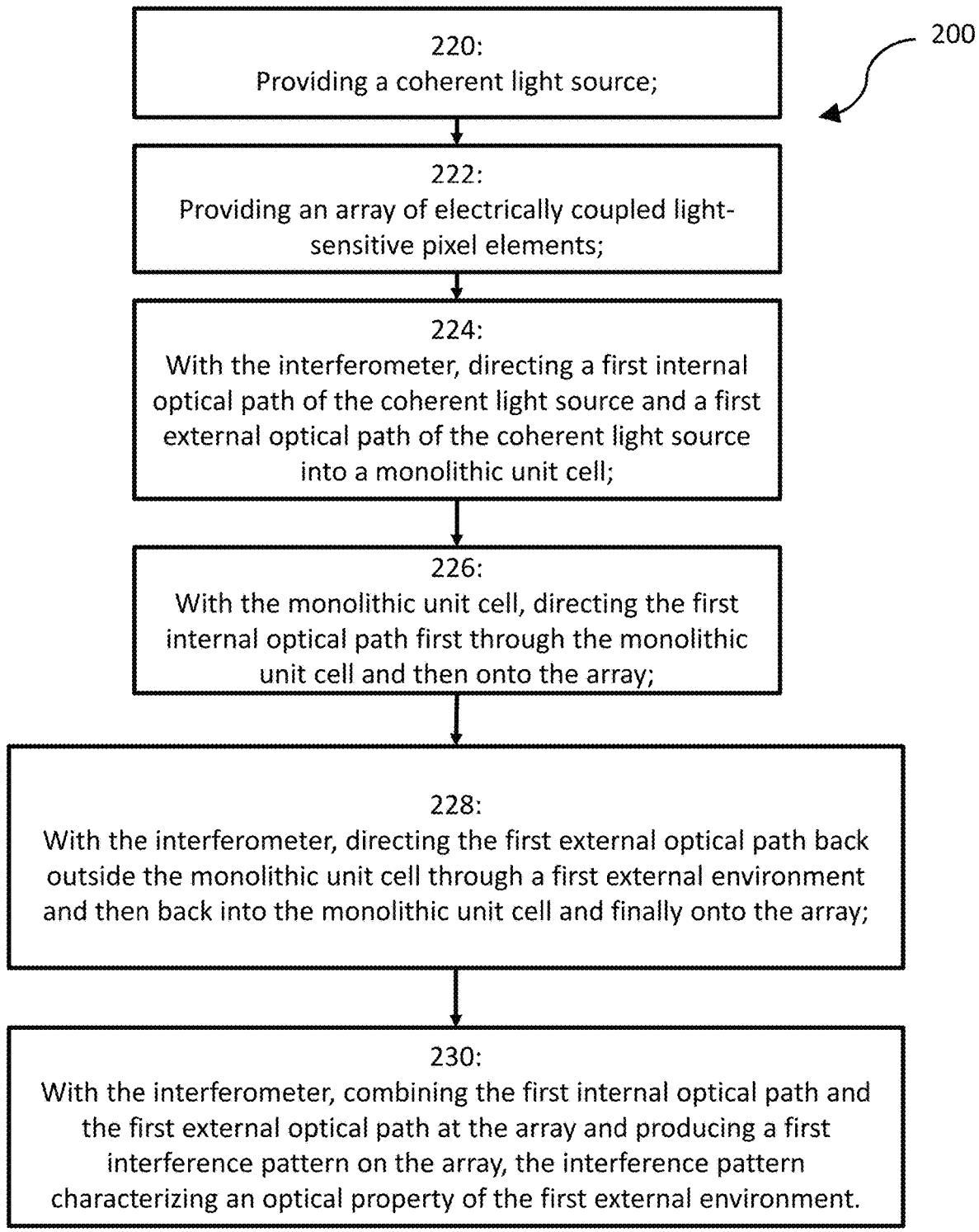
FIG. 43 is an illustration of a method for characterizing an optical property of an environment with an interferometer according to embodiments disclosed herein.

FIG. 43 illustrates a method 200 of characterizing an optical property of an environment with an interferometer. Method 200 includes: step 220 of providing a coherent light source; step 222 of providing an array of electrically coupled light-sensitive pixel elements; step 224 of, with the interferometer, directing a first internal optical path of the coherent light source and a first external optical path of the coherent light source into a monolithic unit cell; step 226 of, with the monolithic unit cell, directing the first internal optical path first through the monolithic unit cell and then onto the array; step 228 of, with the interferometer, directing the first external optical path back outside the monolithic unit cell through a first external environment and then back into the monolithic unit cell and finally onto the array; and step 230 of, with the interferometer, combining the first internal optical path and the first external optical path at the array and producing a first interference pattern on the array, the interference pattern characterizing an optical property of the first external environment.

Figure 44:
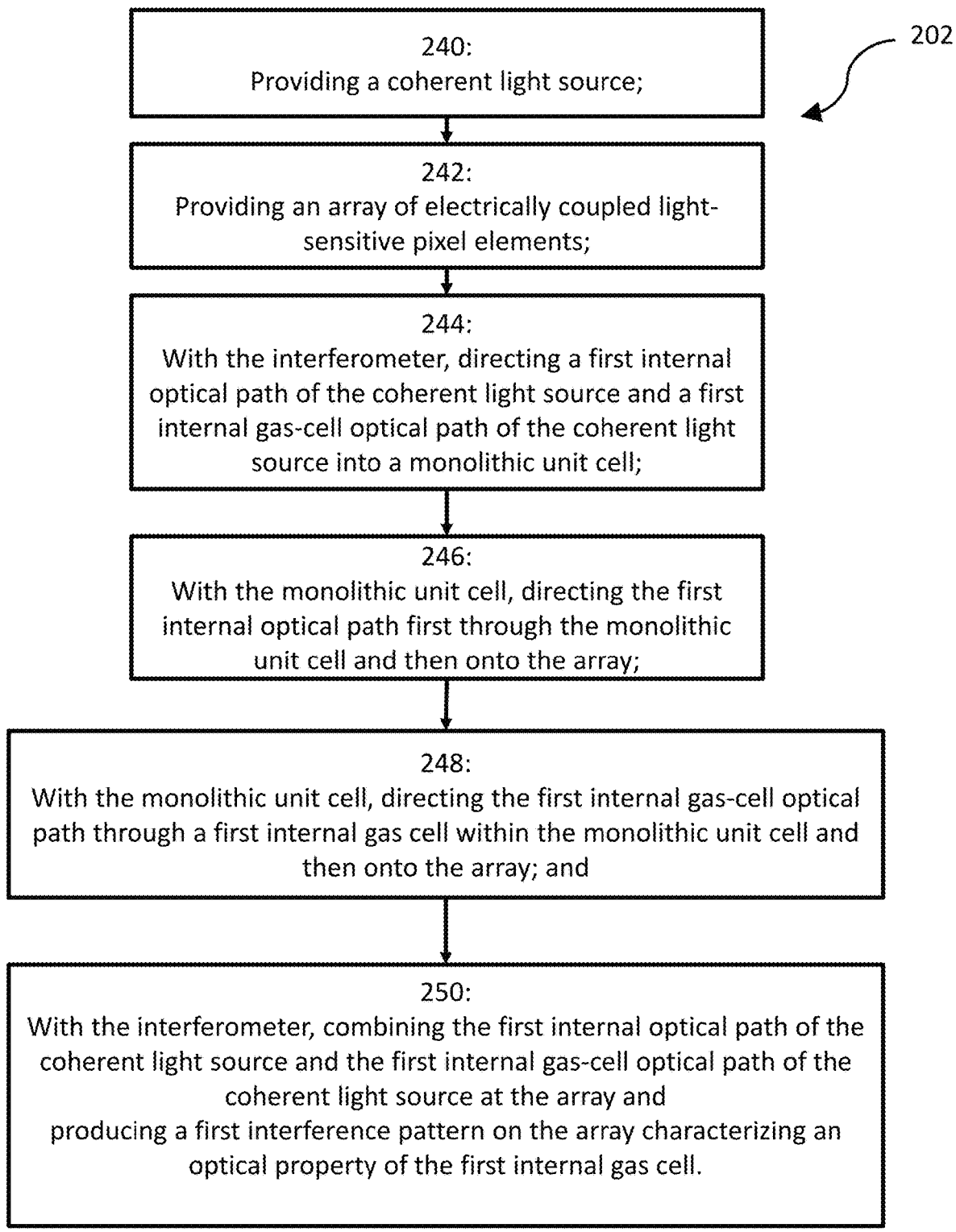
FIG. 44 is another illustration of a method for characterizing an optical property of an environment with an interferometer according to embodiments disclosed herein.

FIG. 44 illustrates a method 202 of characterizing an optical property of an environment with an interferometer. Method 202 includes: step 240 of providing a coherent light source; step 242 of providing an array of electrically coupled light-sensitive pixel elements; step 244 of, with the interferometer, directing a first internal optical path of the coherent light source and a first internal gas-cell optical path of the coherent light source into a monolithic unit cell; step 246 of, with the monolithic unit cell, directing the first internal optical path first through the monolithic unit cell and then onto the array; step 248 of, with the monolithic unit cell, directing the first internal gas-cell optical path through a first internal gas cell within the monolithic unit cell and then onto the array; and step 250 of, with the interferometer, combining the first internal optical path of the coherent light source and the first internal gas-cell optical path of the coherent light source at the array and producing a first interference pattern on the array characterizing an optical property of the first internal gas cell.

The present invention may be embodied in other specific forms without departing from its spirit or essential characteristics. The described embodiments are to be considered in all respects only as illustrative, and not restrictive. All changes which come within the meaning and range of equivalency of the foregoing description are to be embraced within the scope of the invention.

It will be appreciated that several of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art and are also intended to be encompassed by the following claims.

I claim:

1. An interferometer, comprising:
a coherent light source;
an array of electrically coupled light-sensitive pixel elements;
the interferometer configured to direct a first internal optical path of the coherent light source and a first external optical path of the coherent light source into a monolithic unit cell;
the monolithic unit cell configured to direct the first internal optical path first through the monolithic unit cell and then onto the array; and
the monolithic unit cell also configured to direct the first external optical path back outside the monolithic unit cell through a first external environment and then back into the monolithic unit cell and finally onto the array;
wherein:
the interferometer is further configured to:
combine the first internal optical path and the first external optical path at the array; and
produce a first interferogram on the array, the first interferogram characterizing an optical property of the first external environment.

2. The interferometer of claim 1, wherein:
the interferometer is configured to direct a second external optical path of the coherent light source into the monolithic unit cell;
the monolithic unit cell is configured to direct the second external optical path back outside the monolithic unit cell through a second external environment and then back into the monolithic unit cell and finally onto the array; and
the interferometer is further configured to:
combine the first internal optical path of the coherent light source and the second external optical path of the coherent light source at the array; and
produce a second interferogram on the array, the second interferogram characterizing an optical property of the second external environment.

3. The interferometer of claim 2, wherein the interferometer is further configured to:
combine the first external optical path of the coherent light source and the second external optical path of the coherent light source between the monolithic unit cell and the array; and produce a third interferogram on the array characterizing a relative optical property between the first and second external environments, the first, second, and third interferograms spatially separated from each other.

4. The interferometer of claim 1, wherein:
the interferometer is further configured to direct a first internal gas-cell optical path of the coherent light source into the monolithic unit cell;
the monolithic unit cell is configured to direct the first internal gas-cell optical path through a first internal gas cell within the monolithic unit cell and then onto the array; and
the interferometer is further configured to:
combine the first external optical path of the coherent light source and the first internal gas-cell optical path of the coherent light source at the array; and
produce a second interferogram on the array characterizing a relative optical property between the first external environment and the first internal gas cell.

5. The interferometer of claim 4, wherein:
the interferometer is further configured to direct a second internal gas-cell optical path of the coherent light source into the monolithic unit cell;
the monolithic unit cell further configured to direct the second internal gas-cell optical path through a second internal gas cell within the monolithic unit cell and then onto the array; and
the interferometer is further configured to:
combine the first external optical path of the coherent light source and the second internal gas-cell optical path of the coherent light source between the monolithic unit cell and the array; and
produce a third interferogram on the array characterizing a relative optical property between the first external environment and the second internal gas cell.

6. The interferometer of claim 5, wherein:
the interferometer is configured to direct a second external optical path into the monolithic unit cell;
the monolithic unit cell is configured to direct the second external optical path back outside the monolithic unit cell through a second external environment and then back into the monolithic unit cell and finally onto the array; and
the interferometer is configured to:
combine the first internal gas-cell optical path of the coherent light source and the second external optical path of the coherent light source between the monolithic unit cell and the array; and
produce a fourth interferogram on the array characterizing a relative optical property between the first internal gas cell and the second external environment.

7. The interferometer of claim 6, wherein the interferometer is configured to:
combine the second internal gas-cell optical path of the coherent light source and the second external optical path of the coherent light source between the monolithic unit cell and the array; and
produce a fifth interferogram on the array characterizing a relative optical property between the second internal gas cell and the second external environment, the first, second, third, fourth, and fifth interferograms spatially separated from each other.

8. An interferometer, comprising:
a coherent light source;

an array of electrically coupled light-sensitive pixel elements;
the interferometer configured to direct a first internal optical path of the coherent light source and a first internal gas-cell optical path of the coherent light source into a monolithic unit cell;
the monolithic unit cell configured to direct the first internal optical path first through the monolithic unit cell and then onto the array;
the monolithic unit cell also configured to direct the first internal gas-cell optical path through a first internal gas cell within the monolithic unit cell and then onto the array;
wherein:
the interferometer is further configured to:
combine the first internal optical path of the coherent light source and the first internal gas-cell optical path of the coherent light source at the array; and
produce a first interferogram on the array characterizing an optical property of the first internal gas cell.

9. The interferometer of claim 8, wherein:
the interferometer is further configured to direct a second internal gas-cell optical path of the coherent light source into the monolithic unit cell;
the monolithic unit cell further configured to direct the second internal gas-cell optical path through a second internal gas cell within the monolithic unit cell and then onto the array; and
the interferometer is further configured to:
combine the first internal optical path of the coherent light source and the second internal gas-cell optical path of the coherent light source at the array; and
produce a second interferogram on the array characterizing an optical property of the second internal gas cell.

10. The interferometer of claim 9, wherein the interferometer is further configured to:
combine the first internal gas-cell optical path of the coherent light source and the second internal gas-cell optical path of the coherent light source at the array; and
produce a third interferogram on the array characterizing a relative optical property between the first internal gas cell and the second internal gas cell, the first, second, and third interferograms spatially separated from each other.

11. A method for characterizing an optical property of an environment with an interferometer, the method comprising:
providing a coherent light source;
providing an array of electrically coupled light-sensitive pixel elements;
with the interferometer, directing a first internal optical path of the coherent light source and a first external optical path of the coherent light source into a monolithic unit cell;
with the monolithic unit cell, directing the first internal optical path first through the monolithic unit cell and then onto the array;
with the monolithic unit cell, directing the first external optical path back outside the monolithic unit cell through a first external environment and then back into the monolithic unit cell and finally onto the array; and
with the interferometer, combining the first internal optical path and the first external optical path at the array and producing a first interferogram on the array, the interferogram characterizing an optical property of the first external environment.

12. The method of claim 11, further comprising:
with the interferometer, directing a second external optical path into the monolithic unit cell;
with the monolithic unit cell, directing the second external optical path back outside the monolithic unit cell through a second external environment and then back into the monolithic unit cell and finally onto the array; and
with the interferometer, combining the first internal optical path of the coherent light source and the second external optical path of the coherent light source at the array; and
with the interferometer, producing a second interferogram on the array characterizing an optical property of the second external environment.

13. The method of claim 12, further comprising:
with the interferometer, combining the first external optical path of the coherent light source and the second external optical path of the coherent light source between the monolithic unit cell and the array; and
with the interferometer, producing a third interferogram on the array characterizing a relative optical property between the first and second external environments, keeping the first, second, and third interferograms spatially separated from each other.

14. A method for characterizing an optical property of an environment with an interferometer, the method comprising:
providing a coherent light source;
providing an array of electrically coupled light-sensitive pixel elements;
with the interferometer, directing a first internal optical path of the coherent light source and a first internal gas-cell optical path of the coherent light source into a monolithic unit cell;
with the monolithic unit cell, directing the first internal optical path first through the monolithic unit cell and then onto the array;
with the monolithic unit cell, directing the first internal gas-cell optical path through a first internal gas cell within the monolithic unit cell and then onto the array;
with the interferometer, combining the first internal optical path of the coherent light source and the first internal gas-cell optical path of the coherent light source at the array; and
with the interferometer, producing a first interferogram on the array characterizing an optical property of the first internal gas cell.

15. The method of claim 14, further comprising:
with the interferometer, directing a second internal gas-cell optical path of the coherent light source into the monolithic unit cell;
with the interferometer, directing the second internal gas-cell optical path through a second internal gas cell within the monolithic unit cell and then onto the array;
with the interferometer, combining the first internal optical path of the coherent light source and the second internal gas-cell optical path of the coherent light source at the array; and
with the interferometer, producing a second interferogram on the array characterizing an optical property of the second internal gas cell.

16. The method of claim 15, further comprising:
with the interferometer, combining the first internal gas-cell optical path of the coherent light source and the second internal gas-cell optical path of the coherent light source at the array; and with the interferometer, producing a third interferogram on the array characterizing a relative optical property between the first internal gas cell and the second internal gas cell, keeping the first, second, and third interferograms spatially separated from each other.

17. The method of claim 14, further comprising:

with the interferometer, directing a first external optical path of the coherent light source into the monolithic unit cell;

with the monolithic unit cell, directing the first external optical path back outside the monolithic unit cell through a first external environment and then onto the array;

with the interferometer, combining the first external optical path of the coherent light source and the first internal gas-cell optical path of the coherent light source at the array; and with the interferometer, producing a second interferogram on the array characterizing a relative optical property between the first external environment and the first internal gas cell.

18. The method of claim 17, further comprising:

with the interferometer, directing a second internal gas-cell optical path of the coherent light source into the monolithic unit cell;

with the monolithic unit cell, directing the second internal gas-cell optical path through a second internal gas cell within the monolithic unit cell and then onto the array; and with the interferometer, combining the first external optical path of the coherent light source and the second internal gas-cell optical path of the coherent light source between the monolithic unit cell and the array; and with the interferometer, producing a third interferogram on the array characterizing a relative optical property between the first external environment and the second internal gas cell, keeping the first, second, and third interferograms spatially separated from each other.

19. The method of claim 18, further comprising:

with the interferometer, directing a second external optical path into the monolithic unit cell;

with the monolithic unit cell, directing the second external optical path back outside the monolithic unit cell through a second external environment and then back into the monolithic unit cell and finally onto the array;

with the interferometer, combining the first internal gas-cell optical path of the coherent light source and the second external optical path of the coherent light source between the monolithic unit cell and the array; and with the interferometer, producing a fourth interferogram on the array characterizing a relative optical property between the first internal gas cell and the second external environment.

20. The method of claim 19, further comprising:

with the interferometer, combining the second internal gas-cell optical path of the coherent light source and the second external optical path of the coherent light source between the monolithic unit cell and the array; and with the interferometer, producing a fifth interferogram on the array characterizing a relative optical property between the second internal gas cell and the second external environment, keeping the first, second, third, fourth, and fifth interferograms spatially separated from each other.

* * * * *